US007315386B1

(12) United States Patent
Shiimori et al.

(10) Patent No.: US 7,315,386 B1
(45) Date of Patent: Jan. 1, 2008

(54) IMAGE COMMUNICATION SYSTEM AND METHOD

(75) Inventors: Yoshiko Shiimori, Asaka (JP); Yoshinori Ohta, Asaka (JP); Koichi Sakamoto, Asaka (JP); Norihisa Haneda, Asaka (JP); Nobuyoshi Nakajima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1296 days.

(21) Appl. No.: 09/107,486

(22) Filed: Jun. 30, 1998

(30) Foreign Application Priority Data

| Jun. 30, 1997 | (JP) | .................................... 9-188998 |
| Jun. 30, 1997 | (JP) | .................................... 9-188999 |
| Sep. 30, 1997 | (JP) | .................................... 9-282648 |
| May 1, 1998 | (JP) | .................................... 10-135912 |

(51) Int. Cl.
*G06F 15/00* (2006.01)
*H04N 1/387* (2006.01)

(52) U.S. Cl. ..................... 358/1.15; 358/302; 358/452; 358/537

(58) Field of Classification Search ............... 358/1.15, 358/1.14, 1.13, 1.9, 1.16, 537, 452, 302; 382/180
See application file for complete search history.

(56) References Cited

U.S. PATENT DOCUMENTS 5,163,122 A    11/1992  Urabe et al.

(Continued)

FOREIGN PATENT DOCUMENTS

EP          0319232         6/1989

(Continued)

OTHER PUBLICATIONS

Osumi, Noriyoshi et al.: "Learning Field Design-Collaborative Learning in the Cyberspace-", 'Technical Report of Information Processing Society of Japan', Information Processing Society of Japan, Nov. 28, 1996, vol. 96, No. 119, p. 9-14, Nov. 28, 1996.

*Primary Examiner*—Aung S. Moe
*Assistant Examiner*—Dillon Murphy
(74) *Attorney, Agent, or Firm*—Birch, Stewart, Kolasch & Birch, LLP

(57) ABSTRACT

In a system in which an editing server and a plurality of client computers are capable of communicating with one another, an edited image can be generated by the plurality of client computers.

When image data is transmitted from the image server to the client computer, the resolution of image data to be transmitted is reduced in correspondence with the resolution of a monitor display device connected to the client computer. Further, the number of colors of an image represented by the image data is decreased in correspondence with the number of colors which can be displayed on the monitor display device. The data quantity of the image data to be transmitted is reduced, so that time required to transmit the image data is shortened.

A client computer and a main image server are connected to each other. A user image to be synthesized on a template image is read in the client computer. Image data representing the template image used for the image synthesis and image data representing a mask image are transmitted from the main image server to the client computer. In the client computer, image synthesis processing is performed. Image data representing an area required for image synthesis of the user image used for the image synthesis is extracted. The extracted user image data and synthesis information required for the synthesis are transmitted from the client computer to the main image server. In the main image server, a composite image is printed.

23 Claims, 68 Drawing Sheets

U.S. PATENT DOCUMENTS

| | | | |
|---|---|---|---|
| 5,179,651 A | | 1/1993 | Taaffe et al. |
| 5,247,372 A | * | 9/1993 | Tsutamori et al. ........... 358/452 |
| 5,270,831 A | | 12/1993 | Parulski et al. |
| 5,384,835 A | | 1/1995 | Wheeler et al. |
| 5,442,749 A | | 8/1995 | Northcutt et al. |
| 5,477,353 A | | 12/1995 | Yamasaki |
| 5,537,546 A | | 7/1996 | Sauter |
| 5,551,428 A | | 9/1996 | Godlewski et al. |
| 5,579,126 A | | 11/1996 | Otsuka |
| 5,608,542 A | | 3/1997 | Krahe et al. |
| 5,687,332 A | * | 11/1997 | Kurahashi et al. ........... 395/335 |
| 5,720,013 A | * | 2/1998 | Uda et al. .................... 358/1.15 |
| 5,764,235 A | * | 6/1998 | Hunt et al. .................... 345/428 |
| 5,881,168 A | * | 3/1999 | Takaoka et al. .............. 382/180 |
| 5,926,154 A | * | 7/1999 | Hirono et al. ................... 345/5 |
| 5,933,584 A | * | 8/1999 | Maniwa .................... 358/1.15 |
| 6,370,280 B1 | * | 4/2002 | Cok et al. .................... 382/284 |

FOREIGN PATENT DOCUMENTS

| | | |
|---|---|---|
| EP | 0463618 A2 | 1/1992 |
| EP | 0463618 A3 | 1/1992 |
| EP | 4117769 | 4/1992 |
| EP | 0550374 | 7/1993 |
| EP | 0559376 | 9/1993 |
| EP | 0581590 | 2/1994 |
| EP | 6233139 | 8/1994 |
| EP | 6035999 | 10/1994 |
| EP | 0647910 | 4/1995 |
| EP | 7095415 | 4/1995 |
| EP | 0677816 | 10/1995 |
| EP | 0727908 | 8/1996 |
| EP | 0738075 | 10/1996 |
| EP | 8265577 | 10/1996 |
| EP | 0753852 | 1/1997 |
| EP | 0773503 | 5/1997 |
| GB | 2286944 | 8/1995 |
| GB | 2300991 | 11/1996 |
| JP | 4-10994 A | 1/1992 |
| JP | 4-304567 A | 10/1992 |
| WO | WO9205470 | 4/1992 |
| WO | WO9629663 | 9/1996 |

* cited by examiner

*Fig. 2*

| ID | TYPE OF MONITOR | WHITE POINT | | STIMULUS VALUES OF PRIMARIES | | | | | | γ CHARACTERISTICS |
|---|---|---|---|---|---|---|---|---|---|---|
| | | | | RED | | GREEN | | BLUE | | |
| | | Xw | Yw | Xr | Yr | Xg | Yg | Xr | Yr | |
| 0 | S COMPANY | 0.3127 | 0.329 | 0.625 | 0.34 | 0.28 | 0.595 | 0.155 | 0.07 | TRANSFER FUNCTION[1] |
| 1 | M COMPANY | 0.3127 | 0.329 | 0.64 | 0.33 | 0.3 | 0.6 | 0.15 | 0.06 | TRANSFER FUNCTION[2] |
| 2 | N COMPANY | 0.2092 | 0.4881 | 0.64 | 0.33 | 0.29 | 0.6 | 0.15 | 0.06 | TRANSFER FUNCTION[3] |
| ... | ... | ... | ... | ... | ... | ... | ... | ... | ... | |
| i | STANDARD | 0.3127 | 0.329 | 0.625 | 0.34 | 0.28 | 0.595 | 0.155 | 0.07 | TRANSFER FUNCTION[i] |

*Fig. 19*

[TEMPLATE]
Etemplate = "http://templateServer/EdtTemp1.jpg" (LOCATION OF EDITING TEMPLATE IMAGE)
Emask = "http://templateServer/EdtMask1.jpg" (LOCATION OF EDITING MASK IMAGE)
Ptemplate = "http://templateServer/PrtTemp1.jpg" (LOCATION OF PRINTING TEMPLATE IMAGE)
Pmask = "http://templateServer/PrtMask1.jpg" (LOCATION OF PRINTING MASK IMAGE)

[WINDOW AREA DATA]
SY = 0.2
EX = 0.8
EY = 0.8
SX = 0.2

[ASPECT RATIO]
asp = 1.0

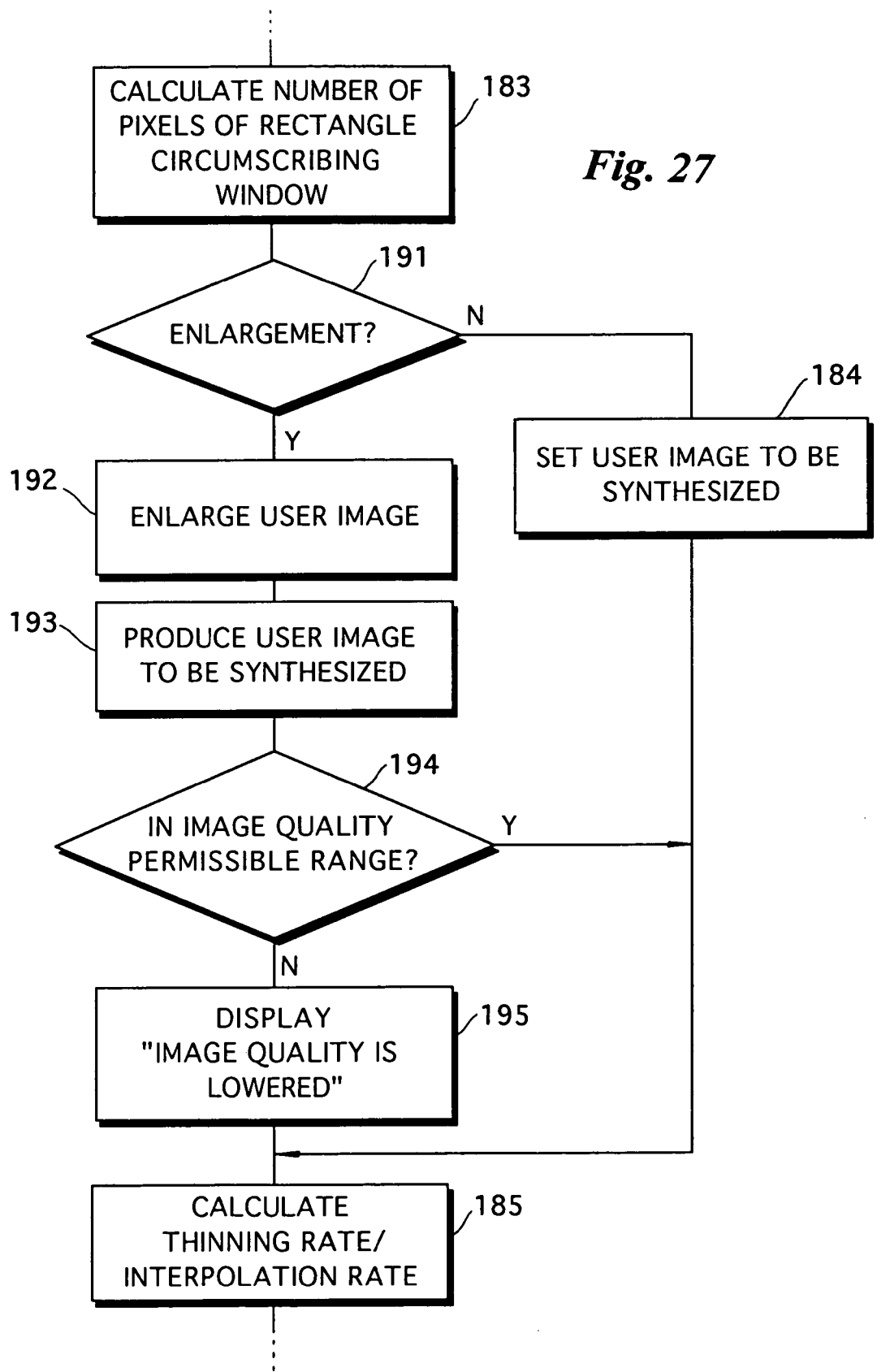

*Fig. 32*
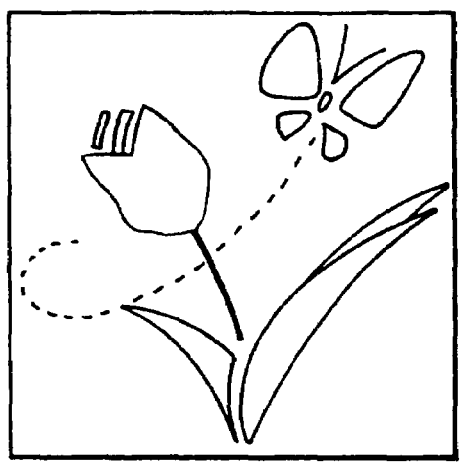 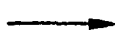 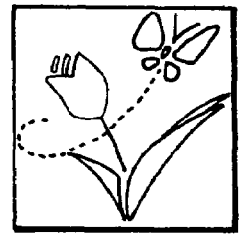
STANDARD IMAGE/1800dpi          1/4 STANDARD IMAGE/1200dpi
*Fig. 33*
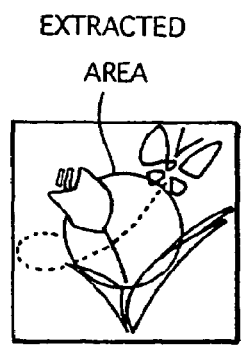  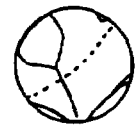
EXTRACTED AREA
EXTRACTED IMAGE

OBJECT INFROMATION

[Object ID 0x0?] (IMAGE OBJECT)
[Region]
Region-sx=0.xxxxx
Region-sy=0.yyyyy
Region-w=0.wwwww
Region-h=0.hhhhh
[Image-info]
Format=Jpeg
Image-for-thumnail=http://some.com/thm.jpg
Image-for-edit=http://some.com/edt.jpg
Image-for-source=http://some.com/prn.jpg
[Mask-info]
Format=Jpeg
Mask-for-thumnail=http://some.com/m-thm.jpg
Mask-for-edit=http://some.com/m-edt.jpg
Mask-for-source=http://some.com/m-prn.jpg
[Color-Collection]
GammaR=0.22
GammaG=0.22
GammaB=0.22
BrightnessR=0.0
BrightnessG=0.0
BrightnessB=0.0

*Fig. 47*

IMAGE COMMUNICATION SYSTEM AND METHOD

BACKGROUND OF THE INVENTION

1. Field of the Invention

The present invention relates to an image communication system comprising an image server and a client computer having a display device or an image data receiver having a display device, and an image server, a client computer and an image data receiver which constitute the image communication system.

The present invention relates further to an image communication system in which an image server and a client computer are capable of communicating with each other, a client computer constituting the image communication system, a method of transmitting image data, a method of displaying information relating to image data, and a computer-readable recording medium having a computer program stored thereon for realizing the above method in cooperation with a computer.

Further the present invention relates to an image editing system in which an image server and a plurality of client computers are capable of communicating with one another, client computers constituting the image editing system, an image editing method, and a recording medium having a computer program stored thereon for image editing.

2. Description of Related Art

An image server and a client computer have been generally connected to each other through a public telephone line or the like, to download image data stored in the image server in the client computer.

However, time required to download image data is lengthened because the data quantity of the image data is generally large.

A method of connecting an image data receiver having a CPU with a low processing speed, for example, a game unit or a television set to an image server through a public telephone line or the like, to display an image represented by image data which has been transmitted from the image server has been put to practical use.

When the image represented by the image data transmitted from the image server is displayed on a display device of the image data receiver having a CPU with a low processing speed, an image data receiver having a CPU with a low processing speed naturally has a limitation in rapid adjustment of an image represented by downloaded image data, not similarly to a computer. In the image data receiver, it is difficult to rapidly display an image in a state desired by a user.

Image data has been relatively frequently transmitted and received between a client computer and an image server by the spread of an internet. For example, it is possible to download the image data from the image server, and synthesize or correct an image represented by the image data in the client computer.

It takes long time to transmit image data because the quantity of the image data is generally large. An individual user of the client computer is relatively frequently connected to the image server using a public telephone line. When it takes long time to transmit the image data, the communication charge is increased. Therefore, it is preferable to make time required for transmission as short as possible. In such a case, it is convenient for the user to previously know the time required for transmission.

Furthermore, the same image as an image synthesized once in the client computer may, in some cases, be used to synthesize or correct the image again. In such a case, the user of the client computer wants to rapidly retrieve information relating to the image data used once for image synthesis.

Furthermore, when it is considered that image data representing a template image is transmitted from the image server to the client computer, the template image and a user image stored in the client computer are synthesized in the client computer, data relating to a composite image obtained by the synthesis is transmitted from the client computer to the image server, and a high-quality composite image is obtained using a high-quality printer in the image server, it is convenient for the user of the client computer to confirm the quality of the composite image to be printed.

By the development of computers and the spread of an internet, communication between an image server and a client computer via the internet is realized.

If communication can be relatively easy to establish between the image server and the client computer, it is also relatively easy to upload image data from the client computer to the image server and download the image data which has been uploaded to the image server.

Therefore, it is possible to attain various developments, for example, download the image data which has been uploaded to the image server, edit an image using an image represented by the downloaded image data and the other image, and upload the edited image from the client computer to the image server.

SUMMARY OF THE INVENTION

An object of the present invention is to make it possible to reduce the data quantity of image data transmitted from an image server to a client computer, and shorten time required to transmit the image data.

Another object of the present invention is to make it possible to rapidly display an image desired by a user on a display device of an image data receiver even if the image data receiver has a CPU with a low processing speed.

Further, an object of the present invention is to shorten, when image data is transmitted from a client computer to an image server, time required to transmit the image data.

Further, another object of the present invention is to make it possible to rapidly perform synthesis processing, correction processing, etc. of an image when these processings are performed again.

Still another object of the present invention is to make it possible for a user of a client computer to confirm, when a high-quality composite image is obtained in an image server, the quality of the composite image.

Still further an object of the present invention is to make it possible to reedit, in a system in which an image server and a plurality of client computers are capable of communicating with one another, an edited image generated in the client computer.

An image communication system according to the first invention in which an image server and a client computer having a display device are capable of communicating with each other, is characterized in that the image server stores image data representing an image, the client computer comprises image transmission command transmission means (a first transmission device) for transmitting to the image server a command to transmit the image data stored in the image server, and display information transmission means (a second transmission device) for transmitting to the image server display information relating to the display device, and the image server comprises data quantity reduction means (device) for reducing the data quantity of image data to be transmitted in response to the image transmission command on the basis of the display information transmitted from the display information transmission means, and image data transmission means (device) for transmitting to the client computer the image data whose data quantity is reduced by the data quantity reduction means.

The first embodiment of the invention also provides an image communication method suitable for the above-mentioned system. That is, in an image communication system in which an image server and a client computer having a display device are capable of communicating with each other, wherein the image server stores image data representing an image, the method is characterized by comprising the steps of transmitting a command to transmit the image data stored in the image server and display information relating to the display device from the client computer to the image server, reducing, in the image server, the data quantity of image data to be transmitted in response to the image transmission command on the basis of the display information transmitted from the client computer, and transmitting the image data whose data quantity is reduced from the image server to the client computer.

In the first embodiment of the invention, the image data representing the image is stored in the image server. A user of the client computer knows the contents of the image represented by the image data stored in the image server by seeing a thumbnail image which has been transmitted to the client computer, for example.

According to the first embodiment of the invention, the image transmission command and the display information are transmitted from the client computer to the image server. When the image transmission command and the display information are received in the image server, the reduction processing of the quantity of the image data, which represents the image specified by the image transmission command, is performed on the basis of the display information in response to the image transmission command. Since the data quantity is reduced on the basis of the display information, time required to transmit the image data can be shortened.

Examples of the display information include information relating to the maximum number of colors which can be displayed on the display device connected to the client computer.

The maximum number of colors which can be displayed on the display device has various values depending on the type of the display device, for example, 256 colors, 32000 colors, and full-color. Even if image data having colors whose number is not less than the maximum number of colors which can be displayed on the display device of the client computer is transmitted from the image server to the client computer, the colors of an image represented by the transmitted image data cannot be accurately displayed on the display device of the client computer.

In this case, the number of colors of the image represented by the image data to be transmitted to the client computer is reduced on the basis of the information relating to the maximum number of colors, to reduce the data quantity of the image data.

Examples of the display information include information relating to the resolution of the display device connected to the client computer.

The resolution of the display device has various values depending on the type of the display device. Even if image data representing an image having a resolution which is not less than the resolution of the display device of the client computer is transmitted from the image server to the client computer, it is impossible to accurately display the image represented by the transmitted image data on the display device of the client computer at the same resolution as the resolution of the image represented by the transmitted image data.

In this case, the image data to be transmitted to the client computer is thinned out on the basis of the information relating to the resolution to reduce the data quantity of the image data.

When the image server has a printer for printing an image, it is preferable to perform color conversion processing of the image data whose data quantity is reduced such that a color of the image printed by the printer coincides with a color of the image displayed on the display device connected to the client computer.

An image server according to the second embodiment of the invention used in an image communication system in which the image server and a client computer having a display device are capable of communicating with each other, is characterized by comprising image data reading means (device) for reading image data representing an image, display direction data input means (device) for inputting display direction data indicating whether a normal direction of display of the image represented by the image data read by the image data reading means is a longitudinal direction or a transverse direction, display direction conversion processing means (device) for performing display direction conversion processing of the image data read by the image data reading means on the basis of the display direction data inputted from the display direction data input means such that the direction of display of the image represented by the image data is a normal direction, image data storage means (device) for storing the image data which has been subjected to the conversion processing by the display direction conversion processing means, and image data transmission means (device) for reading out from the image storage means image data representing an image corresponding to an image transmission command transmitted from the client computer, and transmitting the image data to the client computer.

The second embodiment of the invention also provides a method suitable for the above-mentioned image server. That is, the method of transmitting image data in an image server used in an image communication system in which the image server and a client computer having a display device are capable of communicating with each other, is characterized by comprising the steps of reading image data representing an image, accepting input of display image data indicating whether a normal direction of display of the image represented by the read image data is a longitudinal direction or a transverse direction, performing display direction conversion processing of the read image data on the basis of the display direction data which has been accepted such that the direction of display of the image represented by the read image data is a normal direction, storing the image data which has been subjected to the display direction conversion processing, and transmitting, in response to an image transmission command transmitted from the client computer, to the client computer image data representing an image specified by the image transmission command out of the stored image data.

According to the second embodiment of the invention, the image data is stored in the image server after the direction of display thereof has been converted into a normal direction. When the image transmission command is transmitted from the client computer, the image data is transmitted from the image server to the client computer in response to the image transmission command. Since the image display direction conversion processing has been performed such that the image data transmitted to the client computer is displayed in the normal direction, a user can display the image in the normal direction in the client computer without performing the display direction conversion processing.

An image communication system according to a third embodiment of the invention in which an image server and an image data receiver having a display device are capable of communicating with each other, is characterized in that the image server comprises an image display data transmission device (means) transmitting image display data for displaying a plurality of sample images having different characteristics to the image data receiver, and the image data receiver comprises an image characteristics setting device (means) receiving the image display data transmitted from the image display data transmission device, displaying the plurality of sample images on the display device on the basis of the received image display data, and determining characteristics relating to the image selected from the displayed sample images, and an image characteristics data transmission device (means) transmitting data representing the image characteristics determined by the image characteristics setting device to the image server.

An image communication method according to this third embodiment, in which an image server and an image data receiver having a display device are capable of communicating with each other, is characterized by comprising the steps of transmitting image display data for displaying a plurality of sample images having different characteristics from the image server to the image data receiver, receiving, in the image data receiver, the image display data transmitted from the image server, displaying the plurality of sample images on the display device on the basis of the received image display data, determining characteristics relating to the image selected from the displayed sample images, and transmitting data representing the determined image characteristics from the image data receiver to the image server.

An example of the sample images having different characteristics in the images having different tonalities.

According to this third embodiment, image display data for displaying a plurality of sample images having different characteristics is transmitted from the image server to the image data receiver. When the image display data transmitted from the image server is received by the image data receiver, the plurality of sample images are displayed on the display device of the image data receiver on the basis of the received image display data. The user of the image data receiver selects a sample image which is suited the taste of the user from the displayed sample images. The data representing the characteristics relating to the selected sample image is transmitted to the image server.

In the image server, the data representing the characteristics of the selected sample image is received, so that image data can be adjusted so as to be image data corresponding to the selected sample image. The adjusted image data can be transmitted to the image data receiver. Since the image data adjusted so as to suit the taste of the user of the image data receiver can be transmitted to the image data receiver, the adjusted image can be rapidly displayed on the display device even if the image data receiver cannot adjust an image.

Preferably, the image server transmits to the image data receiver image data whose characteristics has not been adjusted in a case where the image data receiver can change or adjust the characteristics of the image displayed on the displayed device. On the other hand, the image server transmits to the image data receiver image data whose characteristics has been adjusted in accordance with the image characteristics data transmitted from the image data receiver in a case where the image data receiver cannot adjust or change the characteristics of the image displayed on the display device.

A fourth embodiment of the is directed to a client computer used in an image communication system in which an image server having an image output device for outputting an image and the client computer are capable of communicating with each other, comprises image data quantity reduction device (means) for reducing the data quantity of image data to be transmitted to the image server such that the data quantity of the image data to be transmitted is equal to or less than the data quantity of the image data representing the image to be outputted from the image output device, and image data transmission device (means) for transmitting to the image server the image data whose data quantity is reduced by the image data quantity reduction device.

The fourth embodiment also provide a method suitable for the client computer. The method of transmitting image data, according to the fourth invention, from a client computer to an image server, the client computer and the image server being used in an image communication system in which the image server having an image output device for outputting an image and the client computer are capable of communicating an image and the client computer are capable of communicating with each other, comprises the steps of reducing the data quantity of image data to be transmitted to the image server such that the data quantity of the image data to be transmitted is equal to or less than the data quantity of the image data representing the image to be outputted from the image output device, and transmitting to the image server the image data whose data quantity is reduced.

Furthermore, it also provides a recording medium having a computer program recorded thereon for implementing the fourth embodiment.

According to the fourth embodiment, when the image data is transmitted from the client computer to the image server, processing is performed such that the data quantity of the image data to be transmitted is reduced. Since the data quantity of the image data transmitted to the image server is reduced, so that the time required for transmission is shortened.

For example, the resolution of the image data transmitted from the client computer is converted into a resolution which is not more than the resolution of an image which can be outputted from the output device (a display device, a printer, etc.), thereby reducing the data quantity of the image data.

Furthermore, the image data transmitted from the client computer is thinned such that the size thereof is equal to the size of the output image (print size, e.g.) to be outputted from the output device, thereby reducing the quantity of the image data.

The image data may be transmitted from the client computer to the image server after being converted into image data in a format having a high transmission efficiency on the basis of the form of communication between the image server and the client computer.

Since the image data is transmitted from the client computer to the image server after being converted into the image data having a high transmission efficiently, the quantity of the image data is reduced, so that time required to transmit the image data can be shortened. It is possible to realize efficient transmission of the image data.

An image constituting a part of an image of one frame may be extracted, to transmit image data representing the extracted image from the client computer to the image server. Since the data quantity of the image data transmitted from the client computer to the image server is reduced, time required for transmission is shortened.

A compression rate is determined on the basis of the speed of transmission of the image data between the image server and the client computer. Image data compressed at the determined compression rate can be also transmitted from the client computer to the image server. Since the image data is compressed on the basis of the speed of transmission of the image data, the quantity of the image data to be transmitted is reduced, so that time required to transmit the image data can be shortened.

The compression rate may be determined in response to a compression command which is given.

A fifth embodiment of the is directed to a client computer used in an image communication system in which an image server and the client computer are capable of communicating with each other, characterized by comprising compression rate setting means (device) for setting the compression rate of image data, calculation means (device) for calculating information relating to time required for transmission in a case where the image data compressed at the compression rate set by the compression rate setting means is transmitted to the image server, and a display device for displaying the information relating to the time required for transmission calculated by the calculation means.

The fifth embodiment also provides a method suitable for implementation of the client computer. That is, it provides a method of displaying information in a client computer which is used in an image communication system in which an image server and the client computer are capable of communicating with each other, characterized by comprising the steps of setting the compression rate of image data, calculating information relating to time required for transmission in a case where the image data compressed at the set compression rate is transmitted to the image server, and displaying the calculated information relating to the time required for transmission.

Furthermore, it also provides a recording medium having a computer program recorded thereon for implementing the fifth embodiment.

According to the fifth embodiment, when the image data is compressed, information relating to time required for transmission in a case where the compressed image data is transmitted from the client computer to the image server is displayed. A user of the client computer can know the information relating to the time required for transmission, so that the compression rate can be further increased or decreased, as required.

Preferably, an image represented by the image data compressed at the compression rate is displayed. The user can confirm the quality of the image represented by the compressed image data with his or her eyes.

A fifth embodiment of the is directed to an image communication system in which an image server and a client computer are capable of communicating with each other, characterized in that image data and information relating to the image data are transmitted from the client computer to the image server, the image server comprises an image output device for outputting an image represented by the image data on the basis of the information relating to the image data transmitted from the client computer, and image information transmission means (device) for transmitting to the client computer the information relating to the image data transmitted from the client computer, and the client computer comprises retrieval means (device) for retrieving, image data specified by the information relating to the image data transmitted from the image server.

The sixth embodiment also provides a method of communicating image. That is, in an image communication system in which an image server and a client computer are capable of communicating with each other, the method is characterized by comprising the steps of transmitting image data and information relating to the image data from the client computer to the image server, outputting, in the image server, an image represented by the image data on the basis of the information relating to the image data transmitted from the client computer, transmitting the information relating to the image data transmitted from the client computer, from the image server to the client computer, and retrieving, in the client computer, image data specified by the image information relating to the image data transmitted from the image server.

Furthermore, it also provides a recording medium having a computer program recorded thereon for implementing the sixth embodiment.

According to the sixth embodiment, the information relating to the image data transmitted to the image server once is returned from the image server to the client computer. The client computer retrieves the image data which is the same as the image data transmitted to the image server on the basis of the information relating to the image data transmitted from the image data.

Since the image data transmitted to the image server once can be retrieved in the client computer, image synthesis processing, editing processing, and so forth can be performed again using the image data.

A seventh embodiment of the is directed to a client computer used in an image communication system in which an image server having a printer and the client computer are capable of communicating with each other, characterized by comprising receiving means (device) for receiving a part of printing template image data, which is transmitted from the image server, used for printing processing in the printer, and synthesis means (device) for synthesizing the part of the printing template image data received by the receiving means and a part of user image data stored in the client computer.

The seventh embodiment also provides a method suitable for the client computer. That is, it provides a method of synthesizing images in a client computer which is used in an image communication system in which an image server having a printer and the client computer are capable of communicating with each other, characterized by comprising the steps of receiving a part of printing template image data, which is transmitted from the image server, used for printing processing in the printer, and synthesizing the received part of the printing template image data and a part of user image data stored in the client computer.

According to the seventh embodiment, the part of the printing template image data used for the printing processing is transmitted from the image server to the client computer. A part of a composite image is generated in the client computer using the part of the printing template image data and the part of the user image data. A user of the client computer can obtain the part of the composite image to be printed, so that the user can confirm the quality of the composite image to be actually printed with his or her eyes.

An image editing system according to the eighth embodiment of the invention is an image editing system in which an image server and a plurality of client computers are capable of communicating with one another, an image represented by image data is edited in one of the client computers, and editing information relating to an initially edited image is transmitted from the one client computer to the image server, wherein the image server comprises editing information transmission means (device) for transmitting the initial editing information relating to the edited image which has been transmitted from the one client computer to the one client computer or the other client computer, and the one or other client computer comprises image reediting means (device) for reediting the initially edited image generated in the one client computer on the basis of the editing information relating to the edited image which has been transmitted from the image server, and reediting information transmission means (device) for transmitting to the image server reediting information relating to the reedited image generated in the image reediting means.

The eighth embodiment also provides a method suitable for the above-mentioned image editing system. That is, it provides an image editing method, wherein an image server and a plurality of client computers are capable of communicating with one another, comprising the steps of editing an image using an image represented by image data in one of the client computers, transmitting initial editing information relating to the edited image from the one client computer to the image server, receiving the editing information transmitted from the one client computer in the image server, transmitting the received editing information from the image server to the one client computer or other client computer, reediting the initially edited image generated on the basis of the editing information transmitted from the image server in the one or other client computer, and transmitting reediting information relating to the reedited image from the one or other client computer to the image server.

According to the eighth embodiment, the image server and the plurality of client computers are connected via a network, for example, such that they are capable of communicating with one another, as described above. The image is edited in one of the plurality of client computers. The information relating to the edited image, for example, the edited image itself, the file names for specifying images constituting the edited image so as to reproduce the edited image, data representing the positions where the images are arranged, and the like is transmitted to the image server from the one client computer where the image editing processing has been performed.

In the image editing system, the initially edited image generated in the client computer can be reedited. The edited image can be reedited by the one client computer which has edited the image, or can be reedited by the client computer other than the one client computer which has edited the image.

When the initially edited image is reedited, the information relating to the edited image which has been transmitted from the one client computer which has edited the image is transmitted from the image server to the one or other client computer which edits the image. In the client computer which has received the editing information (information relating to the edited image), the edited image is reproduced on the basis the received editing information. The reproduced edited image is subjected to reediting, for example, addition, deletion or alteration (movement in position, reduction, enlargement, etc.) of an image, a character or a sign.

The reediting information relating to the image thus reedited is transmitted to the image server from the client computer which has reedited the image.

As described in the foregoing, the image edited in the one client computer can be reedited in the one or other client computer. The plurality of client computers can edit one image in cooperation, so that a better image can be generated.

Preferably, the editing information transmitted from the client computer is stored in the image server. When the image is reedited, information relating to a reedited portion is transmitted from the client computer to the image server. The reedited image can be reproduced from the editing information stored in the image server and the reediting information transmitted from the client computer. The amount of the information relating to the reedited portion is small. Since the amount of the information is small, a time period required when the reediting information is transmitted to the image server from the client computer which has reedited the image may be relatively short.

In one embodiment, the plurality of client computers are classified into a plurality of groups each comprising one or two or more of the client computers. Execution data indicating that an image is initially edited or reedited is transmitted from the one or other client computer to the image server prior to editing or reediting the image. It is judged whether or not the editing or reediting of the image is allowed on the basis of the execution data transmitted from the one or other client computer. When it is judged that the editing or reediting of the image is allowed, data representing allowance is transmitted from the image server to the one or other client computer which has been allowed to edit or reedit the image. The one or other client computer performs editing or reediting the image in response to the receiving of the allowance data transmitted from the image server.

The execution data indicating that the image is edited or reedited is transmitted to the image server prior to editing or reediting the image in the client computer, and the image is edited or reedited only when the editing or reediting of the image is allowed by the image server. Therefore, the image is not simultaneously edited or reedited in the plurality of client computers, thereby preventing a lot of different edited images from existing together.

Furthermore, in another embodiment, the plurality of client computers are classified into a plurality of groups each comprising one or two or more of the client computers. The edited image is constituted by a plurality of object images. Object image editing request data indicating that the object images are subjected to object image editing which includes at least one of addition, alteration and deletion is transmitted from the one or other client computer to the image server. The image server judges whether or not the object image editing is allowed on the basis of the object image editing request data transmitted from the one or other client computer, and transmits, when it is judged that the object image editing is allowed, object image editing allowance data for allowing the object image editing to the one or other client computer which has been allowed to edit the object image. The one or other client computer performs the object image editing in response to the receiving of the object image editing allowance data transmitted from the image server.

By obtaining the object image editing allowance data, the object images constituting the edited image can be edited in the respective client computers. In the different client computers, it is possible to subject different object images constituting the same edited image to object image editing (addition, alteration (including change in the position where the object image is arranged, or enlargement or reduction of the object image), deletion, etc.).

Furthermore, when the client computers are classified into the plurality of groups, the editing information and/or the reediting information may be transmitted to the client computer in the group to which the one or other client computer which has transmitted the initial editing information belongs.

The client computer in the group receives the editing information or the subsequent reediting information, so that the edited image or the reedited image can be reproduced. In the client computers other than the client computer which has edited or reedited the image, the edited image or the reedited image can be confirmed.

Furthermore, it is preferable that the one or other client computer further comprises comment entry means (device) for entering a comment concerning the editing information or the reediting information which has been transmitted from the image server, and comment transmission means (device) for transmitting to the image server the comment entered from the comment entry means.

The comment concerning the edited image or the reedited image can be added, so that the edited image can be reedited on the basis of the comment. The edited image can be further expanded.

The foregoing and other objects, features, aspects and advantages of the present invention will be become more apparent from the following detailed description of the present invention when taken in conjunction with the accompanying drawings.

BRIEF DESCRIPTION OF THE DRAWINGS

FIG. 2 illustrates a monitor information table stored in an image/device information database;

FIG. 10 is a flowchart illustrating the procedure for processing for judging the taste for a tonality of an image of a user of a client computer or a television set;

FIG. 11 illustrates one example of a display screen of a monitor display device connected to a client computer or a television set;

FIG. 12 is a flowchart showing the procedure for transmission/receiving processing of data between a client computer or a television set and an image server;

FIG. 13 is a flowchart showing the procedure for transmission/receiving processing of image data between a television set and an image server;

FIG. 14 is a flowchart showing the procedure for transmission/receiving processing of image data between a client computer and an image server;

FIG. 19 illustrates one example of an LIF;

FIG. 27 is a flowchart showing a modified image synthesis processing;

FIG. 32 illustrates a user image and an image represented by image data to be transmitted;

FIG. 33 shows how a part of a user image is extracted;

FIGS. 44 to 48 illustrate examples of editing information;

FIG. 65 illustrates an example of the data structure of a file stored in a system database;

FIG. 66 illustrates one example of a display screen of a client computer;

FIG. 67 is a flowchart showing the procedure for processing performed by an editing server in a case where a request for an edited image owner flag is issued by a client computer;

FIGS. 68 and 69 are flowcharts showing the procedure for processing performed by an image server in a case where the whole of an edited image is edited;

FIG. 70 is a flowchart showing the procedure for processing performed by an image server in a case where a request for an object image owner flag is issued by a client computer;

FIG. 71 is a flowchart showing the procedure for processing performed by an image server in a case where an object image is edited.

DESCRIPTION OF THE PREFERRED EMBODIMENTS

(A) First Embodiment

Figure 1:
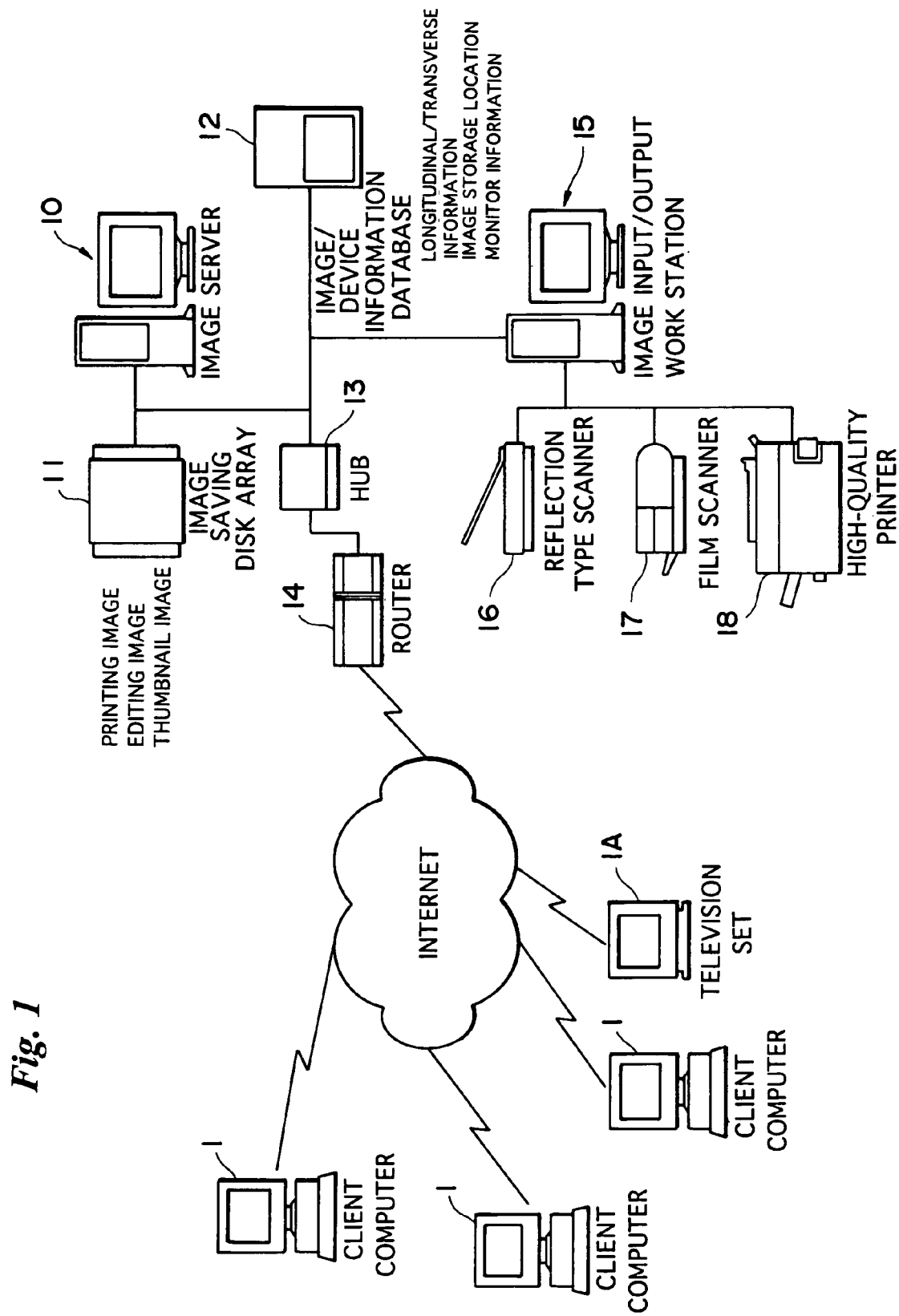
FIG. 1 illustrates the overall configuration of an image communication system according to the first embodiment of the present invention.

FIG. 1 illustrates the overall configuration of an image communication system according to a first embodiment of the present invention.

In an image communication system, image data is previously stored in an image saving disk array 11 connected to an image server 10, described later, and the image data is read out from the image saving disk array 11 in response to a readout command from a client computer 1 and is transmitted to the client computer 1.

In the image communication system, a lot of client computers 1 can be connected to a router 14 via an internet. In FIG. 1, a television set 1A which can be connected to the internet is also illustrated.

The image server 10 is connected to the router 14 through a hub 13. The image saving disk array 11 and an image/device information database 12 are connected to the image server 10. Printing image data representing printing images, editing image data representing editing images, and thumbnail image data (reduced image data) representing thumbnail images (reduced images) are stored, as described later, in the image saving disk array 11. There are a printing image, an editing image and a thumbnail image for one image, and the printing image data, editing image data and thumbnail image data respectively representing the above images provided for one image are correlated with one another with respect to the one image. The image/device information database 12 stores longitudinal/transverse information indicating which of longitudinal display and transverse display of an image is correct, data representing the location (image storage location) in the image saving disk array 11 where each type of image data is saved (the location is determined in correspondence with the file name of the image), and monitor information as shown in FIG. 2 in the form of a table, as described later.

An image input/output work station 15 is connected to the router 14 via the hub 13. A reflection type scanner 16, a film scanner 17 and a high-quality printer 18 are connected to the image input/output work station 15. An image on an original or a film is read by the reflection type scanner 16 or the film scanner 17. Image data representing the read image is saved upon being assigned a file name as printing image data in the image saving disk array 11 under control of the image server 10. The location (image storage location) where the image data is stored in the image saving disk array 11 is stored in correspondence with the file name of the image data in the image/device information database 12. Further, editing image data and thumbnail image data are generated from the printing image data when the printing image data is stored in the image saving disk array 11, and are stored in the image saving disk array 11 in relation to the printing image data under respective unique file names, as described later.

Figure 3:
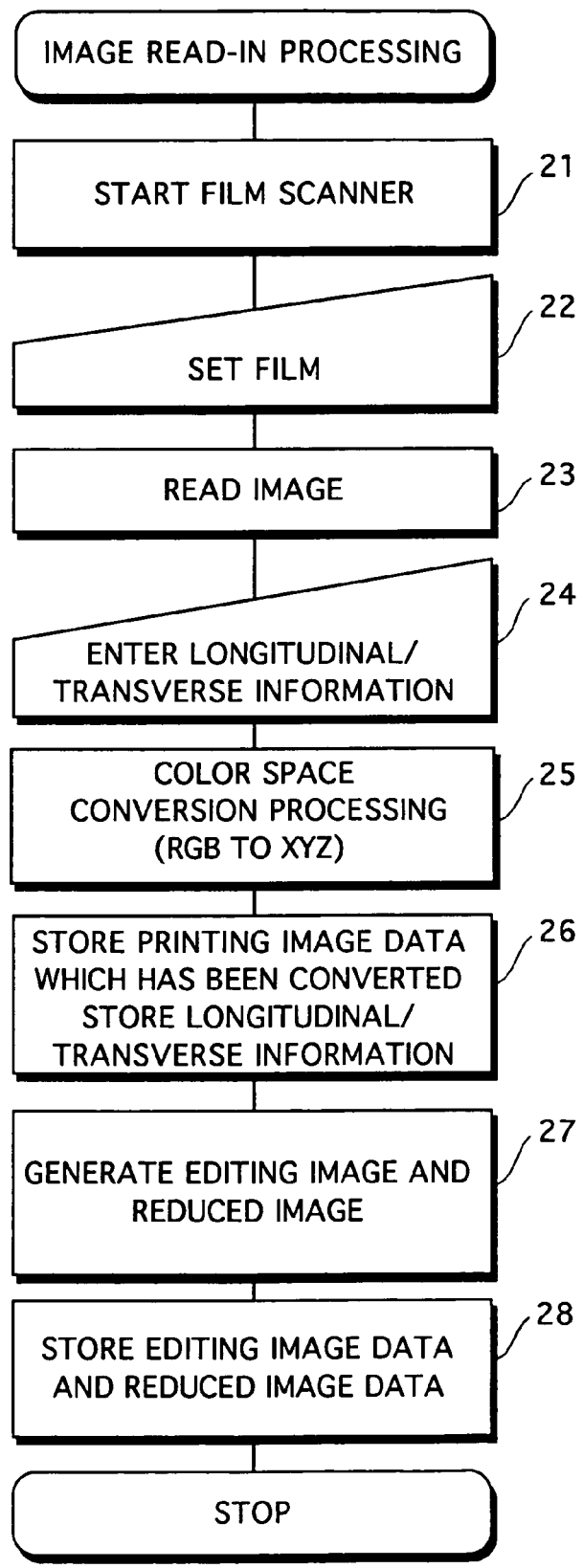
FIG. 3 is a flowchart showing the procedure for image reading processing performed by an image input/output work station.
Figure 4:
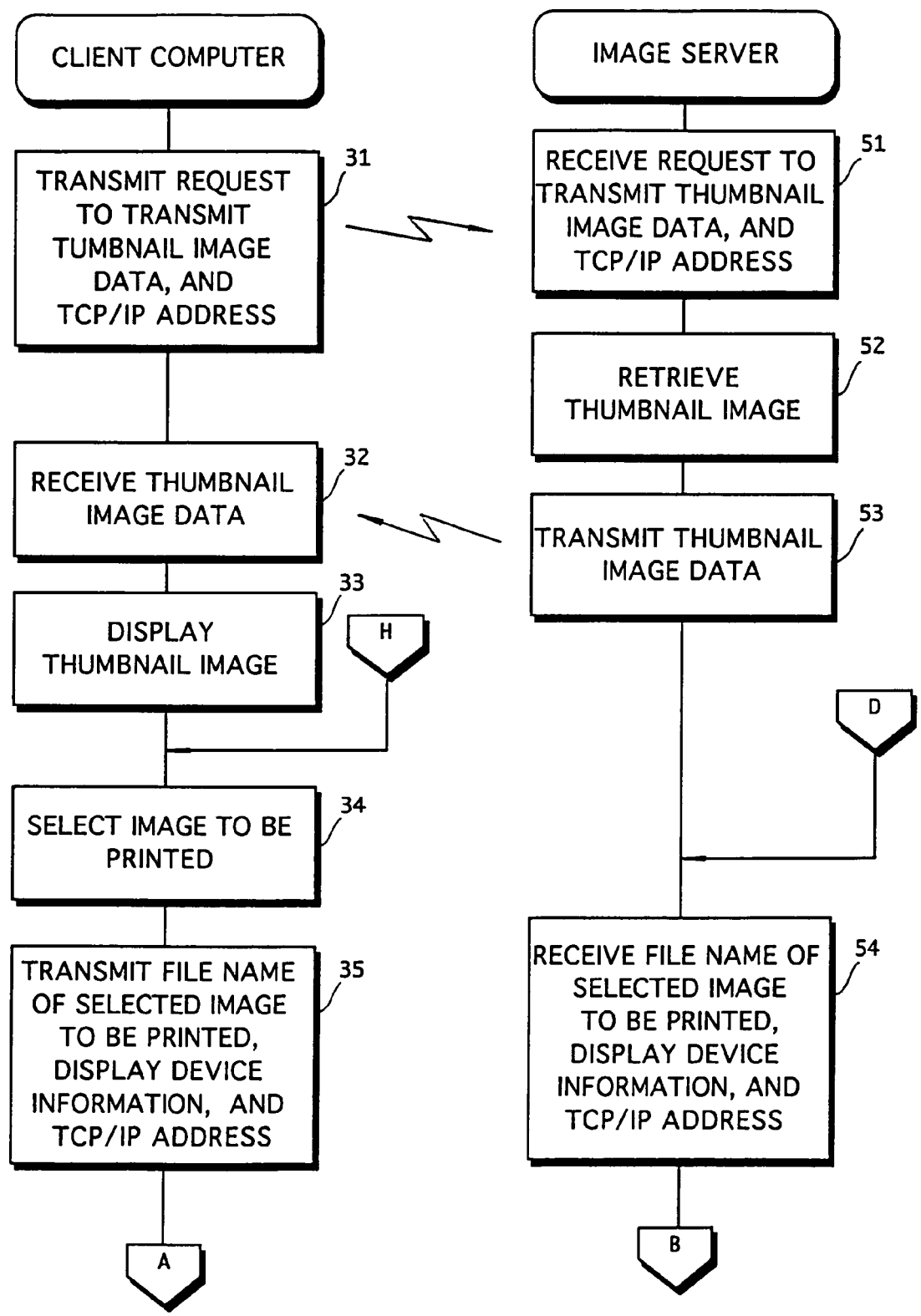
FIGS. 4 to 7 are flowcharts showing the procedure for transmission/receiving processing of image data which is performed between a client computer and an image server.
Figure 5:
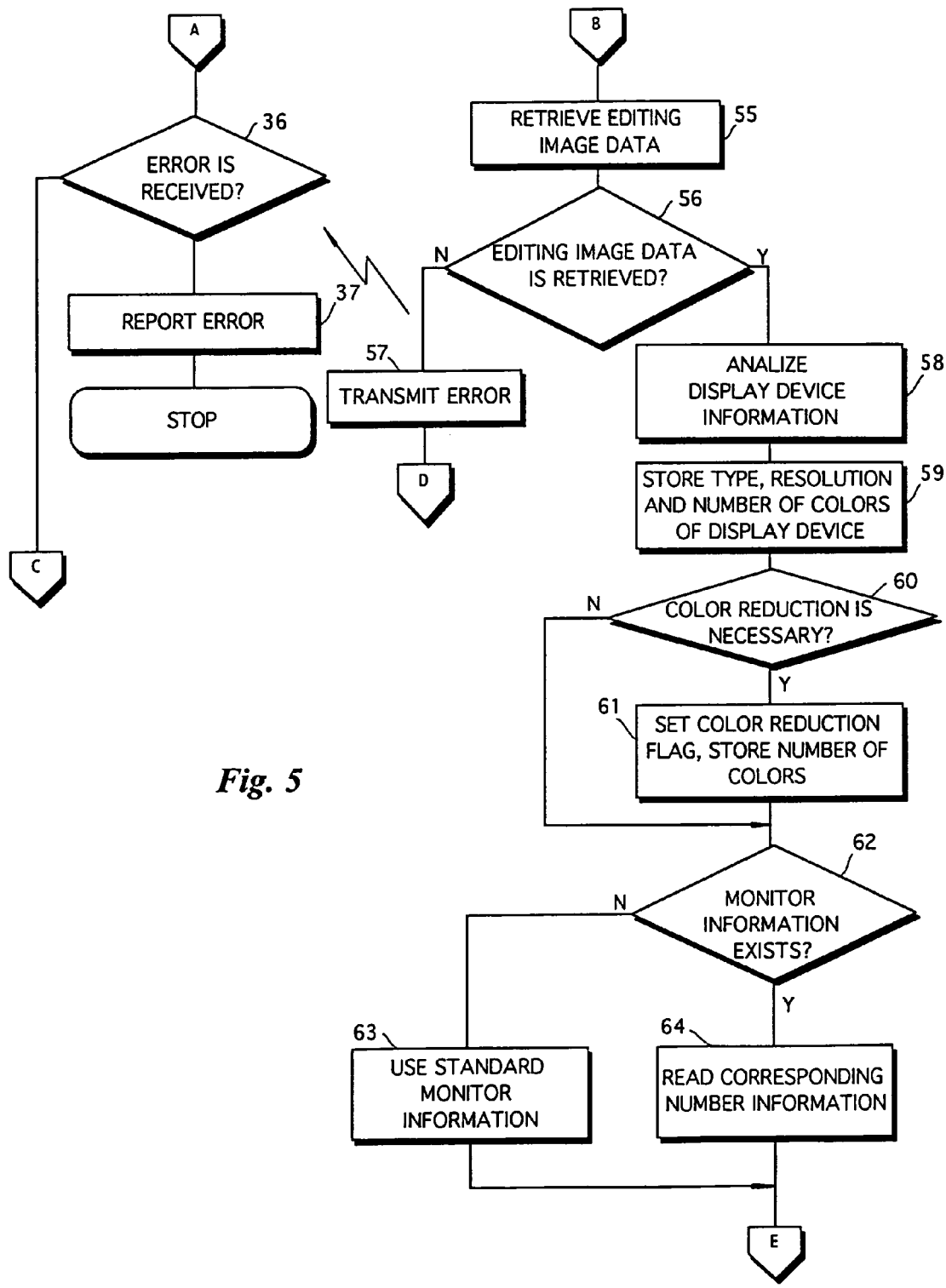

FIG. 3 is a flow chart showing the procedure for image read-in processing. The image read-in processing is performed by the image input/output work station 15.

A user of the client computer 1 hands a film on which a desired image (or images) is recorded to an operator of the image input/output work station 15. The operator of the image input/output work station 15 starts the film scanner 17 (step 21), and sets a film kept from the user of the client computer 1 in the film scanner 17 (step 22).

An image (or images) designated by the user of the client computer 1 is read out of images recorded on the film set in the film scanner 17 (step 23). Image data representing the read image is temporarily stored in a memory contained in the image input/output work station 15 in relation to the file name. The longitudinal/transverse information relating to the image data representing the image read from the film scanner 17 is then entered by the operator of the image input/output work station 15 (step 24). The longitudinal/transverse information is temporarily stored in the memory contained in the image input/output work station 15.

The image data stored in the memory contained in the image input/output work station 15 is subjected to the color space conversion processing (conversion from the RGB system to XYZ system) (step 25). The color space conversion processing will be described in detail later.

The image data, which has been subjected to the color space conversion processing and which is represented by the XYZ system, is stored, upon being related to the file name, as printing image data, in an image storage location of the image saving disk array 11 designated by the operator of the image input/output work station 15 (step 26). Further, the file name of the printing image data and the storage location where the printing image data is saved are stored in the image/device information database 12. Further longitudinal/transverse information temporarily stored in the memory of the image input/output work station 15 is transferred to and stored in the image/device information database 12.

Editing image data (the XYZ system) having a lower resolution than the resolution of the printing image data and thumbnail image data (the XYZ system) having a still lower resolution than the resolution of the editing image data are generated from the printing image data (image data after conversion, represented by the XYZ system) by the image input/output work station 15. The editing image data and the thumbnail image data are then subjected to display direction conversion processing such that they can be displayed in a correct direction (step 27), and are stored in the image saving disk array 11 in correspondence with the printing image data (represented by the XYZ system) (step 28). Of course, the editing image data and thumbnail image data both represented by the RGB system may be generated based on the printing image data of the RGB system to be stored. Specifically, the thumbnail image data preferably is represented by the RGB system so that it is not necessary to perform a color space conversion processing when the thumbnail image data is transmitted to the client computer 1 from the image server 10. The storage locations where the editing image data and the thumbnail image data are saved are also stored in the image/device information database 12 in relation to the file name of the editing image data and the file name of the reduced image data.

Brief description is made of the color space conversion between the RGB space and the XYZ space.

Image data represented in the RGB space is converted to image data represented in the XYZ space by the following equation, and vice versa.

$$\begin{pmatrix} a_r X_r & a_g X_g & a_b X_b \\ a_r Y_r & a_g Y_g & a_b Y_b \\ a_r Z_r & a_g Z_g & a_b Z_b \end{pmatrix} \begin{pmatrix} R \\ G \\ B \end{pmatrix} = \begin{pmatrix} X \\ Y \\ Z \end{pmatrix} \quad \text{Eq. (1)}$$

Where $X_r$, $Y_r$ and $Z_r$ denote three stimulus values for the primary (color) R, $X_g$, $Y_g$ and $Z_g$, for the primary G, and $X_b$, $Y_b$ and $Z_b$, for the primary B.

The 3×3 matrix representing a conversion coefficient in Eq. (1) is expressed using white points $X_w$, $Y_w$ and $Z_w$ as follows;

$$\begin{pmatrix} X_r & X_g & X_b \\ Y_r & Y_g & Y_b \\ Z_r & Z_g & Z_b \end{pmatrix} \begin{pmatrix} a_r \\ a_g \\ a_b \end{pmatrix} = \begin{pmatrix} X_w/Y_x \\ 1 \\ Z_w/Y_w \end{pmatrix} \quad \text{Eq. (2)}$$

where the relation $Z_i=1-X_i-Y_i$ (i=w, r, g, b) holds.

Figure 6:
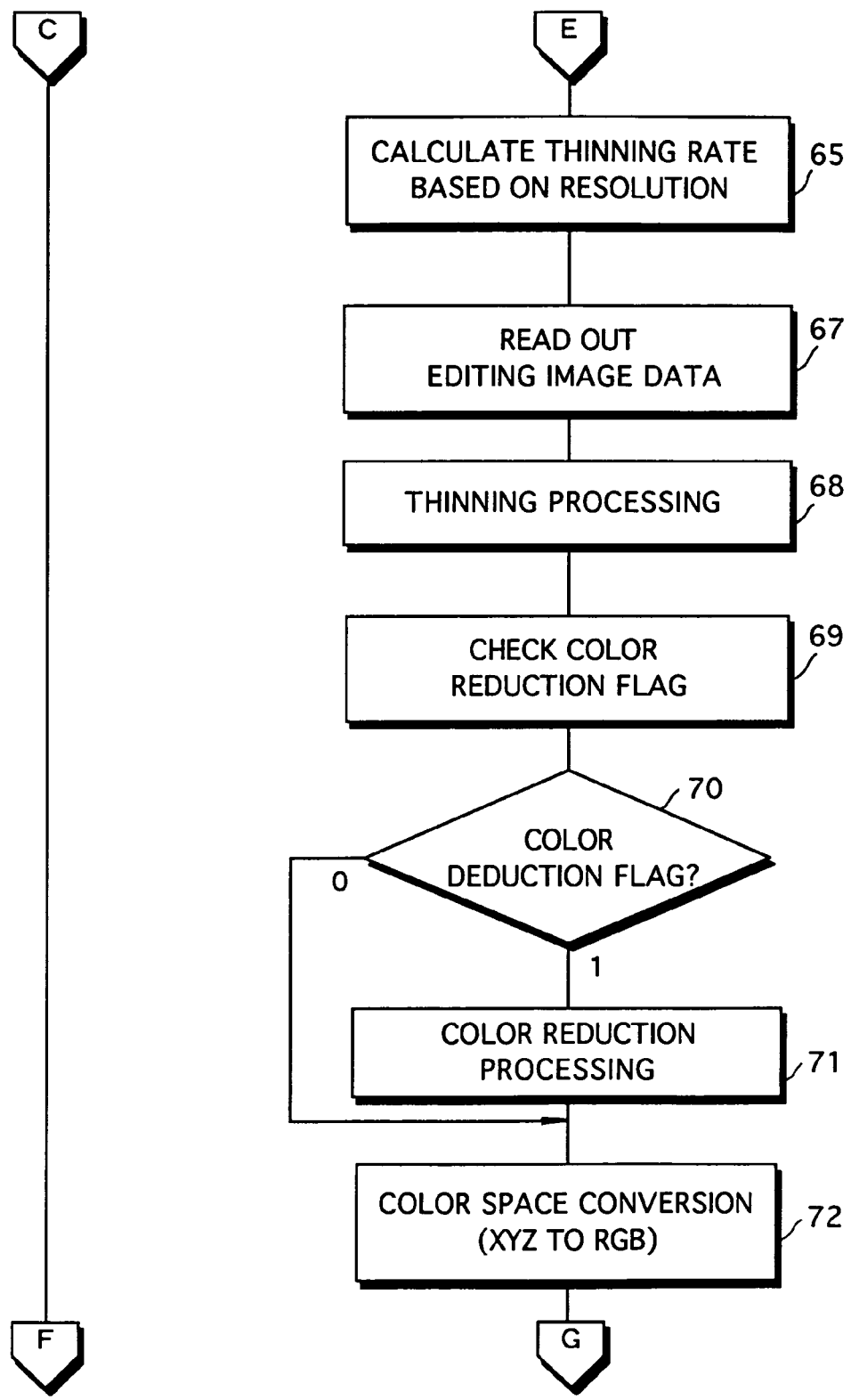
Figure 7:
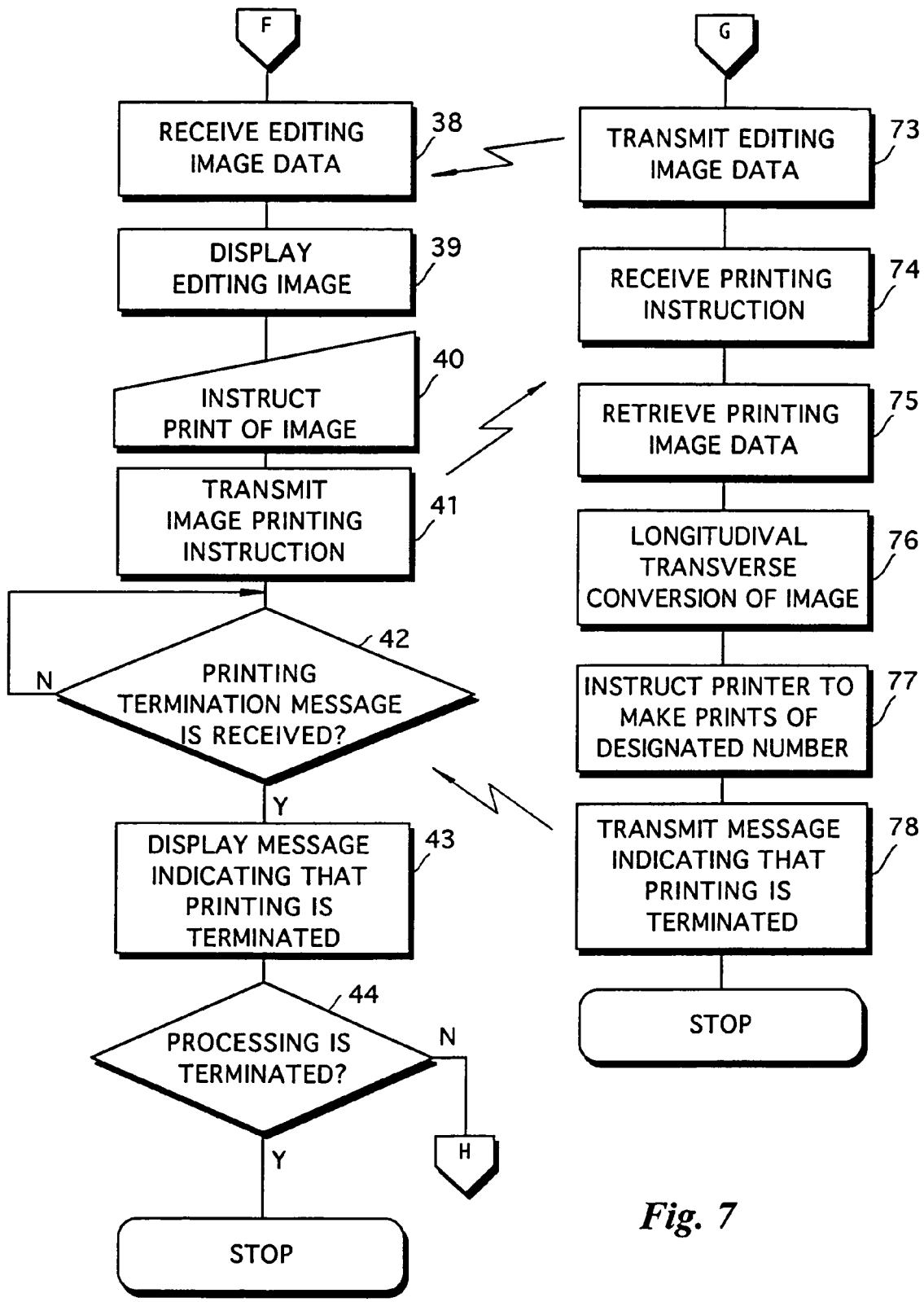

In a case where image data represented by the XYZ system is converted to image data represented by the RGB system to be supplied to a display device, the coefficients $a_r$, $a_g$ and $a_b$ are calculated in accordance with the equation (2) using the white points $X_w$ and $Y_w$ ($Z_w$ is obtained from $X_w$ and $Y_w$) and three stimulus values for primaries $X_r$, $Y_r$ ($Z_r$ is obtained from, $X_g$ and $Y_g$) and $X_b$, $Y_b$ ($Z_b$ is obtained from $X_b$ and $Y_b$) which conform to characteristics of the display device. The conversion coefficient matrix in the equation (1) is expressed by these stimulus values and the coefficients $a_r$, $a_g$ and $a_b$. Accordingly, the image data of RGB system which conforms to the characteristics of the display device is obtained from the image data of XYZ system in accordance with the equation (1) (the processing of step 72 in FIG. 6 described later).

There is a relationship expressed by an equation (3) between an input voltage V and luminance I in a display device.

$$I=KV^\gamma \quad \text{Eq. (3)}$$

Consequently, in order to display an image on the display device, the image data of the RGB system needs to be subjected to reverse gamma (γ) correction. Generally, the gamma characteristics varies in dependence upon types of display devices.

Described in the monitor information table shown in FIG. 2 are white points, three stimulus values for primaries and γ characteristics in correspondence (refereed to as monitor information) to a plurality of types of monitor display devices (inclusive of a standard type).

In a case where, on the basis of image data represented by the XYZ system, an image represented by the image data is printed by a printer (the high-quality printer 18), the image data of the XYZ system (space) is also converted to image data of the RGB system (space) or the three primaries system (space) (e.g., Cyan, Yellow and Magenta). Since a printer has generally non-liner characteristics, the image data of the XYZ system is converted to the primaries system (e.g., the RGB system) using a conversion table (for example, three dimensional look up table (LUT)) (which are previously stored in a memory of the image input/output work station 15). Of course, first the image data of the XYZ system is converted to the image data of the primaries (RGB) system in accordance with the equations (1) and (2), and then the image data of the primaries system is subjected to non-linear conversion in dependence upon the printer characteristics.

In this way, on one hand the image data of the XYZ system is converted to the image data of the RGB system in consideration of the characteristics of a monitor display device to be used for display, and on the other hand the image data of the XYZ system is converted to the image data of the RGB (primaries) system in consideration of the characteristics of a high-quality printer to be used for printing, the image displayed on the display device and the image obtained by printing in the printer match (coincide) with each other in color.

The image data outputted from the film scanner 17 or the reflection type scanner 16 is one which is represented by the RGB system. White points and three stimulus values which conform to characteristics of the scanner are stored in the memory of the image input/output work station 15. The image data of the RGB system is converted to the image data of the XYZ system in accordance with the equations (1) and (2) using the above white points and three stimulus values. This is the color space conversion processing in step 25 of FIG. 3 described above.

Figure 8:
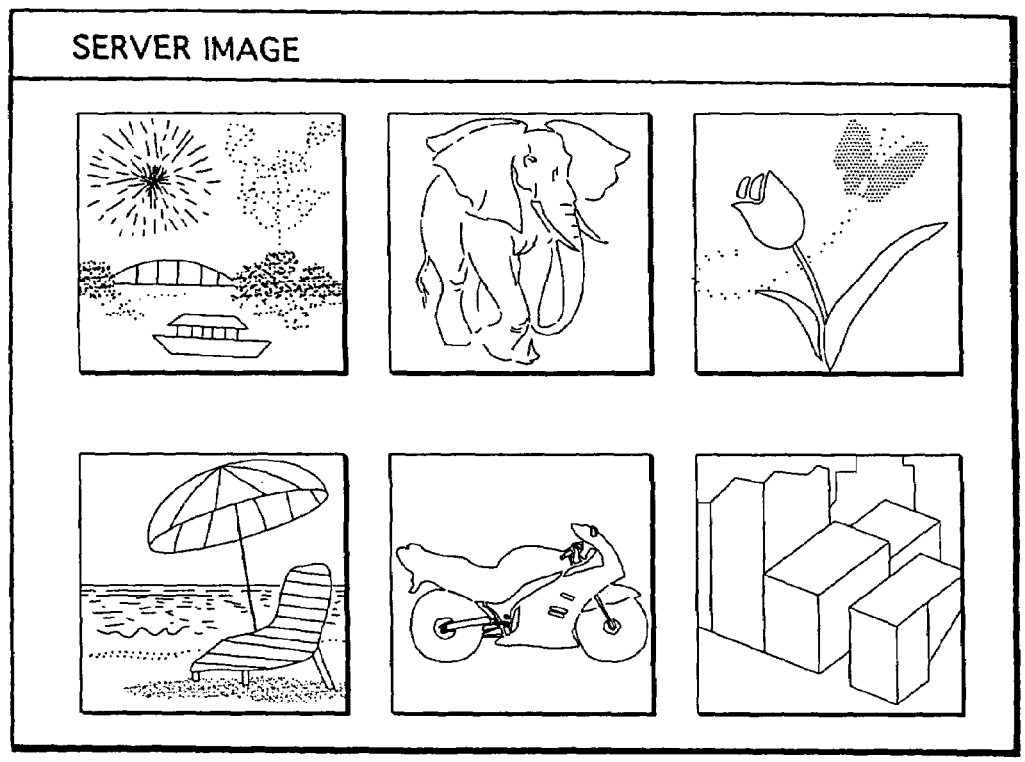
FIGS. 8 and 9 illustrate examples of a display screen of a monitor display device connected to a client computer.
Figure 9:
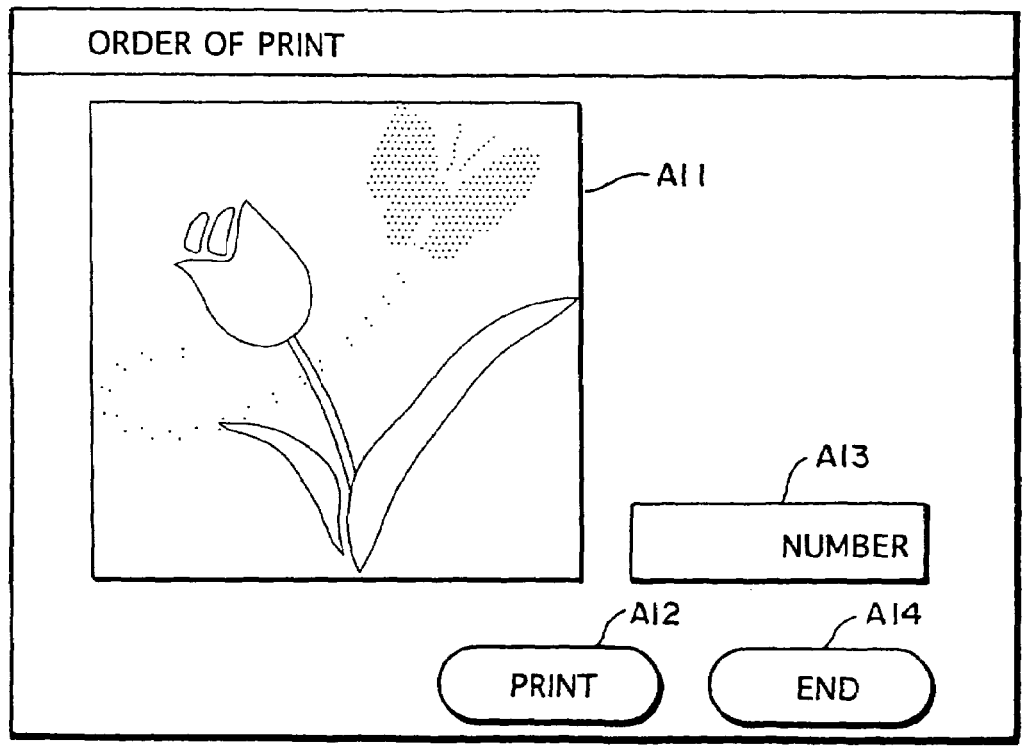

FIGS. 4 to 7 are flow charts showing the procedure for data transmission/receiving processing performed between the client computer 1 and the image server 10. FIGS. 8 and 9 illustrate examples of images displayed on a display screen of the monitor display device in the client computer 1.

When the client computer 1 and the image server 10 are connected to each other via an internet, data representing a request to transmit thumbnail image data (inclusive of data representing the file name) and data representing a TCP/IP address for specifying the client computer 1 are transmitted from the client computer 1 to the image server 10 (step 31).

When the image server 10 receives the data representing the request to transmit reduced image data and the data representing the TCP/IP address for specifying the client computer 1 (step 51), the storage location where the thumbnail image data is saved is read out of the image/device information database 12 and the thumbnail image data is searched in the image saving disk array 11 (step 52). When the thumbnail image data is found in the image saving disk array 11 connected to the image server 10, the found thumbnail image data is transmitted to the client computer 1 specified by the TCP/IP address (step 53). When no corresponding reduced image data is retrieved from the image saving disk array 11, error data is transmitted to the client computer 1 specified by the TCP/IP address.

The client computer 1 receives the thumbnail image data transmitted from the image server 10 (step 32). A list of thumbnail images represented by the received thumbnail image data is displayed on the monitor display device connected to the client computer 1, as shown in FIG. 8 (step 33).

The user of the client computer 1 moves a cursor onto the image, which the user desires to print, out of the plurality of thumbnail images which are displayed on the monitor display device, and clicks. Consequently, the image to be printed is selected. When the image to be printed is selected, data representing the file name of the thumbnail image of the image to be printed, data representing information relating to the monitor display device connected to the client computer 1 (data representing the type of the monitor display device, data representing the resolution of the monitor display device connected to the client computer 1 and the number of colors which can be displayed, these data being stored in the client computer 1), and data representing the TCP/IP address for specifying the client computer 1 are transmitted from the client computer 1 to the image server 10 (step 35).

The image server 10 receives the data representing the file name of the selected thumbnail image, the data representing the monitor display device information, and the data representing the TCP/IP address which have been transmitted from the client computer 1 (step 54).

The image server 10 retrieves editing image data corresponding to the data representing the selected thumbnail image from the image saving disk array 11 by referring to the image/device information database 12 (step 55).

If the editing image data related to the selected thumbnail image cannot be found in the image saving disk array 11 (NO at step 56), error data is transmitted to the client computer 1 specified by the received TCP/IP address (step 57).

When the client computer 1 receives the error data transmitted from the image server 10 (YES at step 36), an error is displayed on the monitor display device connected to the client computer 1, and it is reported to the user of the client computer 1 that an error occurs (step 37). If necessary, the user accesses the image server 10 again.

When the editing image data is found in the image saving disk array 11 (YES at step 56), the monitor display device information which has been transmitted from the client computer 1 is analyzed (step 58).

The type and resolution of the monitor display device of the client computer 1 and the number of colors which can be displayed are recognized by the analysis of the monitor display device information. The type, resolution and the number of colors of the monitor display device are stored in the memory contained in the image server 10 (step 59).

In a case where the number of colors of an image represented by the editing image data is not less than the number of colors which can be displayed on the monitor display device of the client computer 1, all the colors of the image represented by the editing image data cannot be displayed on the monitor display device of the client computer 1 even if the editing image data stored in the image saving disk array 11 is transmitted as is to the client computer 1. In such a case, even if the entire editing image data stored in the image saving disk array 11 is transmitted as is to the client computer 11, it is a waste of time for transmission. If the number of colors of the image represented by the editing image data stored in the image saving disk array 11 is not less than the number of colors which can be displayed on the monitor display device of the client computer 1 (YES at step 60), a color reduction flag is set to "1" and the number of colors which can be displayed on the monitor display device of the client computer 1 is stored (step 61). The number of colors of the image represented by the editing image data is decreased to the number of colors which can be displayed on the monitor display device connected to the client computer 1 as described later (color reduction processing).

Furthermore, the monitor information table of the image/device information database 12 is searched on the basis of the display device information (the type of the monitor display device) transmitted from the client computer 1, and it is judged whether or not the monitor information relating to the corresponding monitor display device is stored in the image/device information database 12 (step 62).

When the monitor information relating the type of the monitor display device of the client computer 1 is stored in the image/device information database 12 (the monitor information table) (YES at step 62), the monitor information is read out of the image/device information database 12, and is temporarily stored in the memory contained in the image server 10 (step 64). If the monitor information relating to the corresponding monitor display device is not stored in the image/device database 12 (NO at step 62), the monitor information relating to the standard monitor display device is read out of the monitor information table and is temporarily stored in the memory contained in the image server 10 (step 63).

Furthermore, a thinning rate for changing the resolution of the editing image data to the resolution of the image displayed on the monitor display device is calculated (step 65).

The monitor display information temporarily stored in the memory contained in the image server 10 is then read out (step 66).

The editing image data stored in the image saving disk array 11 and corresponding to the selected thumbnail image is read out, and is temporarily stored in the image server 10 (step 67). The thinning processing of the read editing image data is performed in the image server 10 such that the resolution thereof becomes a resolution corresponding to or equal to the resolution of the monitor display device connected to the client computer (step 68). The data quantity of the editing image data is reduced, so that the editing image data can be rapidly transmitted.

A check is then made to see whether or not the color reduction flag is set (step 69). If the color reduction flag is set (step 70), it is indicated that the number of colors which can be displayed on the monitor display device of the client computer 1 is less than the number of colors of the image represented by the editing image data. Even if the editing image data is transmitted as is to the client computer 1, it is a waste of time for transmission, so that color reduction processing of the editing image data is performed (step 71). The color reduction processing will be described in detail later. Unless the color reduction flag is set, all the colors of the image represented by the printing image data can be displayed as they are on the monitor display device connected to the client computer 1, so that the color reduction processing is skipped. Since the color reduction processing is performed depending on the number of colors which can be displayed on the monitor display device, the data quantity of the editing image data is reduced, so that it is feasible to rapidly transmit the editing image data.

Color space conversion processing is then performed such that a color of the image displayed on the monitor display device connected to the client computer 1 coincides with a color of the image which would be printed in the high-quality printer 18 (step 72). The color space conversion processing is that described above. Of the monitor information (white points, three stimulus values and gamma characteristics) which has been stored in the memory of the image server 10 at step 64 or step 63, the data relating to the white points and three stimulus values are used to convert the image data in the XYZ space to the image data in the RGB space in accordance with the equations (1) and (2). The color space conversion processing is effective in a case where the editing image data is represented by the XYZ system. The editing image data of the RGB system is further subjected to the reverse gamma correction using the gamma characteristics.

The editing image data which has been subjected to the color space conversion processing, the color reduction processing as required and gamma correction is transmitted from the image server 10 to the client computer 1 specified by the TCP/IP address (step 73).

The editing image data transmitted from the image server 10 is received by the client computer 1 (step 38).

When the editing image data is received by the client computer 1, an editing image represented by the received editing image data is displayed on a printing order screen of the monitor display device connected to the client computer 1, as shown in FIG. 9 (step 39). An area A11 where an editing image is displayed, an area A13 where the number of prints of an image to be printed corresponding to the editing image which is displayed on the area A11, an area A12 clicked by the user when a printing command is entered, and an area A14 clicked when printing order operation is terminated are displayed on the printing order screen shown in FIG. 9. Since the editing image has been already subjected to longitudinal/transverse conversion in the image reading processing shown in FIG. 3 such that the direction of display is correct, the editing image is displayed correctly without longitudinal/transverse operation performed by the user of the client computer 1.

The user of the client computer 1 confirms the editing image which is displayed on the monitor display device of the client computer 1, and clicks the area A12 when a high-quality image corresponding to the editing image is to be printed. The user of the client computer 1 then enters the number of prints from a keyboard of the client computer 1. The entered number of prints is displayed on the area A13. When the user of the client computer 1 clicks the area A14, printing instruction operation is terminated (step 40).

Data representing the file name of the editing image corresponding to the image to be printed, data representing the TCP/IP address for specifying the client computer 1, and data representing the number of prints are transmitted from the client computer 1 to the image server 10 as data representing an image printing instruction (step 41).

When the data representing the image printing instruction is received by the image server (step 74), printing image data is retrieved out of the image saving disk array 11 on the basis of the data representing the file name of the editing image data included in the data representing the image printing instruction (step 75). Longitudinal/transverse information relating to the found printing image data is read out of the image/device information database 12, and the printing image data is subjected to longitudinal/transverse conversion such that the printing image represented by the printing image data is correctly printed on printing paper which is set in the high-quality printer 18 (step 76).

The printing image data is transmitted from the image server 10 to the image input/output work station 15, and a high-quality image which is represented by the printing image data is printed by the high-quality printer 18 under control of the image input/output work station 15 (step 77).

Since the printing image data is represented by the XYZ system, the color space conversion from the XYZ space to the RGB space conforming to the characteristics of the high-quality printer 18 is performed in the image server 10, the image input/output work station 15 or the high-quality printer 18 as described above, and the printing is made by the high-quality printer 18 using the printing image data which has been converted to the RGB system. When the image printing of the instructed number of prints is completed by the high-quality printer 18, a message indicating that printing is terminated is transmitted from the image input/output work station 15 to the image server 10. As a result, the message indicating that printing is terminated is transmitted from the image server 10 to the client computer 1 (step 78).

When the client computer 1 receives the message, which has been transmitted from the image server 10, indicating that printing is terminated (step 42), the message indicating that printing is terminated is displayed on the monitor display device connected thereto (step 43). When there is still another to be printed, the processing at the step 34 and the subsequent steps is repeated again (step 44).

The color reduction processing (processing for reducing the number of colors) performed in the image server 10 (the processing at step 71) will be described.

Assume that the image represented by the editing image data stored in the image saving disk array 11 is in full color (the number of colors is approximately 16,000,000), and the maximum number of colors which can be displayed on the monitor display device connected to the client computer 1 is 256 will be described.

There are 256 colors (tones or levels) for each primary (color) in full color so that the number of the all combinations of the three primaries is about 16,000,000 (256×256×256). A color reduction table (pallet) describes 256 colors in the monitor display device and combinations of colors (tone or levels) of three primaries in full color (limited to 256 combinations) in correlation therebetween. If one color in the full color is given, one combination which is the closest to the given color is selected among the combinations of the colors of three primaries described in the color reduction table. A color of the monitor display device which is correlated with the selected combinations of colors of three primaries is read out of the color reduction table. This is the color reduction processing from the full color to 256 colors of the monitor display device using the color reduction table.

In a case where the color reduction processing (the processing at step 71) is performed, image data obtained by the color reduction processing (image data in 256 colors, for example) is subjected to the color space conversion processing (the processing at step 72). In a case where the color reduction processing is not performed, image data which is not subjected to the color reduction processing (image data in full color, for example) is subjected to the color space conversion processing.

Although in the above-described embodiment, the processing for reducing the resolution of the editing image data and the color reduction processing are performed in accordance with the information relating to the monitor display device transmitted from the client computer 1, the processing for reducing the resolution and the color reduction processing may be performed in response to an instruction inputted by the user of the client computer 1.

(B) Second Embodiment

FIGS. 10 to 14 illustrate a second embodiment. In the second embodiment, communication of image data is established between an image server 10 and a client computer 1 or the television set 1A which can be connected to an internet (see FIG. 1). A user selects a tonality (a color tone) off an image which suits the taste of the user and the image having the selected tonality is displayed on the monitor display device of the client computer 1 or the television set 1A which can be connected to an internet.

When the tonality adjustment or tonality changing is performed in the television set 1A, which can be connected to the internet, containing a CPU with a low processing speed, it takes long time to perform the tonality adjusting or changing processing, so that time required until an image is displayed is lengthened. In the present embodiment, therefore, it is judged whether a device requiring image data of the image server 10 is a device having a CPU capable of performing high-speed processing, for example, the client computer 1 or a device having a CPU performing low-speed processing, for example, the television set 1A.

In the case of the device having a CPU capable of performing high-speed processing, for example, the client computer 1, the client computer 1 performs the adjusting processing. In the case of the device which performs low-speed processing, for example, the television set 1A, the image server 10 performs the tonality adjusting processing. Even when image data is transmitted from the image server 10 to the device having a CPU with a low processing speed, for example, the television set 1A, therefore, an image can be rapidly displayed.

Figure 10:
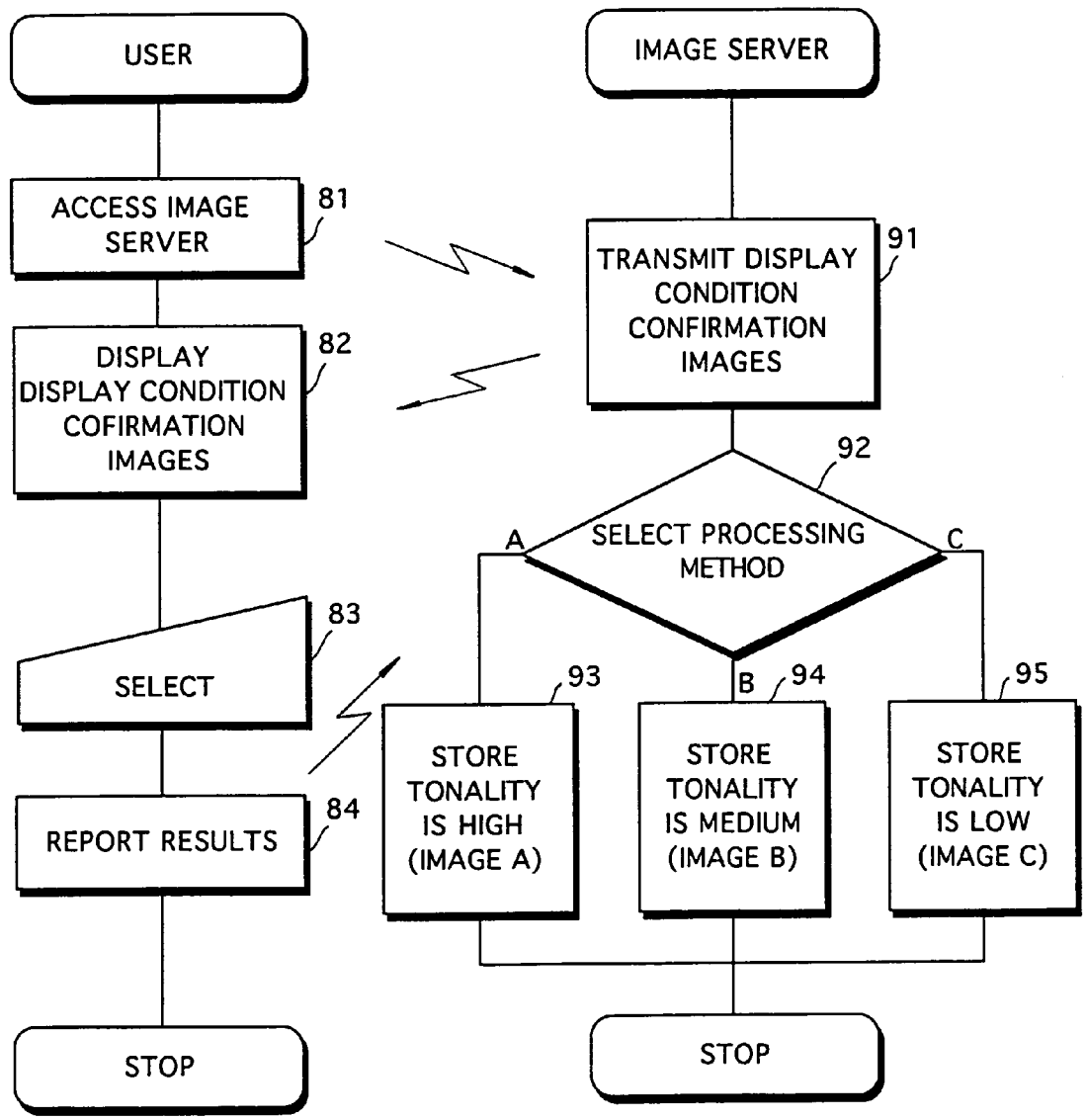
FIGS. 10 to 14 relate to the second embodiment of the present invention.
Figure 11:
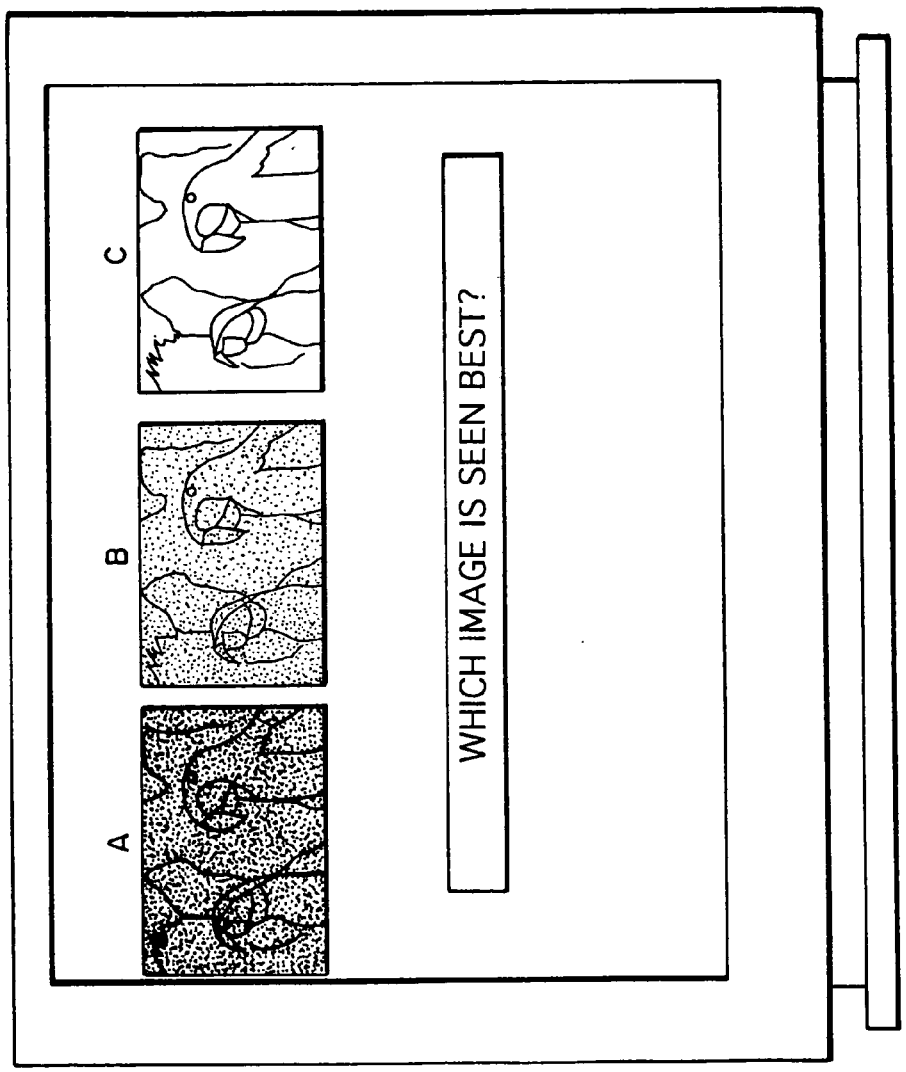

FIG. 10 is a flow chart showing the procedure for processing of causing a user of the client computer 1 or the television set 1A to select an image having a tonality (a color tone) suiting the taste of the user. FIG. 11 illustrates one example of a display screen displayed on the monitor display device connected to the client computer 1 or the television set 1A.

The client computer 1 or the television set 1A is first connected to the internet, so that the user accesses the image server 10 (step 81).

A plurality items of image data which represent the same sample image and respectively have different tonalities are stored in an image/device information database 12 connected to the image server 10. When the client computer 1 or the television set 1A accesses the image server 10, the plurality items of image data which differ in tonalities are read out of the image/device information database 12 in response to the access. The image data read out are transmitted to the client computer 1 or the television set 1A which has accessed the image server 10 (step 91).

When the image data are received in the client computer 1 or the television set 1A, a plurality of sample images A, B and C (referred to as display condition confirmation images) which are represented by the received image data and respectively have different tonalities are displayed on the monitor display device connected to the client computer 1 or the television set 1A (step 82). One example of a display screen displayed at this time is illustrated in FIG. 11. The tonality of the image A is the highest or strongest, the tonality of the image B is medium, and the tonality of the image C is the lowest or weakest. The user sees the plurality of sample images displayed on the screen, to judge which of the sample images suits the taste of the user himself or herself, and select the sample image suiting the taste of the user (step 83). If it is the client computer 1 that has accessed the image server 10, the sample image suiting the taste out of the plurality of sample images displayed on the monitor display device will be selected by being clicked. If it is the television set 1A that has accessed the image server, the sample image suiting the taste will be selected by a remote controller attached to the television set 1A.

Data representing the results thus selected is transmitted to the image server 10 from the client computer 1 or the television set 1A (step 84).

The data representing the results of image selection which have been transmitted from the client computer 1 or the television set 1A is received by the image server 10. A method of processing which would be performed on image data when an image is displayed on the monitor display device of the client computer 1 or the television set 1A is determined on the basis of the data representing the selected results which has been received (step 92). For example, when the user of the client computer 1 or the television set 1A selects the sample image A whose tonality is high, data indicating that the taste of the user is an image whose tonality is high (step 93). When the user selects the sample image B whose tonality is medium, data indicating that the taste of the user is an image whose tonality is medium (step 94). Further, when the user selects the sample image C whose tonality is low, data indicating that the taste of the user is an image whose tonality is low (step 95).

Figure 12:
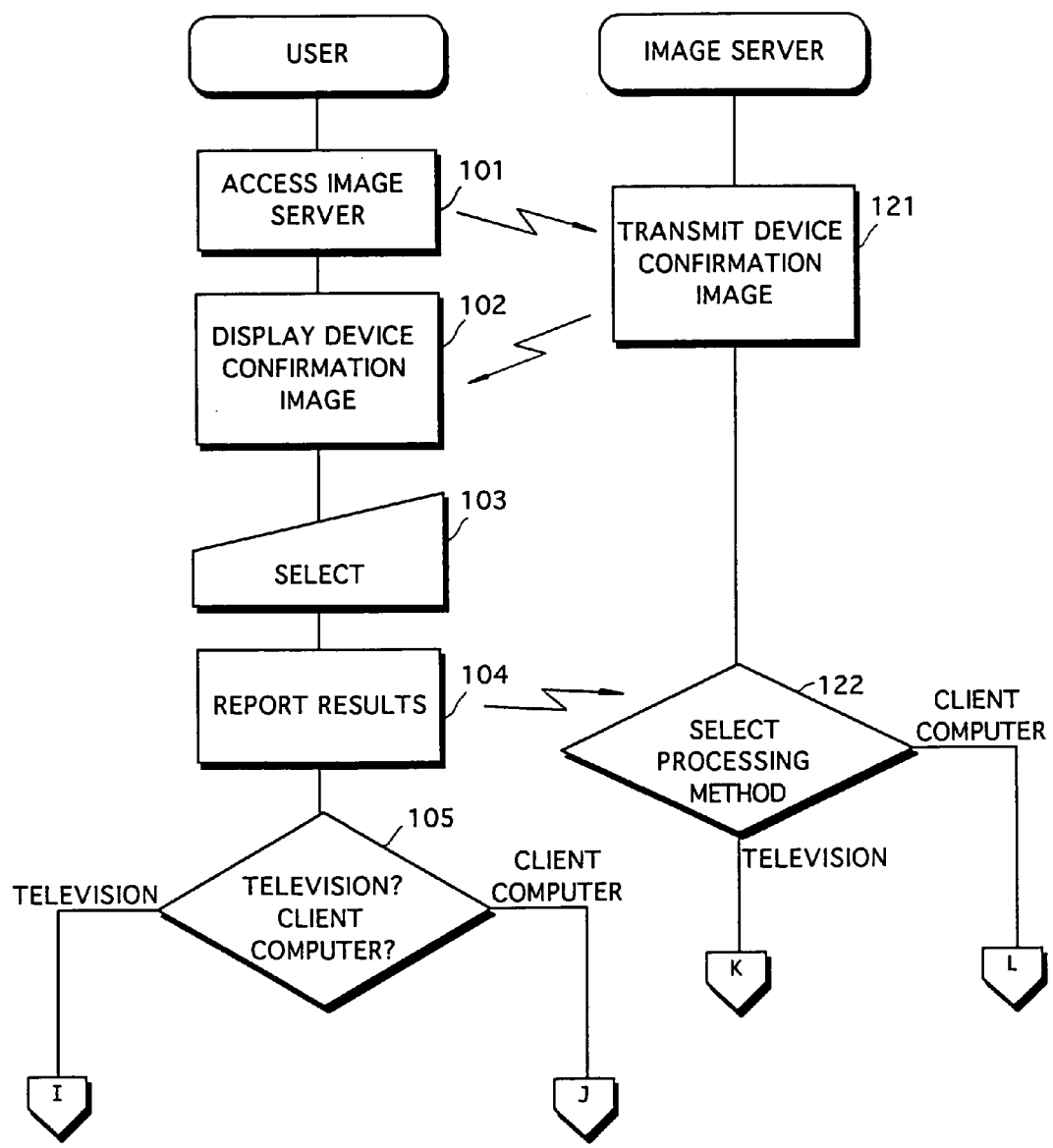
Figure 13:
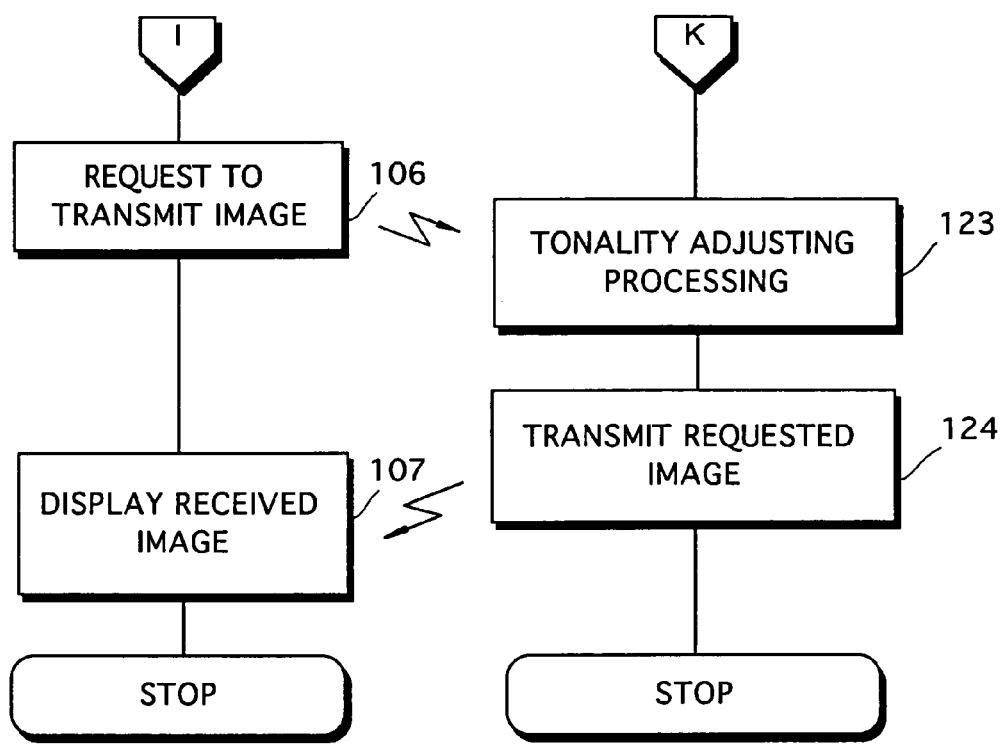
Figure 14:
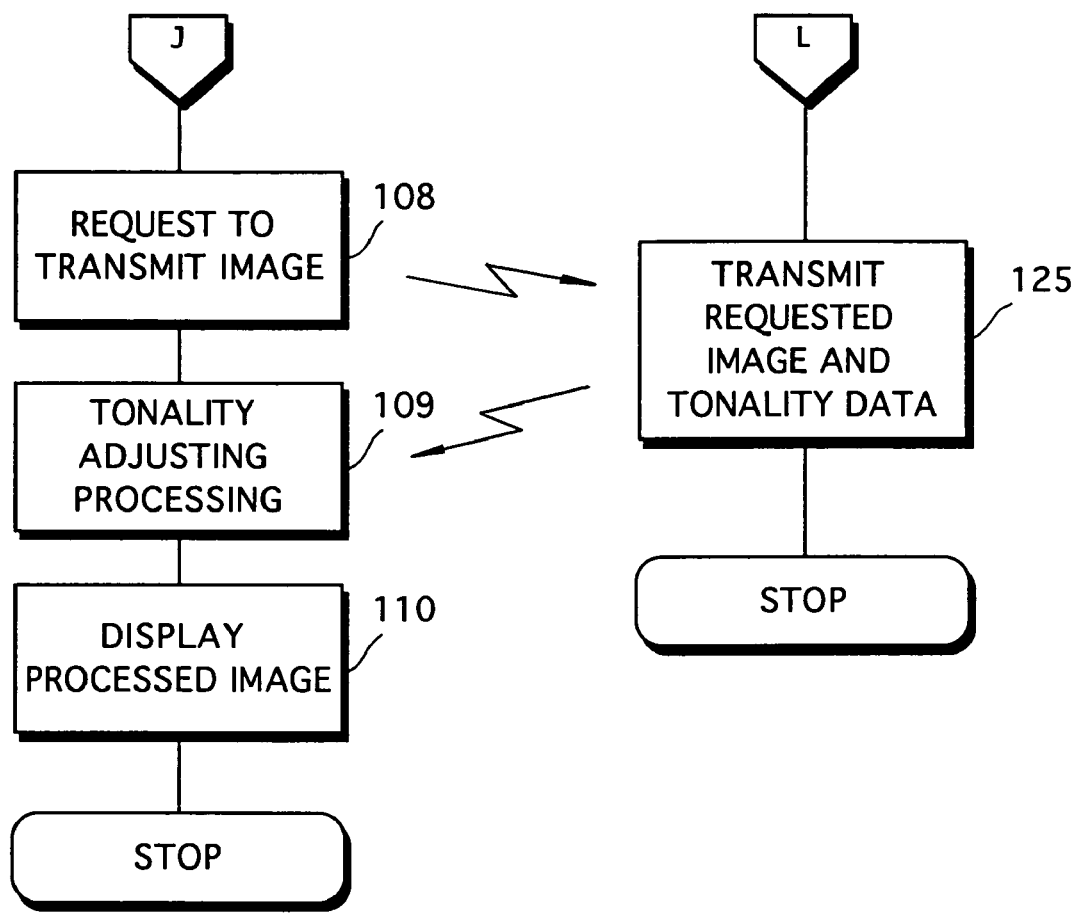

FIGS. 12 to 14 are flow charts showing the procedure for processing in a case where a request to transmit image data is issued from the client computer 1 or the television set 1A after the taste for a tonality of the user has been stored in the image server 10. If it is the client computer 1 that has issued the request to the image server 10, image processing for changing the tonality into a tonality suiting the taste of the user of the client computer is performed in the client computer 1. On the other hand, if it is the television set 1A that has issued the request to the image server 10, image processing for changing the tonality into a tonality suiting the taste of the user of the television set 1A is performed in the image server 10.

The client computer 1 or the television set 1A first accesses the image server 10 (step 101).

When the image server 10 is accessed by the client computer 1 or the television set 1A, image data representing a device confirmation image is read out of the image/device information database 12. The device confirmation image is an image which make the user select one of the client computer 1 and the television set 1A (i.e., one of the device having a CPU with high processing speed and the device having a CPU with low processing speed. The image data representing the device confirmation image is transmitted to the client computer 1 or the television set 1A which has accessed the image server 10 (step 121).

When the image data representing the device confirmation image transmitted from the image server 10 is received in the client computer 1 or the television set 1A, the device confirmation image represented by the received image data is displayed on the monitor display device connected to the client computer 1 or the television set 1A (step 102). The user judges to select which of the client computer 1 and the television set 1A has accessed the image server 10 in accordance with the guidance appearing on the device confirmation image (step 103). Data representing the selected results is transmitted to the image server 10 from the client computer 1 or the television set 1A (step 104).

If it is the television set 1A that has been selected by the user (step 105), and when a request to transmit image data is issued to the image server 10 from the television set 1A

(step 106), the image server 10 performs the processing of changing or adjusting the tonality of the image data which is to be transmitted to the television set 1A such that the image suits the taste of the user of the television set 1A (step 123). The tonality adjusting processing is a processing in which levels or tones of the R, G and B data constituting the image data are changed or adjusted while the ratios among the R, G and B data are kept constant. Image data which has been subjected to the tonality adjusting processing in the image server 10 is transmitted from the image server 10 to the television set 1A which has issued a request to transmit image data (step 124).

When the image data which has been already subjected to the tonality adjusting processing is received in the television set 1A, an image represented by the image data is displayed on the television set 1A (step 107). The image data is not subjected to tonality adjusting processing in the television set 1A which includes a CPU with low processing speed, so that the image can be rapidly displayed.

In a case where it is the client computer 1 that has accessed the image server 10 (step 105), when a request to transmit image data is issued to the image server 10 from the client computer 1 (step 108), the image data which has been requested is retrieved in the image server 10, and the retrieved image data and data representing a tonality suiting the taste of the user who has requested transmission of image data is transmitted to the client computer (steps 122 and 125).

In the client computer 1, the image data transmitted from the image server 10 is subjected to tonality processing on the basis of the data representing the tonality suiting the taste of the user (step 109). An image obtained by the tonality processing in the client computer 1 is displayed on the monitor display device connected to the client computer 1 (step 110).

Although description was made of a case where the processing performed in the image server or the client computer 1 is tonality adjusting processing, the processing is not limited to the tonality adjusting processing. For example, it is possible to perform desired image processing such as γ correction processing, contrast correction processing, saturation emphasis processing, edge emphasis processing or alteration of the size of a displayed image in the image server or the client computer.

(C) Third Embodiment (1) Configuration of Image Communication System

Figure 15:
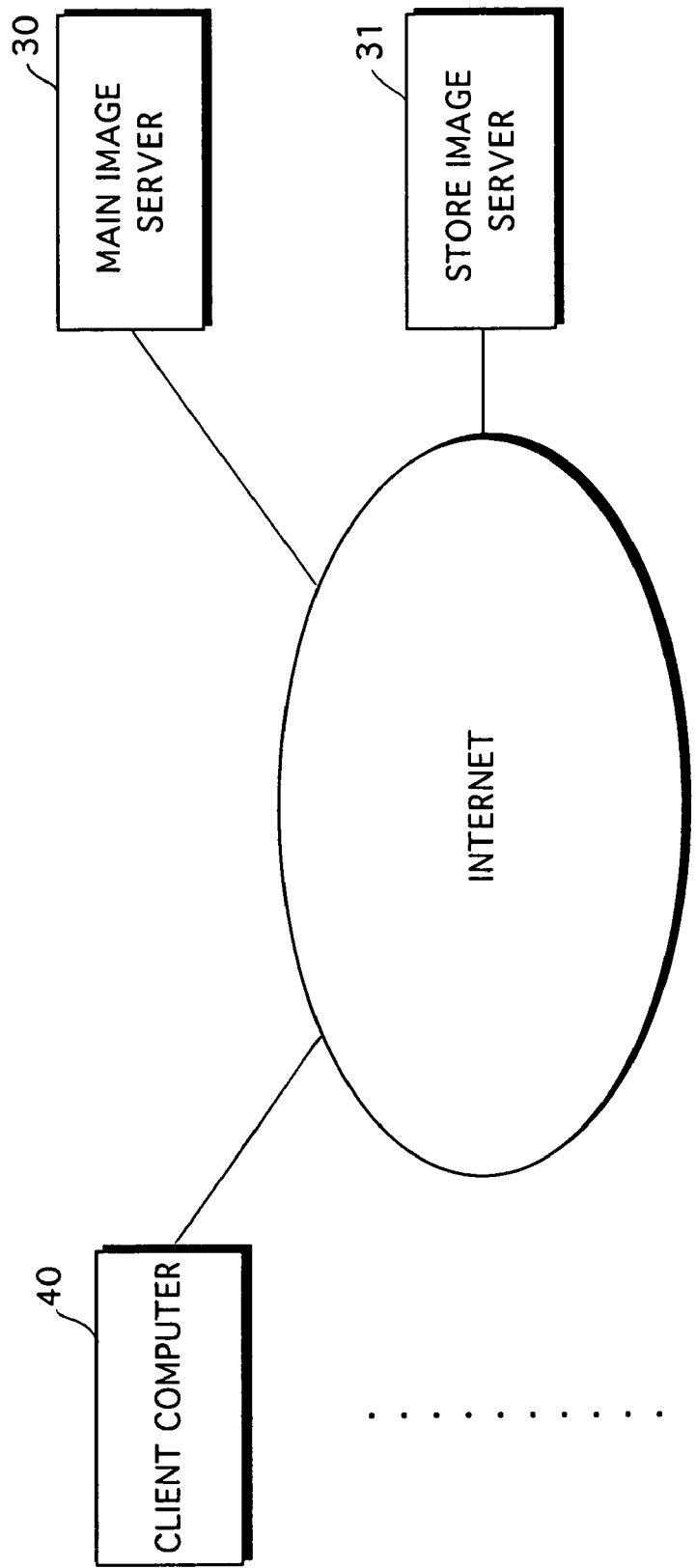
FIG. 15 illustrates the overall outline of an image communication system according to the third embodiment.

FIG. 15 illustrates the overall configuration of an image communication system according to a third embodiment of the present invention.

In the image communication system, a plurality of client computers 40 (only one client computer is illustrated in FIG. 15), a main image server 30, and a store image server 31 are connected so as to be capable of communicating with one another via an internet. The store image server 31 is generally disposed in a laboratory.

In the image communication system, template image data representing a template image (editing template image data and printing template image data having a higher resolution than that of the editing template image data) is stored in the main image server 30. User image data representing a user image or user images is stored in the client computer 40. The editing template image data is transmitted from the main image server 30 to the client computer 40. In the client computer 40, the user image represented by the user image data is synthesized on the template image represented by the transmitted editing template image data. When the synthesis processing is thus performed, the user image data and synthesis information for performing the synthesis processing are transmitted from the client computer 40 to the main image server 30. A composite image is printed in accordance with synthesized image data created on the basis of the synthesis information using the printing template image data and the user image data in the main image server 30, and the printed composite image is delivered to a user of the client computer 40. The composite image is also printed in the store image server 31, as required. The details will become clear in the following description.

Figure 16:
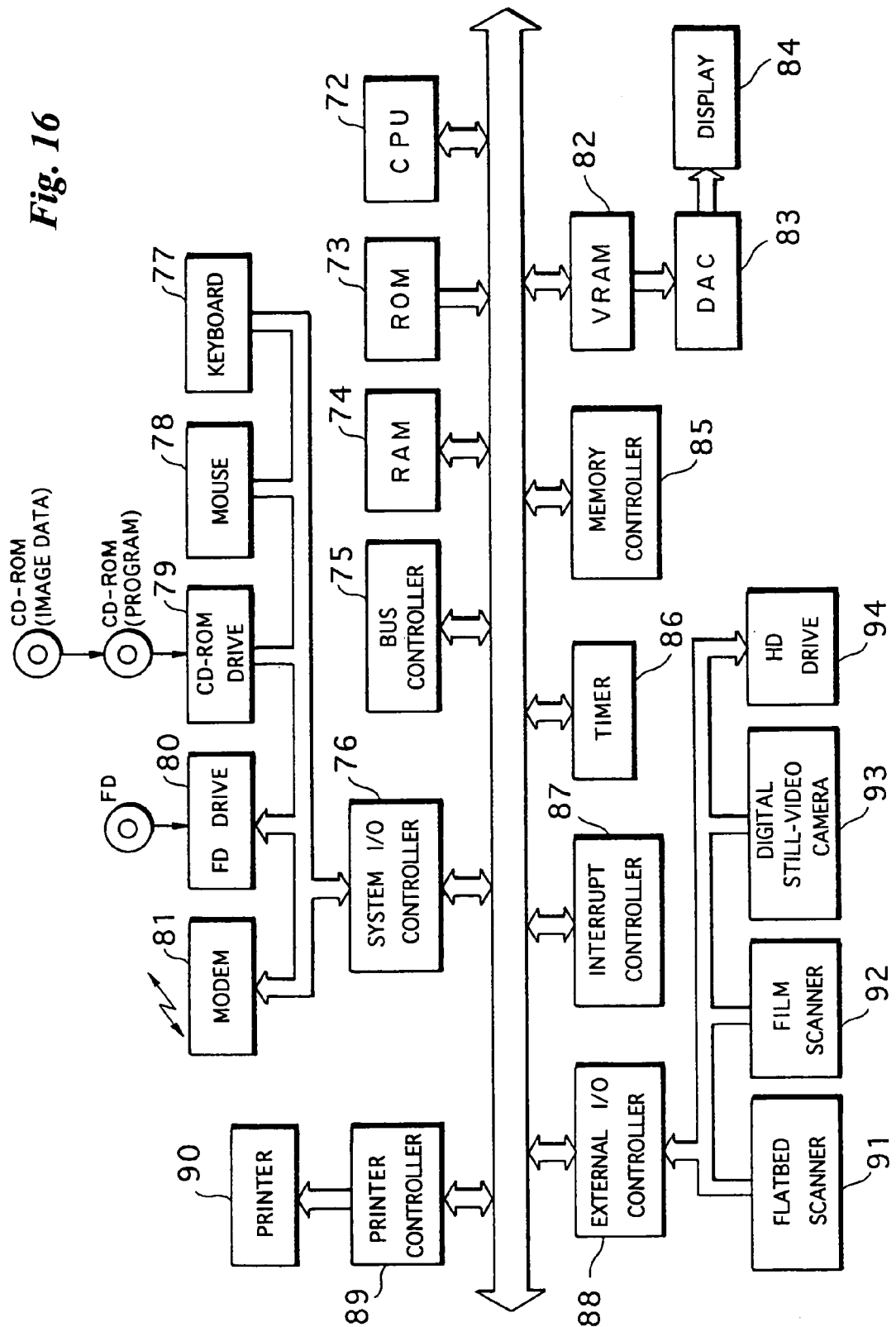
FIG. 16 is a block diagram showing the electrical configuration of a client computer.

FIG. 16 is a block diagram showing the electrical configuration of the client computer 40. The client computer 40 is usually located in the user's home.

The overall operation of the client computer 40 is supervised by a CPU 72.

The client computer 40 comprises a ROM 73, a RAM 74 for temporarily storing data, a VRAM (video RAM) 82 for storing image data (synthesized image data) representing an image displayed on a display device 84, and a memory controller 85 for controlling readout of data from the ROM 73 as well as writing and reading of data to and from the RAM 74 and the VRAM 82. The image data read out of the VRAM 82 is fed to a digital-to-analog (DA) converter 83, whereby the image data is converted into an analog video signal so that an image is displayed on the display device 84.

A bus controller 75, a memory controller 85, and a timer 86 are connected to the client computer 40.

Furthermore, a system I/O controller 76 is connected to the client computer 40. Connected to the system I/O controller 76 are a keyboard 77 and a mouse 78 for accepting operation commands from the user of the client computer 40, a CD-ROM drive 79 for reading the image data from a CD-ROM, an FD drive 80, and a modem 81 for making connection to the internet.

An external I/O controller 88 is connected to the client computer 40. A flatbed scanner 91, a film scanner 92, a digital still-video camera 93, and a HD (hard disk) drive 94 are connected to the external I/O controller 88. An execution program is read out of a hard disk (not shown) to and from which data can be written and read by the HD drive 94 (this execution program is installed in the client computer 40 and stored in the hard disk by loading a CD-ROM storing the program into the CD-ROM drive 79, and reading the program from the CD-ROM). Predetermined processing, described later, is performed by the client computer 40 upon reading out the execution program stored in the hard disk. Data representing a list of editing template images stored in the main image server is also stored in the hard disk.

Furthermore, a printer 90 for printing images and a printer control circuit 89 for controlling the printer 90 are further connected to the client computer 40.

The user uses the client computer 40, to synthesize the user image on the template image. The image synthesis processing will be described in detail later.

Figure 17:
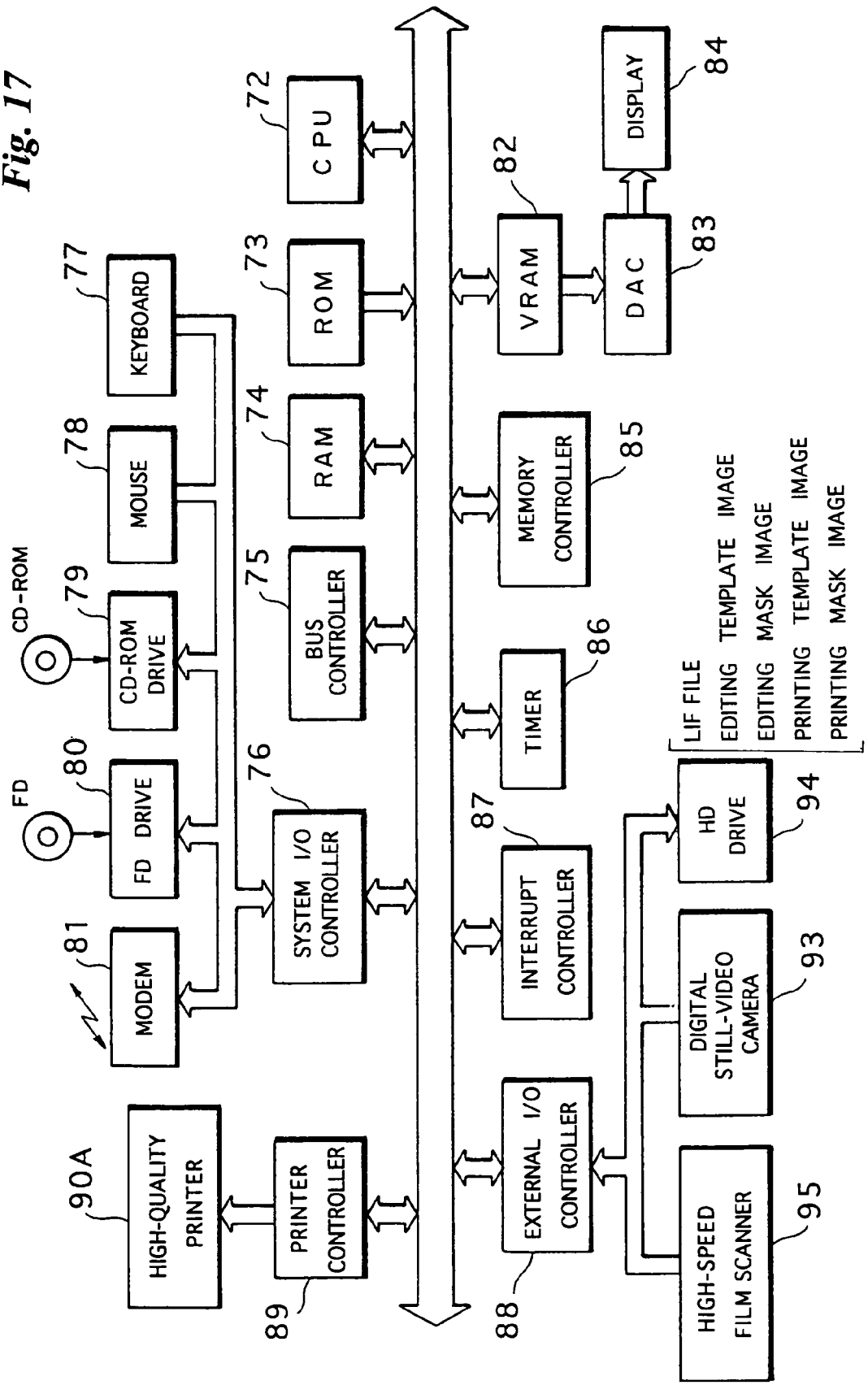
FIG. 17 is a block diagram showing the electrical configuration of a main image server.

FIG. 17 is a block diagram illustrating the electrical configuration of the main image server 30. In FIG. 17, the same components as those shown in FIG. 16 are assigned the same reference numerals and hence, the description thereof is not repeated. The store image server 31 has the same structure as that of the main image server 30. The execution program is installed in the main image server 30 (the store image server 31) and stored in the hard disk by loading a CD-ROM storing the program into the CD-ROM drive 79 and reading the program from the CD-ROM.

A high-speed film scanner 95 is connected to the external I/O controller 88 included in the main image server 30. Further, editing template image data representing an editing template image, editing mask image data representing an editing mask image, printing template image data representing a printing template image, printing mask image data representing a printing mask image, and an LIF (Layout Image File) are stored in the hard disk, to and from which data is written and read by the HD drive 94 which is connected to the external I/O controller 88.

A high-quality printer 90A capable of doing high-quality printing is connected to the main image server 30.

Figure 18:
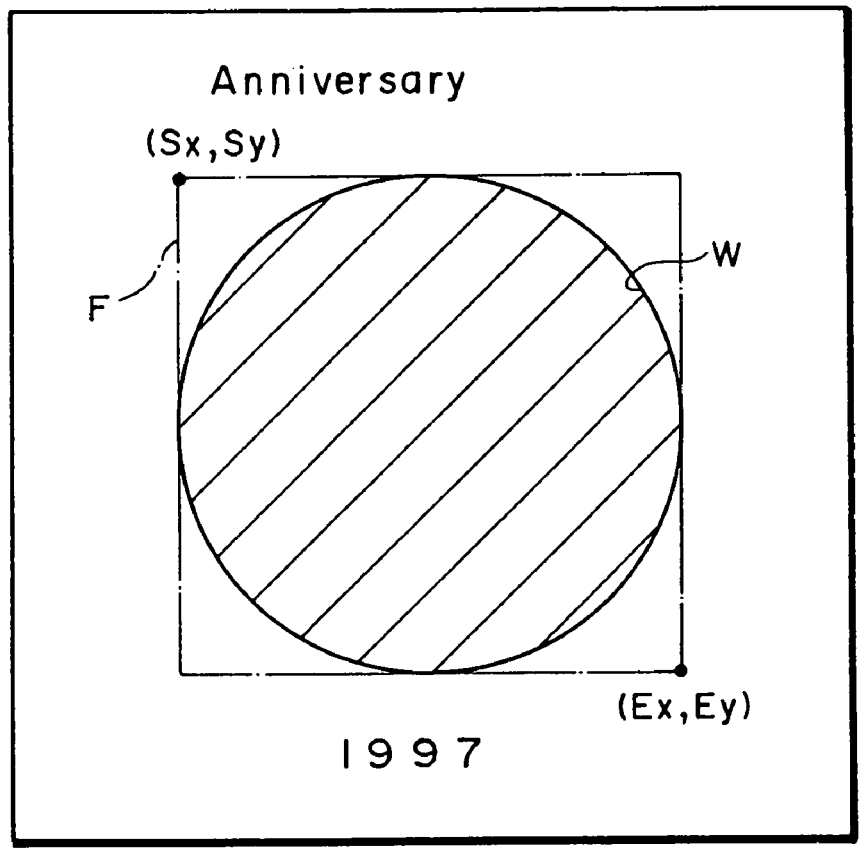
FIG. 18 illustrates one example of a template image.

FIG. 18 illustrates one example of the template image. A window W to which the user image is to be affixed is formed in the template image. Window area data $S_x$, $S_y$, $E_x$ and $E_y$ representing a rectangle F circumscribing the window W are defined in order to stipulate the position of the window W on the template image. The window area data $S_x$ and $S_y$ represent the coordinates at the upper left corner of the rectangle F circumscribing the window W, and the window area data $E_x$ and $E_y$ represent the coordinates at the lower right corner of the rectangle F circumscribing the window W.

The LIF includes addresses representing locations of the editing template image data, the editing mask image data, the printing template image data and the printing mask image data, the window area data $S_x$, $S_y$, $E_x$ and $E_y$, and an aspect ratio of the template image (asp=the width of the template image/the length of the template image), as shown in FIG. 19. The LIFs are provided for each of template images. The editing template image data, the editing mask image data, the printing template image data and the printing mask image data can be read out of the hard disk by specifying the LIF.

(2) Outline of Processing in Image Communication System

Figure 20:
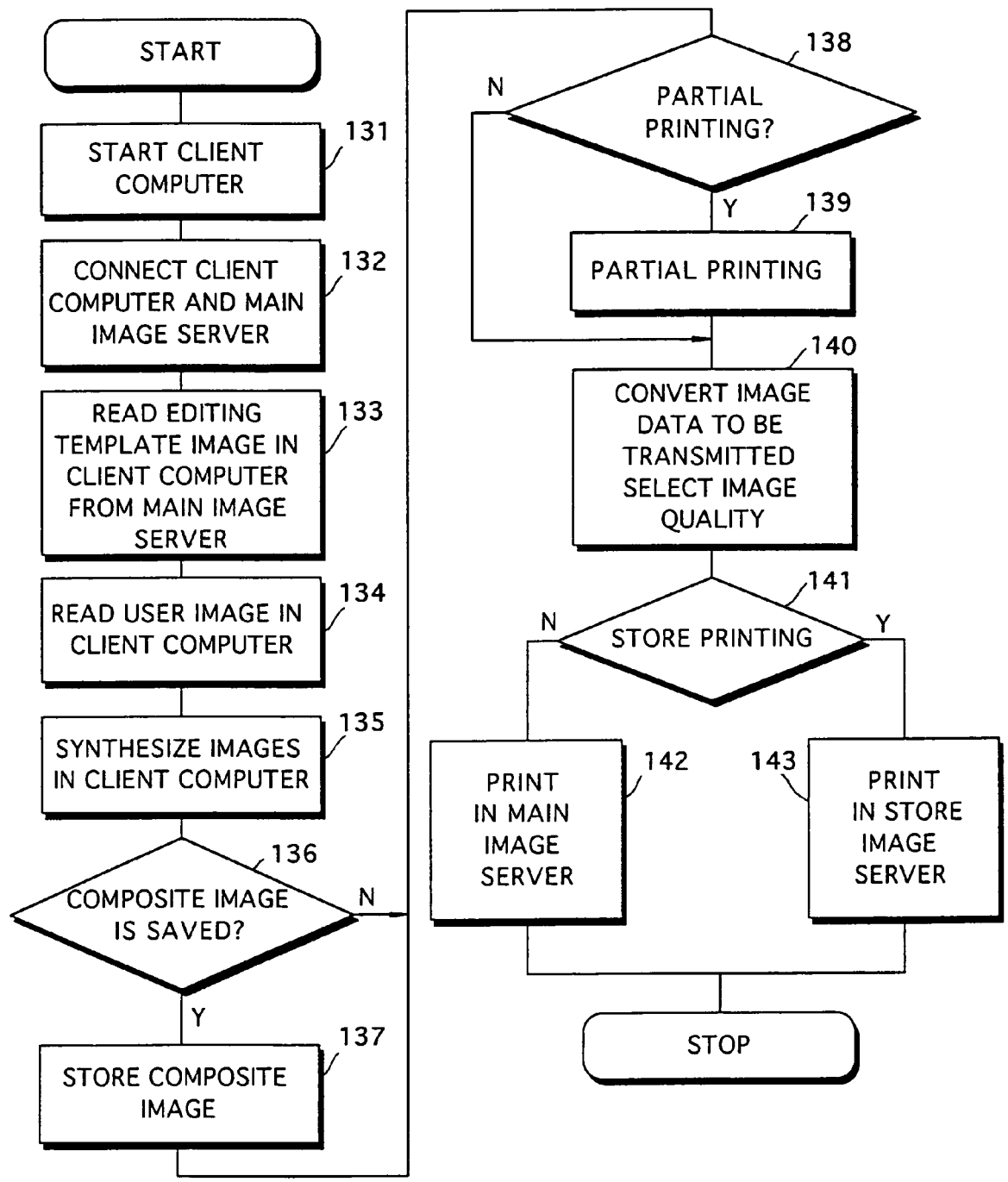
FIG. 20 is a flowchart showing the outline of the procedure for image synthesis processing.

FIG. 20 is a flow chart showing the outline of image synthesis processing performed in the image communication system.

The client computer 40 is first started by the user of the client computer 40 (step 131). The client computer 40 and the main image server 30 are connected to each other in accordance with an address of the main server 30 which is inputted or has been inputted into the client computer 40 (step 132).

When the client computer 40 and the main image server 30 are connected to each other, editing template image data representing an editing template image is read out of the hard disk in the main image server 30, and is transmitted from the main image server 30 to the client computer 40 (step 133).

Image data representing an image desired by the user (a user image) out of image data representing a plurality of images stored in the hard disk in the client computer 40 is read out of the hard disk, and is expanded on the VRAM 82 in the client computer 40 (step 134).

The editing template image represented by the editing template image data transmitted from the image server 30 and user image are synthesized in the client computer 40, so that a composite image is generated (step 135).

When composite image data representing the composite image thus generated is saved in the client computer 40 (YES at step 136), the composite image data is stored in the hard disk by the HD drive 94 (step 137).

The composite image is printed in the image server 30. A part of the composite image can be printed using the printer 90 in the client computer 40 (partial printing) (steps 138 and 139).

When the composite image is generated in the client computer 40, user image and synthesis information (information relating to an image to be transmitted) are transmitted from the client computer 40 to the image server 30 in order to print the composite image in the image server 30. Upon this transmission processing, conversion (thin-out or reducing) processing, described later, is performed such that the quantity of image data representing the user image is reduced (step 140). Since the quantity of the image data is reduced, time required to transmit the image data is shortened. Further, image quality selection processing, described later, is performed.

The composite image can be printed in the main image server 30, and can be also printed in the store image server 31 (printing in the store image server is refereed to as store printing) (step 141). In the case of the store printing, the image data representing the user image and the synthesis information are transmitted to the store image server 31 (step 143). When the store printing is not done, the user image and the synthesis information are transmitted to the main image server 30 (step 142).

The details of the image synthesis processing in the image communication system will become clear in the following description.

Figure 21:
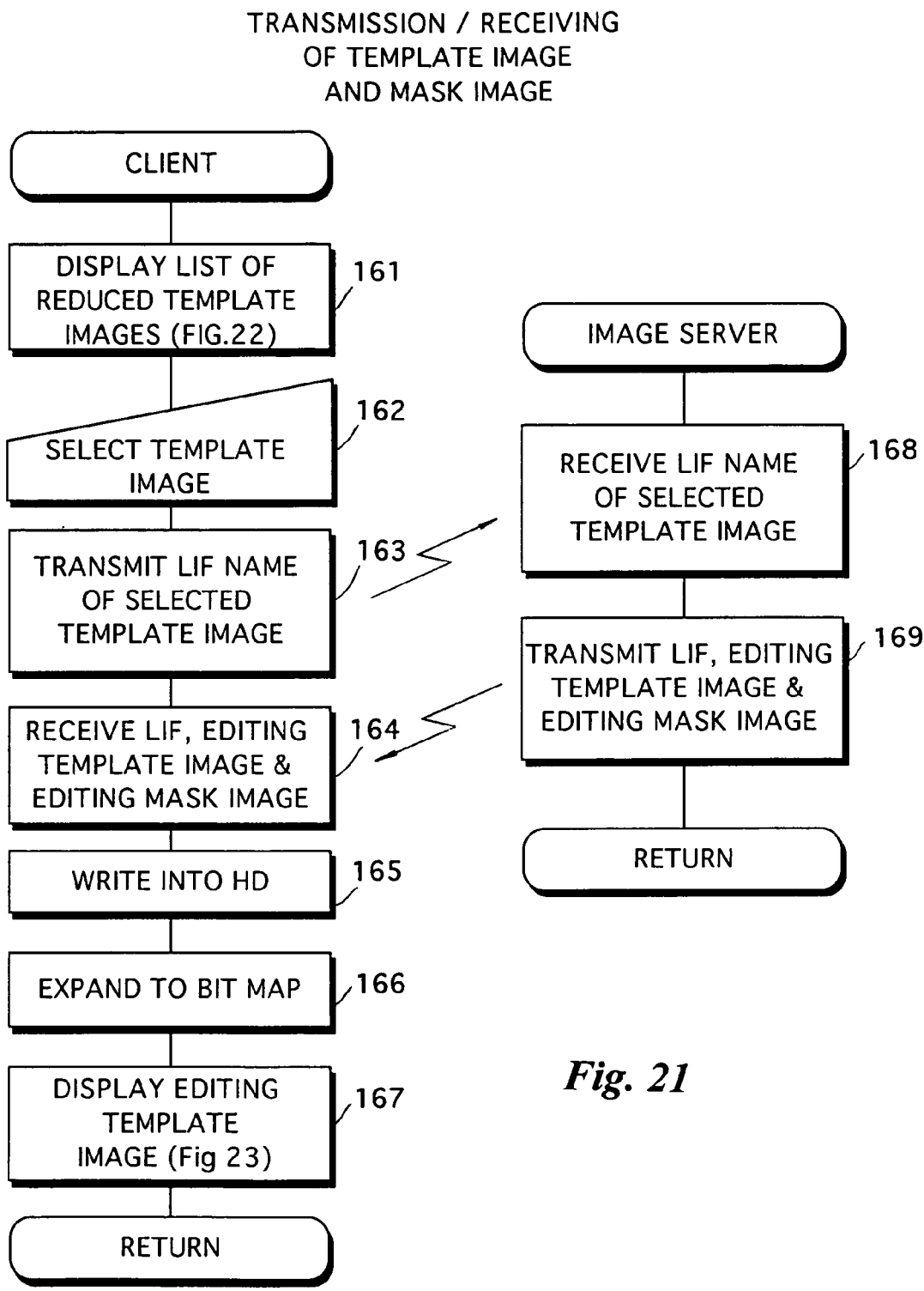
FIG. 21 shows a flowcharts of the procedure for transmission processing of template image data and mask image data which is performed between a client computer and a main image server.
Figure 22:
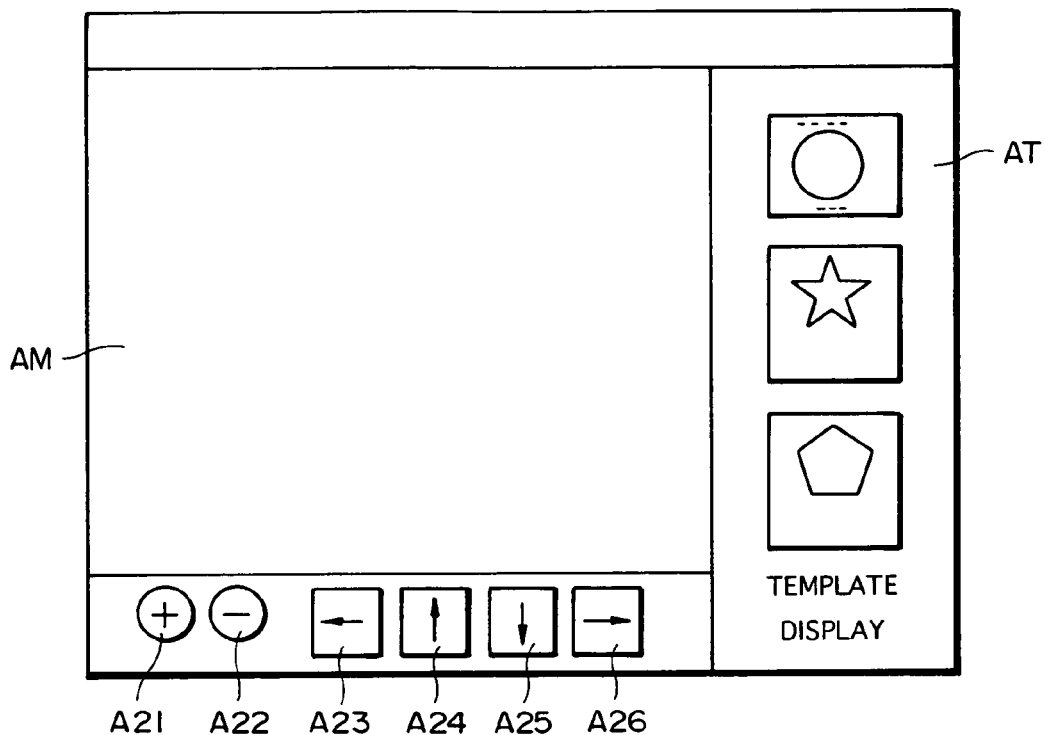
FIGS. 22 and 23 illustrate examples of a display screen of a display device in a client computer.
Figure 23:
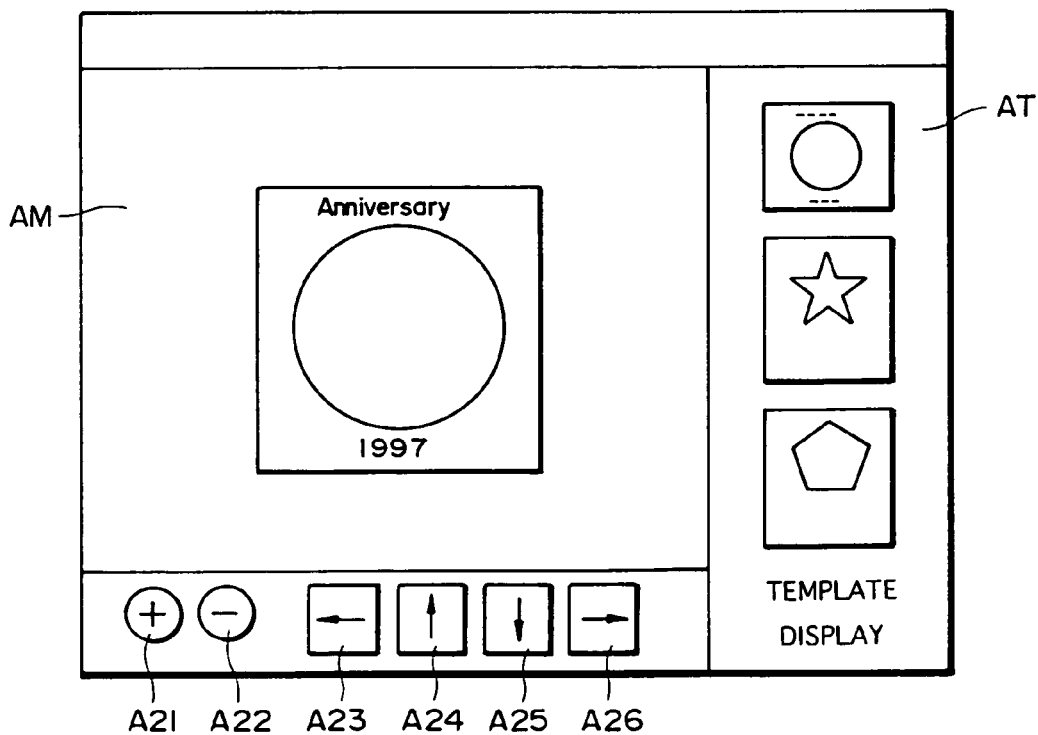

(3) Transmission Processing of Editing Template Image Data from Main Image Server to Client Computer FIG. 21 is a flow chart showing the procedure for transmission processing of editing template image data from the main image server 30 to the client computer 40 (the processing in the step 133 shown in FIG. 20). FIGS. 22 and 23 illustrate examples of screens on the display device 84 in the client computer 40.

Data representing a reduced template images is first read out of the hard disk in the client computer 40, and a list of reduced template images is displayed on the display device 84, as shown in FIG. 22 (step 161).

A composite image display area AM where a composite image is displayed and a reduced template image list display area AT where a list of reduced template images is displayed appear on the display screen of the display device 84, as shown in FIG. 22. Further, an enlargement designating area A21 clicked by a user when a user image to be synthesized is enlarged, a reduction designating area A22 clicked by the user when the user image to be synthesized is reduced, and image position adjusting areas A23, A24, A25, and A26 for adjusting the position of the user image to be synthesized are further displayed on the display screen. The user image to be synthesized is moved leftward by clicking the area A23, the user image to be synthesized is moved upward by clicking the area A24, the user image to be synthesized is moved downward by clicking the area A25, and the user image to be synthesized is moved rightward by clicking the area A26.

The desired reduced template image out of the reduced template images displayed in the area AT is clicked by the user, so that the template image is selected (step 162). When the template image is selected by the user, data representing the LIF name corresponding to the selected template image is transmitted from the client computer 40 to the maim image server 30 (step 163).

The data representing the LIF name which has been transmitted from the client computer 40 is received by the main image server 30 (step 168).

When the data representing the LIF name is received by the main image server 30, an LIF represented by the received LIF data is retrieved. When the corresponding LIF is retrieved from the hard disk, editing template image data and editing mask image data, together with the LIF, are transmitted from the main image server 30 to the client computer 40 (step 169).

The LIF, the editing template image data and the editing mask image data which have been transmitted from the main image server 30 are received by the client computer 40 (step 164). The LIF, the editing template image data and the editing mask image data which have been received are temporarily written into the hard disk by the HD drive 94 (step 165).

The editing template image data and the editing mask image data which have been temporarily written into the hard disk are read out of the hard disk, and are expanded to a bit map on the VRAM 82 (step 166). Consequently, the editing template image is displayed, as shown in FIG. 23, on the display screen of the display device 84 in the client computer 40 (step 167).

(4) Read-Out Processing of User Image in Client Computer 40

Figure 24:
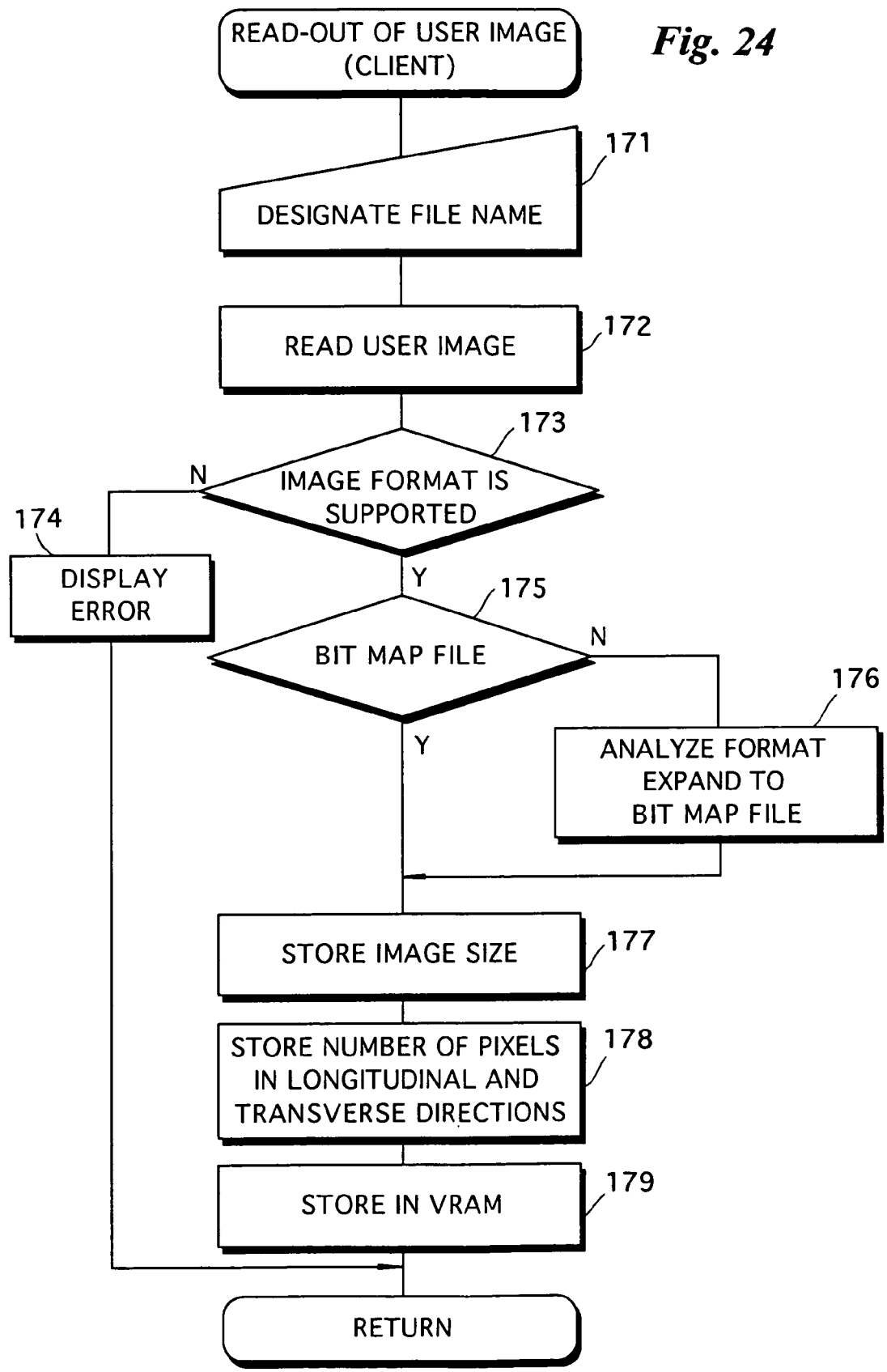
FIG. 24 is a flowchart showing reading processing of a user image in a client computer.

FIG. 24 shows the procedure for read-out processing of a user image in the client computer 40 (the processing in the step 134 shown in FIG. 20).

The user of the client computer 40 selects a user image to be synthesized on a template image by designating its file name (step 171).

Image data representing the user image which has been designated by the user is read out of the hard disk (step 172). If the image data which has been read out is image data in a format which is not supported in the client computer 40 (NO at step 173), an error is displayed on the display device 84 (step 174).

If the image data representing the user image which has been designated by the user is supported in the client computer 40 (YES at step 173), it is expanded to a bit map file (steps 175 and 176). When it is the image data that has already been expanded to the bit map file, the processing in the step 176 is skipped.

When the user image data which has been expanded (or developed) to the bit map file is obtained, the size and the respective numbers of pixels in the longitudinal direction and the transverse direction of the user image are temporarily stored (steps 177 and 178). Thereafter, the user image data is stored in the VRAM 82 (step 179), so that the user image is displayed in the composite image display area AM of the displayed screen of the display device 84. The user image is displayed on the display device 84 with the template image superimposed on the user image.

The user image data representing the user image to be synthesized on the template image is thus obtained.

(5) Image Synthesis Processing

Figure 25:
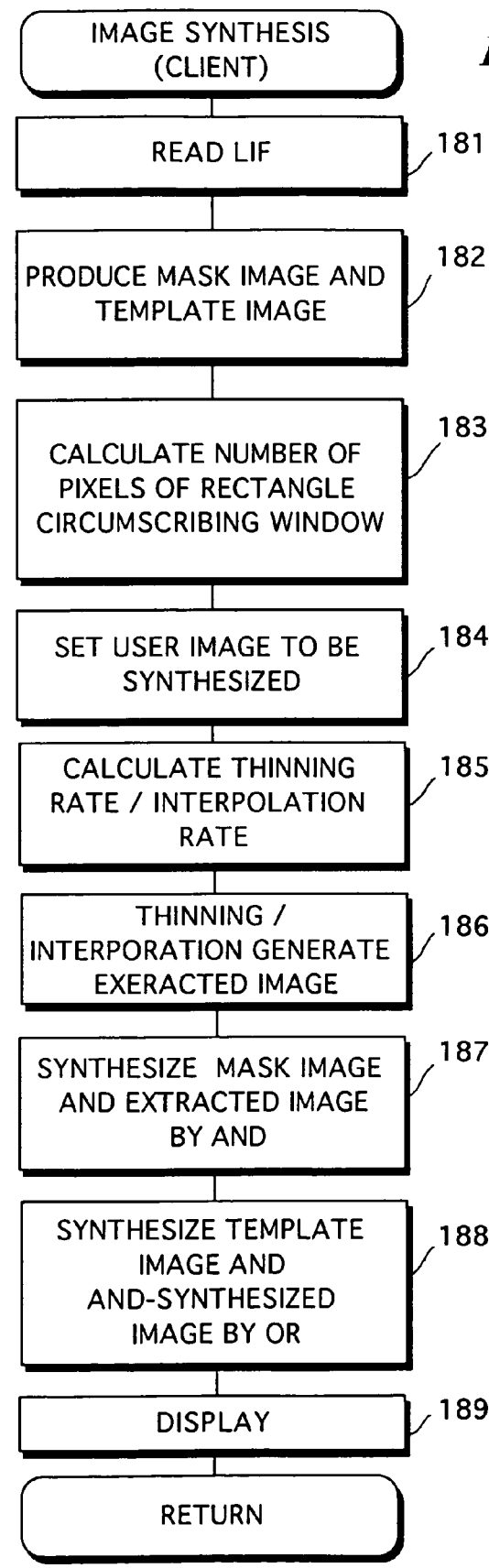
FIG. 25 is a flowchart showing image synthesis processing.
Figure 26:
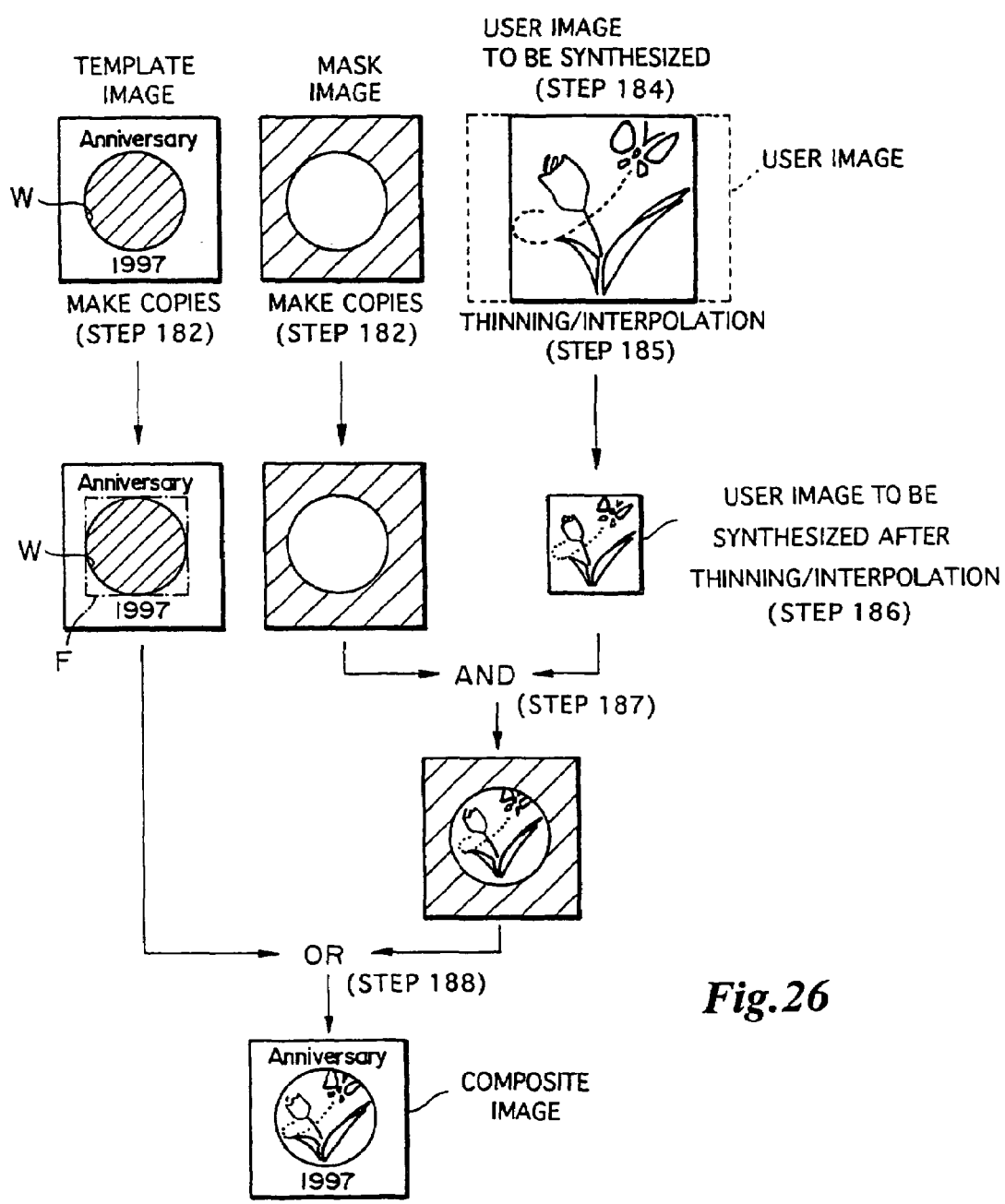
FIG. 26 illustrates image synthesis processing.

FIG. 25 is a flow chart showing the procedure for image synthesis processing (the processing in the step 135 shown in FIG. 20). FIG. 26 illustrates, in a case where image synthesis is made using a template image, a mask image and a user image, the process of the image synthesis in order to make it easy to understand the image synthesis processing.

The image synthesis processing is performed in the client computer 40. In the image synthesis processing, an LIF stored in the hard disk is first read out (step 81).

An editing template image and an editing mask image are then generated from editing template image data and editing mask image data which are stored in the hard disk (step 182).

Window area data on the editing template image are read out of the LIF, and the respective numbers of pixels in the longitudinal direction and the transverse direction which constitute a rectangle F circumscribing a window W are calculated (step 183).

An image portion of the user image to be synthesized on the template image (referred to as a user image to be synthesized) in the image synthesis processing is then specified by the user of the client computer 40 (step 84).

A pixel thinning rate or a pixel interpolation rate is calculated (step 185) such that the size of the specified user image to be synthesized and the size of the rectangle circumscribing the window W coincide with each other. Pixel thinning (image reducing processing) is performed using the calculated thinning rate or pixel interpolation (image enlarging processing) is performed using the calculated interpolation rate (step 186) (the image obtained by this processing is referred to as an extracted image).

The thinned or interpolated user image to be synthesized is synthesized with the mask image such that a part of the user image is mask by the mask image (referred to as AND synthesis) (step 187).

The AND-synthesized image and the template image are synthesized (referred to as OR synthesis) such that the template image is laid on the mask portion of the mask image (step 188). The synthesis processing ends with the OR synthesis, so that a composite image in which an image constituting a part of the user image appears in the window W of the template image desired by the user is obtained. The composite image thus obtained is displayed on the display device 84 in the client computer 40.

Figure 28A:
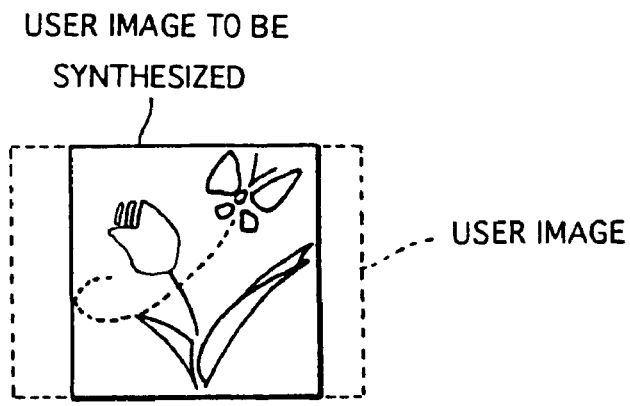
FIGS. 28a and 28b illustrate modified examples of image synthesis processing.
Figure 28B:
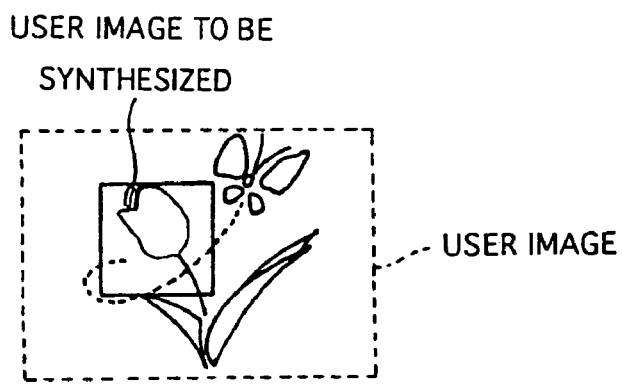

FIGS. 27 and 28 show another image synthesis processing. FIG. 27 is a flow chart showing the procedure for the image synthesis processing, which corresponds to a part of the processing shown in FIG. 25. FIG. 28 shows how images are synthesized in the image synthesis processing.

In this image synthesis processing, enlargement processing of a user image to be synthesized is performed in accordance with an enlargement rate which is set by the user. When image enlargement is made (YES at step 191), an image portion the size of which is equal to the size of the rectangle F circumscribing the window W of the editing template image is cut in accordance with the user's designation out of the user image which has been enlarged depending on the enlargement rate designated by the user (steps 192, 193). The cut-out image serves as the user image to be synthesized (see FIG. 28*b* and compare with FIG. 28*a* which shows the user image to be synthesized proceed in the image synthesis processing shown in FIGS. 25 and 26).

When the enlargement processing of the image is performed, the quality of the image is lowered. An image quality permissible range in which the image quality can be satisfied even when it is lowered is previously set. When the image quality is outside the image quality permissible range in a case where the image enlargement processing is performed (YES at step 194), the user is informed that the image quality is lowered when the composite image is printed by displaying the fact on the display device 84 (step 195). The user may cancel the image enlargement processing, as required.

(6) Partial Printing Processing

Although a composite image is printed by the main image server 30 or the store image server 31, a part of the composite image can be also printed in the printer 90 in the client computer 40 in order to confirm the resolution of the image to be printed. Such processing for checking a part of a image to be printed is partial printing processing (the processing in the step 139 shown in FIG. 20).

Figure 29:
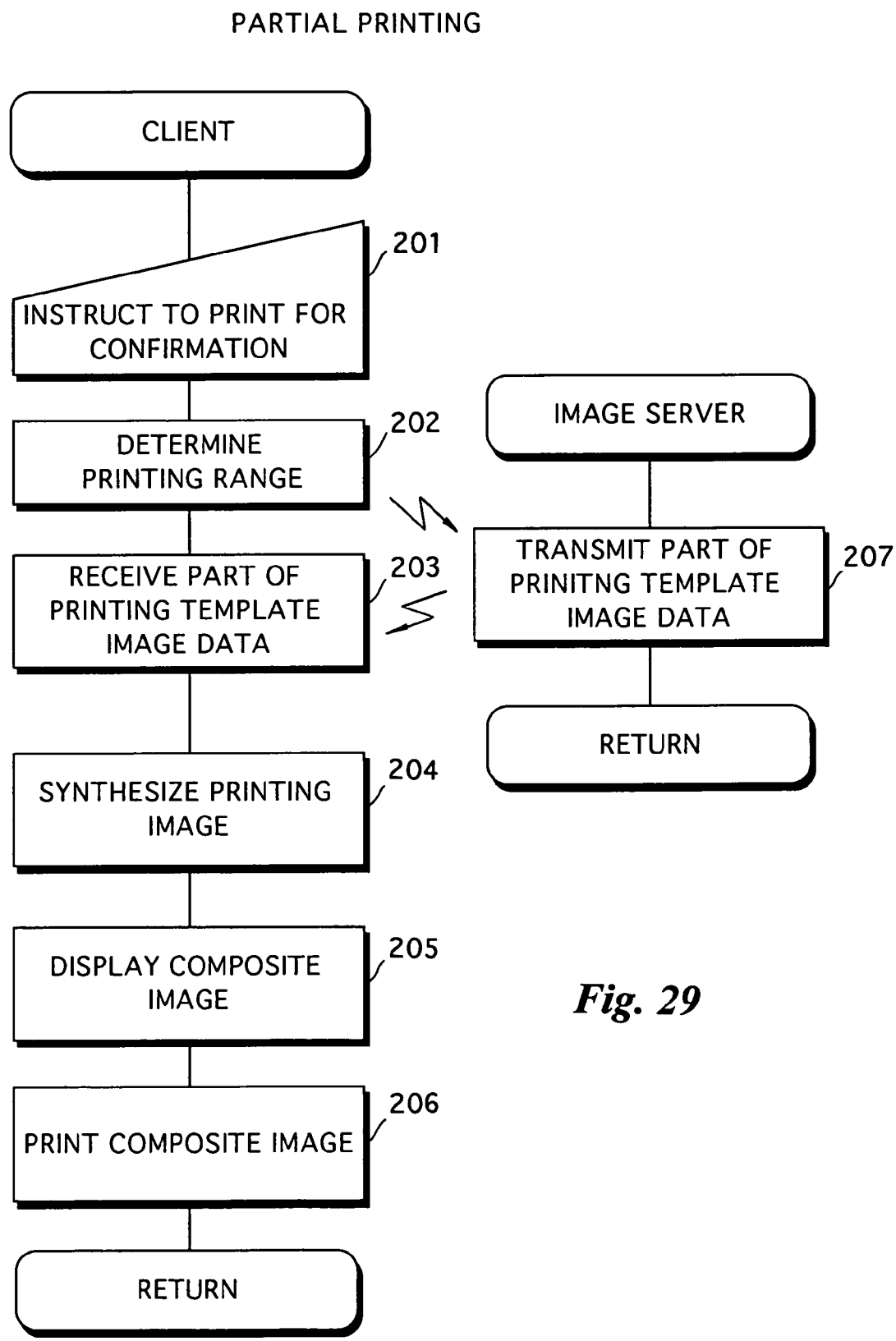
FIG. 29 shows flowcharts of the procedure for partial printing processing.
Figure 30A:
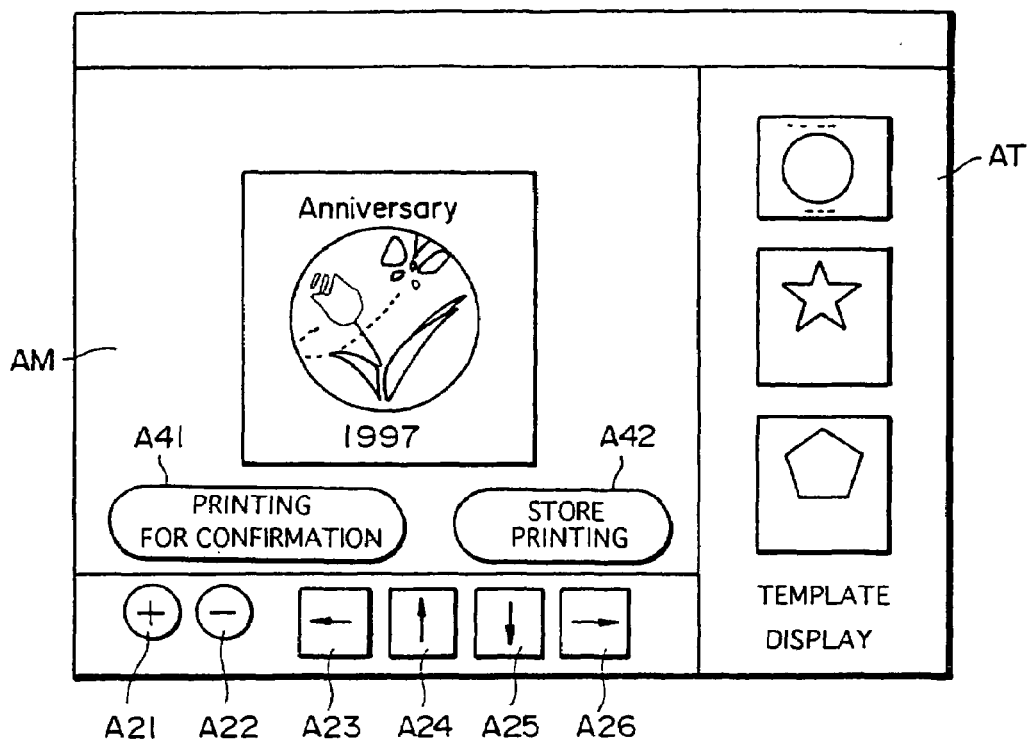
FIGS. 30a and 30b illustrate examples of a display screen of a display device in a client computer.
Figure 30B:
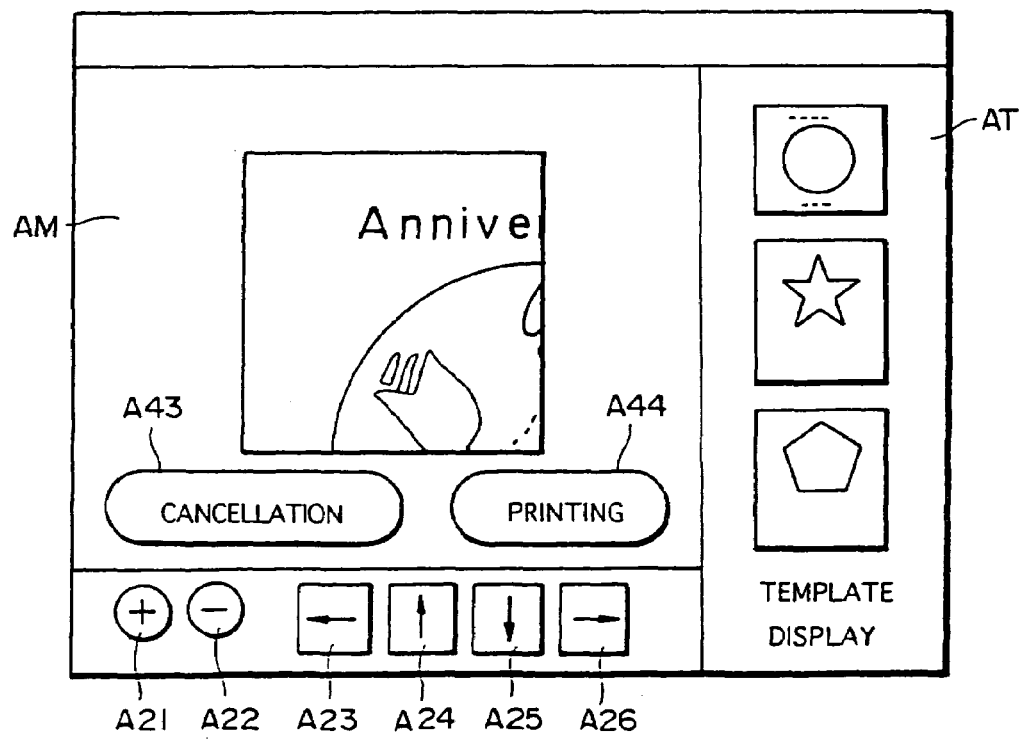

FIG. 29 is a flow chart showing the procedure for the partial printing processing. FIGS. 30a and 30b illustrate examples of a screen on the display device 84 in the client computer 40.

When the composite image is generated as described above, the composite image is displayed on a composite image display area AM on the display screen of the display device 84 in the client computer 40, as shown in FIG. 30a. Areas A41 and A42 are displayed on the screen of the display device 84 on which the composite image is displayed. The area A41 is an area clicked by a user when a part of the composite image to be printed is printed in order to confirm the resolution of the composite image using the printer 90 in the client computer 40. The area A42 is an area clicked by the user when store printing is done as described later.

When the area A41 is clicked by the user in a case where the display screen of the display device 84 in the client computer 40 is in a state as shown in FIG. 30a, it is considered that an instruction to print a part of the composite image is issued (step 201), and the printing range of a part, to be printed, of the composite image is determined (step 202). This determination is automatically made such that the boundary between a template image and a user image (an edge portion of a window W in the template image) is included, that is, the range of the composite image which is subjected to the partial printing processing is predetermined in both the template image and the user image. A part, to be printed, of the composite image may be able to be designated by the user.

When a part, to be printed, of the composite image is thus determined, part designation data indicating that a part is determined and an LIF are transmitted from the client computer 40 to the main image server 30 (step 202).

When the part designation data and the LIF which are transmitted from the client computer 40 are received in the main image server 30, a part of printing template image data corresponding to the part (this part is predetermined as described above), to be printed, of the composite image while referring to the LIF is read out from the hard disk. When the part of printing template image data is read out, the part of the template image data is transmitted from the main image server 30 to the client computer 40 (step 207).

The part of the printing template image data which has been transmitted from the main image server 30 is received in the client computer 40 (step 203).

A printing template image which is represented by the part of the printing template image data and the user image in the determined printing range are synthesized, thereby generating a partial composite image (step 204). The generated partial composite image is displayed on the composite image display area AM on the screen of the display device 84 (step 205), and is printed by the printer 90 (step 206). The user himself or herself of the client computer 40 can thus check a part of the composite image to be actually printed, and can confirm the resolution of the composite image to be printed in the main image server 30 or the store image server 31.

(7) Conversion Processing of Image Data to be Transmitted

Figure 31:
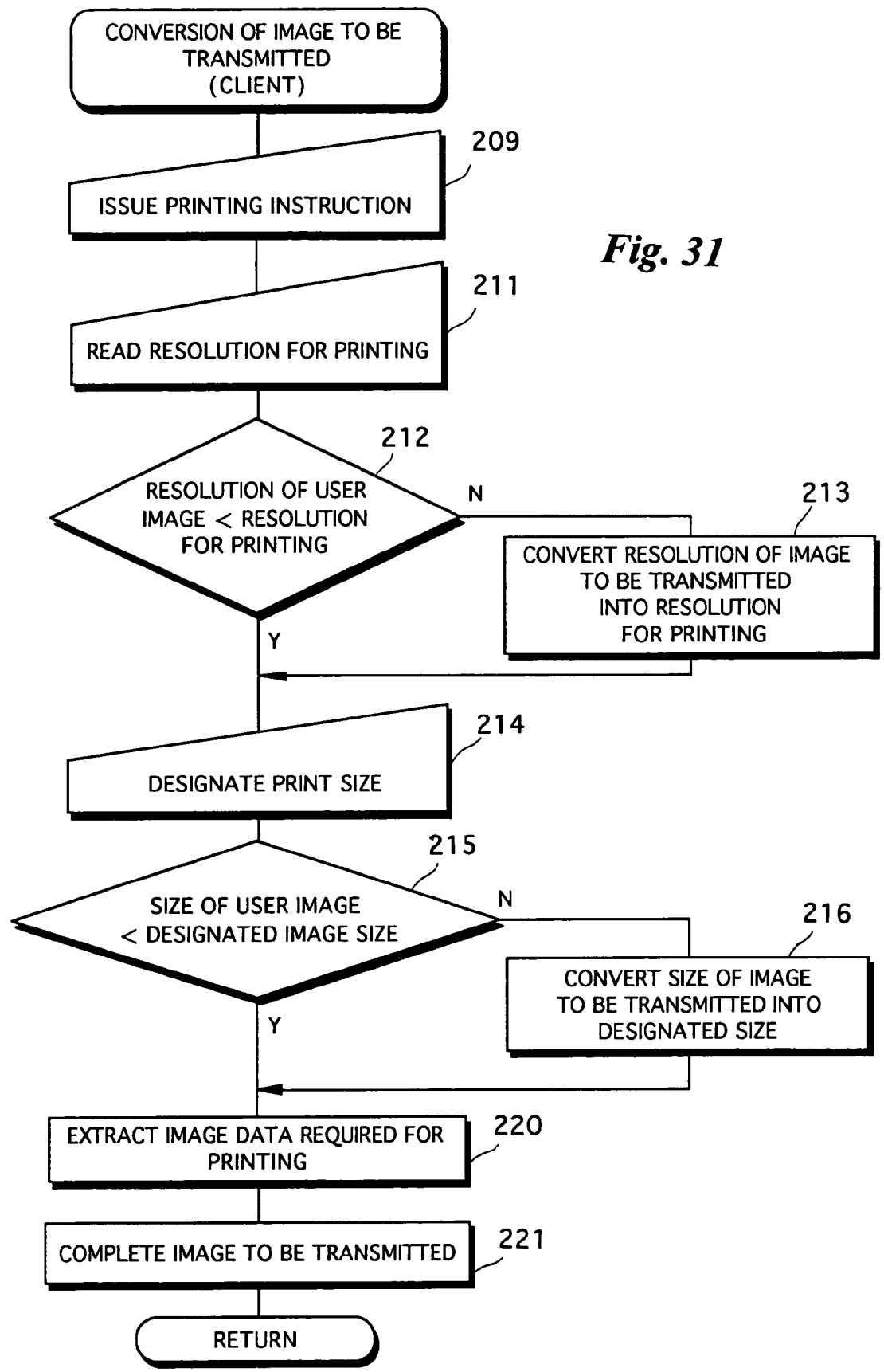
FIG. 31 is a flowchart showing conversion processing of image data to be transmitted.

FIG. 31 is a flow chart showing the procedure for conversion processing of image data to be transmitted (the processing in the step 140 shown in FIG. 20). FIGS. 32 and 33 illustrate an image represented by image data obtained by the conversion processing of the image data to be transmitted.

The conversion processing of image data to be transmitted is performed in the client computer 40.

When the composite image is generated as described above, an area A44 shown in FIG. 30b is clicked by a user, so that an instruction to print the composite image is issued (step 209).

The resolution of the high-quality printer 90A of the main image server 30 has been stored in the hard disk of the client computer 40. The resolution of the high-quality printer 90A is read out of the hard disk of the client computer 40 (step 211). The resolution of the high-quality printer 90A and the resolution of user image used in the composite image are compared with each other (step 212). If the resolution of the high-quality printer 90A is lower than the resolution of the user image, the data quantity of the image data can be reduced by making the resolution of the user image used in the composite image equal to the resolution of the high-quality printer 90A. Therefore, image data conversion processing is performed such that the resolution of the user image used in the composite image is equal to the resolution of the high-quality printer 90A (step 213). For example, when the resolution of the user image is 1800 dpi, and the resolution of the high-quality printer 90A is 1200 dpi, the image data thinning (conversion) processing is performed such that the resolution of the user image is 1200 dpi. If the resolution of the high-quality printer 90A is higher than the resolution of the user image, the processing in the step 213 is skipped.

The print size of a composite image is then designated by the user (step 214). When the print size designated by the user (for example, the size which is one-fourth the standard print size) is smaller than the print size which is predetermined in the main image server 30 (the standard print size), image data thinning (conversion) processing is performed such that printing into the print size which is equal to the image size designated by the user can be realized (step 216). Since the print size is reduced, the data quantity of the image data to be transmitted from the client computer 40 to the main image server 30 is reduced.

Image data representing a part of the image (referred to as an extracted image) required to print the composite image is extracted from the image data representing the user image, as shown in FIG. 19 (step 220). Consequently, the quantity of the image data transmitted from the client computer 40 to the main image server 30 is reduced. The extraction processing will be performed in correspondence with the image extraction processing in the image synthesis processing shown in FIGS. 25 and 26.

The image data to be transmitted from the client computer 40 to the main image server 30 is thus generated. The generated image data to be transmitted is temporarily stored in the RAM 74 (step 221).

(8) Image Quality Selection Processing

The image data to be transmitted which has been generated in the above-mentioned manner is transmitted from the client computer 40 to the main image server 30 upon being compressed. If the compression rate is increased, time required to transmit the image data can be shortened, while the image quality thereof is degraded. On the other hand, if the compression rate is decreased, the image quality of the image data is not degraded, while time required to transmit the image data is lengthened. In the present embodiment, the user of the client computer 40 is made to choose which of the shortening of the time required to transmit the image data and the image quality should be given priority to.

Figure 34:
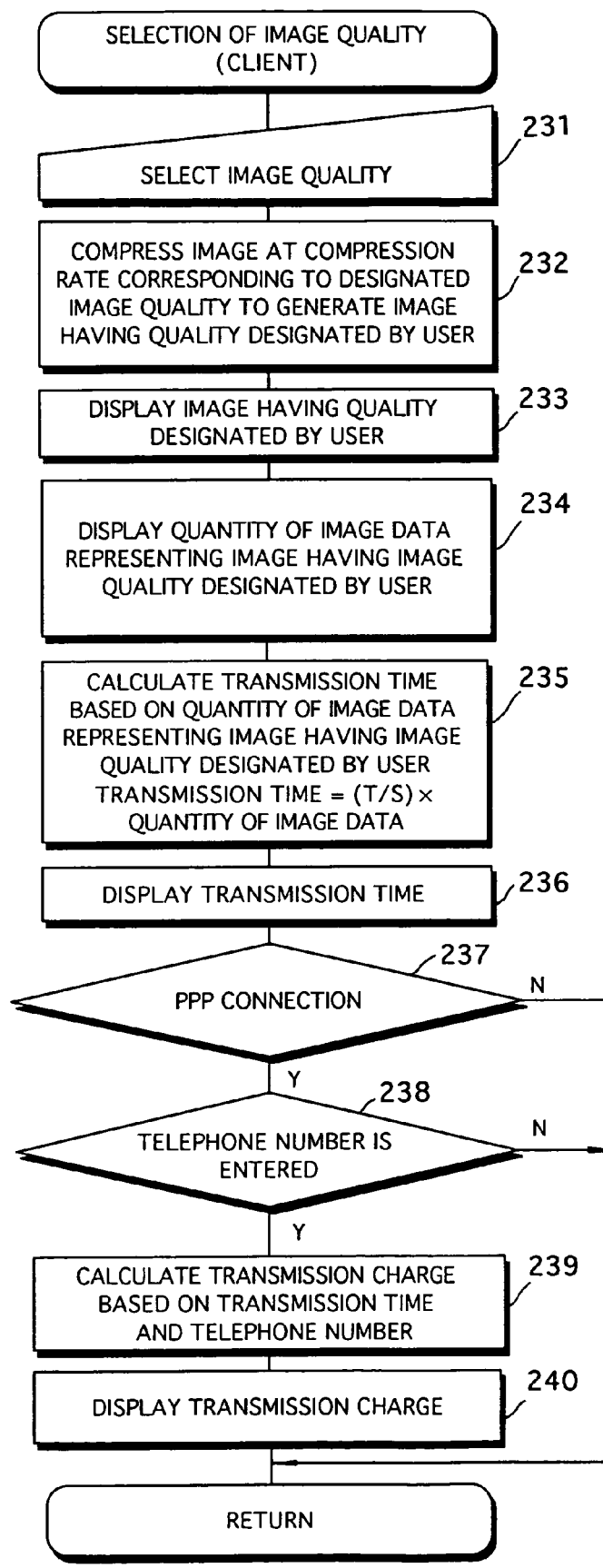
FIG. 34 is a flowchart showing the procedure for image quality selection processing.
Figure 35:
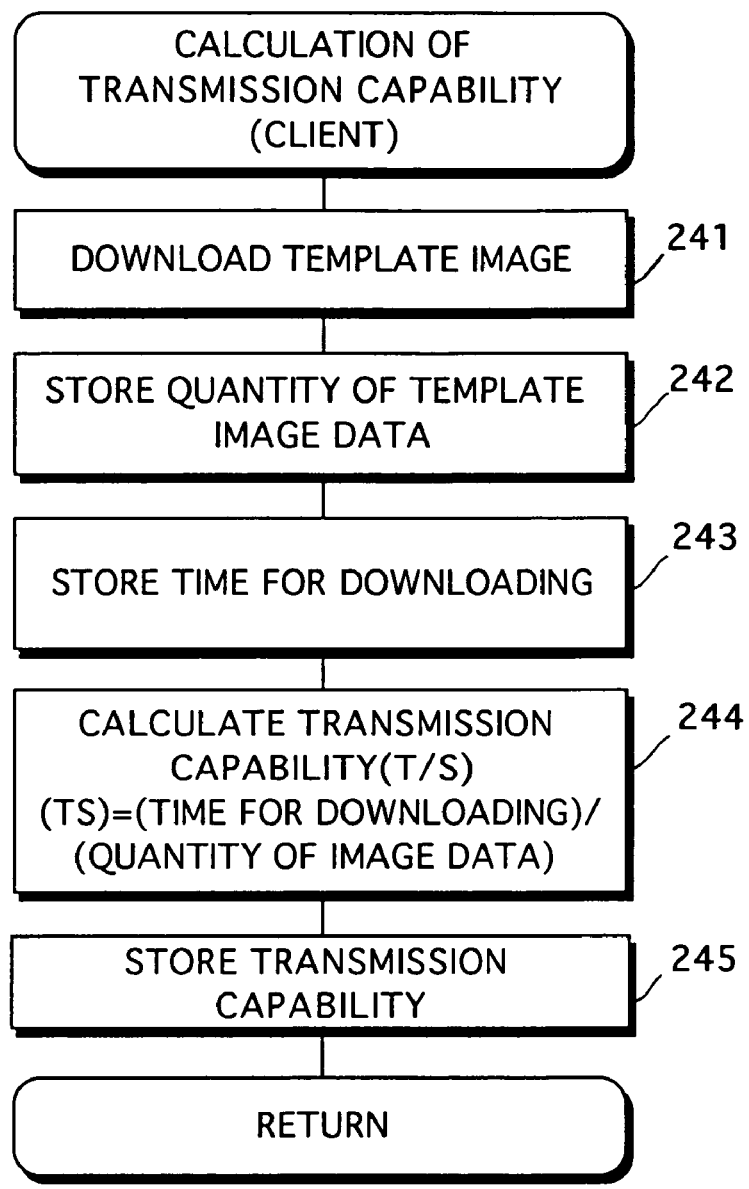
FIG. 35 is a flowchart showing the procedure for transmission capability calculation processing.
Figure 36:
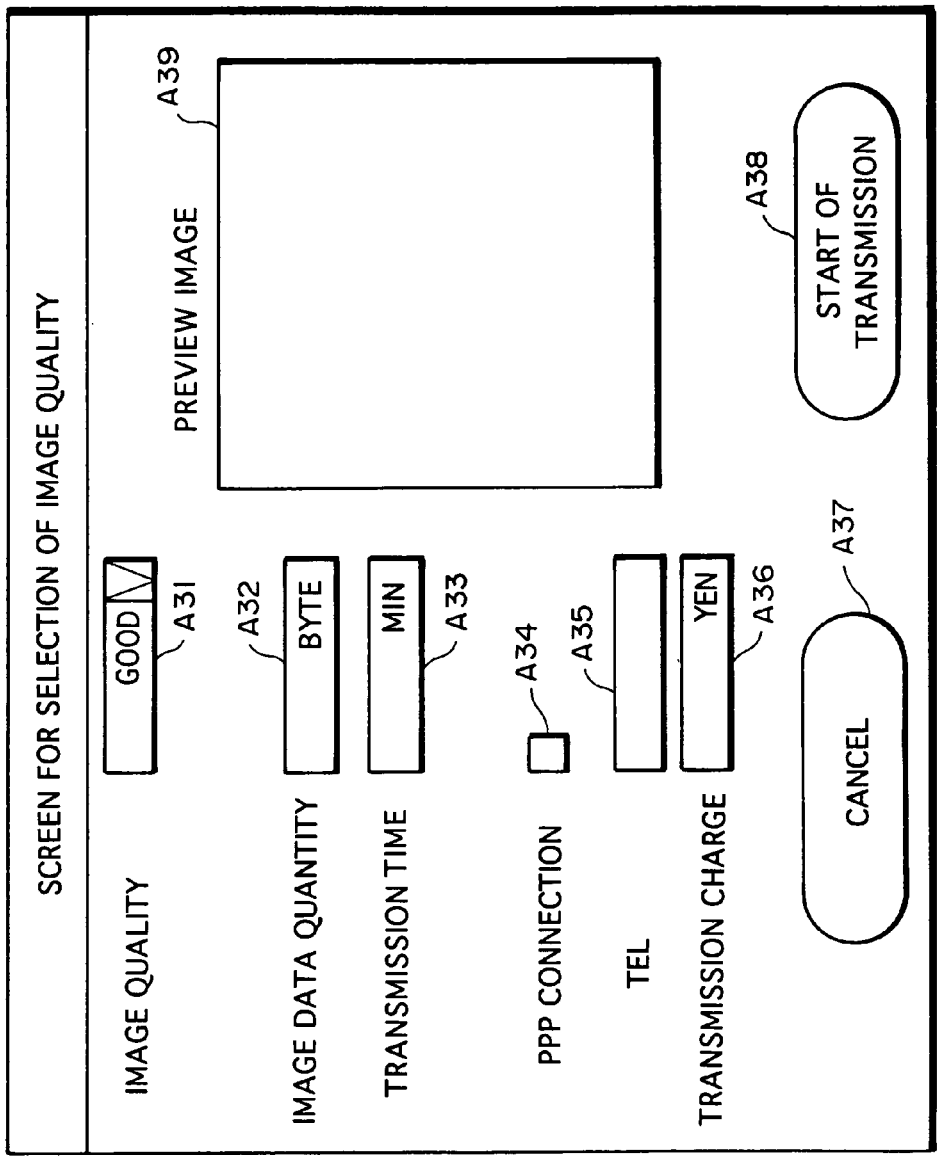
FIG. 36 illustrates one example of a display screen of a display device in a client computer.

FIG. 34 is a flow chart showing the procedure for image quality selection processing (the processing in the step 140 shown in FIG. 20), and FIG. 35 is a flow chart showing processing for calculating time required to transmit image data from the client computer 40 to the main image server 30. FIG. 36 illustrates one example of the display screen of the display device 84 in the client computer 40.

Included on the screen of the display device 84 are an area A31 where the image quality (good, medium, bad, etc.) selected by the user is displayed, an area A32 where the quantity of image data corresponding to the image quality selected by the user is displayed, an area A33 where time required for transmit the image data from the client computer 40 to the main image server 30 depending on the image quality selected by the user is displayed, an area A34 clicked in the case of PPP (point-to-point protocol) connection, an area A35 where a telephone number for making connection to the main image server 30 is displayed, an area A36 where a charge to be paid in a case where the image data is transmitted from the client computer 40 to the image server 30 is displayed, an area A37 clicked in the case of cancellation, an area A38 clicked in a case where transmission is started, and a preview image display area A39 where an image having the image quality selected by the user is displayed.

Referring to FIG. 34, the image quality is selected by the user of the client computer 40 (step 231). When the image quality is selected by the user, a preview image having the same image quality as the selected image quality is generated, and is displayed on the preview image display area A39 (steps 232 and 233).

Furthermore, the quantity of the image data representing the image having the selected image quality is displayed on the area A32 (step 234). The time (transmission time) required to transmit the image data from the client computer 40 to the image server 30 is calculated based on the quantity of the image data according to an equation: (the time required for transmission)=(the transmission capability of the image data T/S)×(the quantity of the image data) (step 235). Processing for calculating the transmission capability of the image data will be described later.

The calculated time required for transmission is displayed on the area A33 (step 236). In the case of PPP connection, the area A34 is clicked (step 237). When a telephone number of the main image server 30 is entered into the area A35 (step 238), a transmission charge is calculated from the time required for transmission and the telephone number of a main image server 30 which is a destination of transmission (step 239). The calculated transmission charge is displayed on the area A36 (step 240). In the case of LAN (local area network) connection, the area A34 is not clicked, so that the processing is terminated after a predetermined time period.

The calculation processing of the transmission capability will be described.

Referring to FIG. 35, the quantity of editing template image data in a case where the editing template image data was downloaded from the main image server 30 as described above has been stored (steps 241 and 242). Time required to download the editing template image data has also been stored (step 243).

The time required to download the template image data (T) is divided by the quantity of the template image data (S), so that the transmission capability of the image data (T/S) can be calculated (step 244). The transmission capability thus calculated is stored (step 245).

(9) Format of Image Data to be Transmitted

Figure 37:
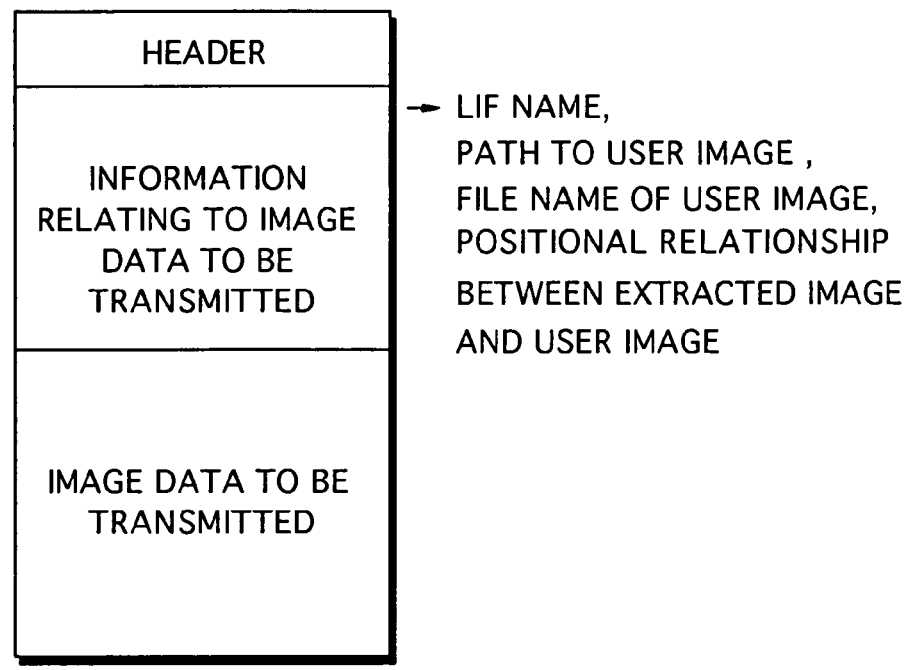
FIG. 37 illustrates a file format of image data to be transmitted.

FIG. 37 illustrates a format of image data to be transmitted from the client computer 40 to the main image server 30.

A header is included in the format, and information relating to the image data to be transmitted and the image data to be transmitted are added to the header. The information relating to the image data to be transmitted (synthesis information) includes the LIF name, a path to a user image, the file name of the user image, and the positional relationship indicating which part of the original user image corresponds to an image extracted from the user image.

The image data having such an image format is transmitted from the client computer 40 to the main image server 30.

(10) Printing Processing

Figure 38:
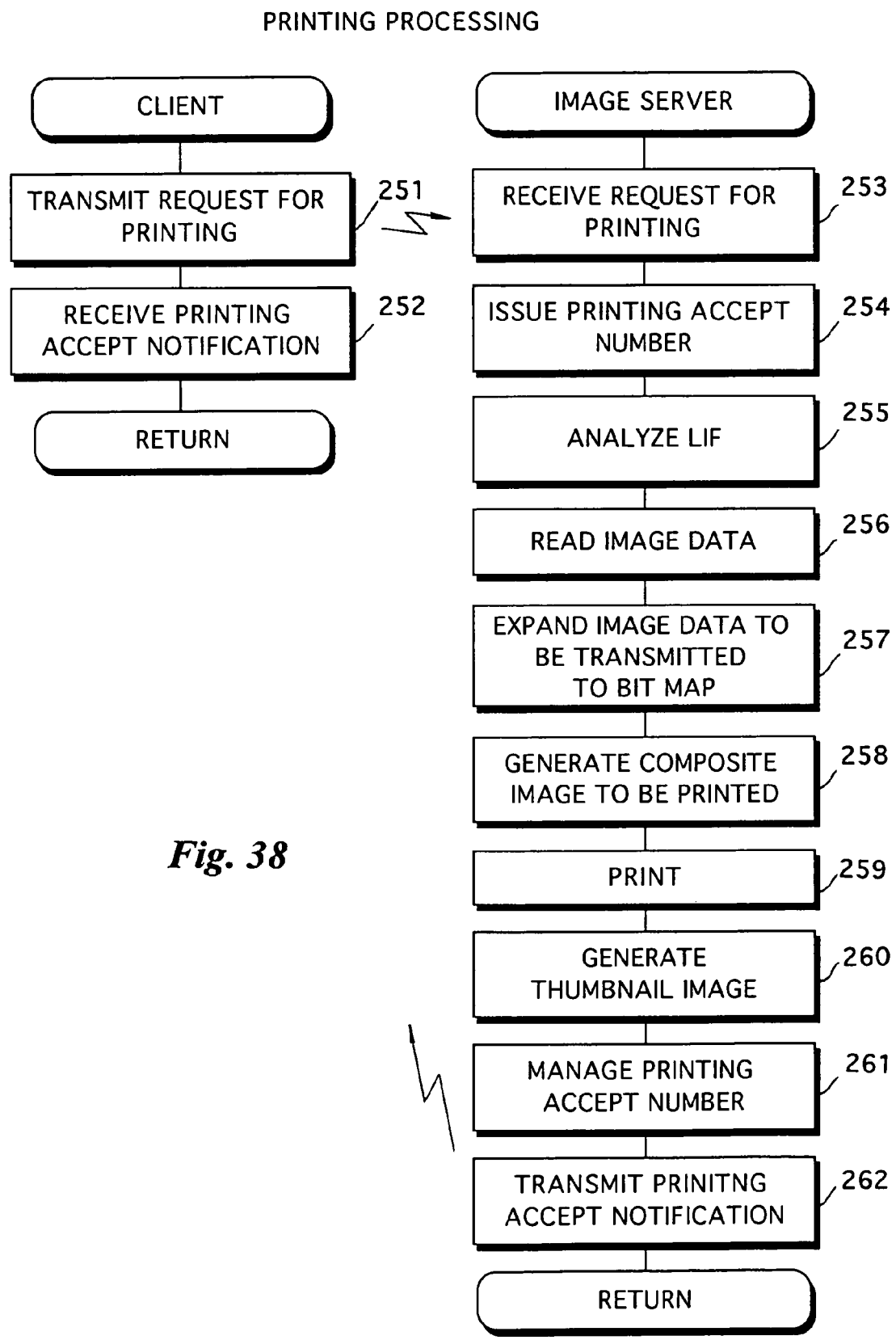
FIG. 38 shows flowcharts of the procedure for printing processing of a composite image.

FIG. 38 is a flow chart showing printing processing of a composite image which is performed in the main image server 30 (the processing in the step 142 shown in FIG. 20).

Image data representing a user image (image data representing the user image is reduced in quantity, as required, described above, and is compressed) (synthesis information is included as information relating to image data to be transmitted) which constitutes the composite image is transmitted as a request to print the composite image from the client computer 40 to the main image server 30 (step 251).

In the main image server 30, when the image data representing the user image is received (step 253), a printing accept number is issued (step 254). The composite image is then generated in the following manner using the received image data.

An LIF is retrieved from the LIF name included in the transmitted image data. By analyzing the LIF, printing template image data and printing mask image data which are required for the composite image are retrieved from the hard disk in the main image server 30, and are temporarily stored in the RAM 74 (steps 255 and 256).

The user image data transmitted from the client computer 40 is expanded to a bit map (step 257), and data representing the composite image is generated in the VRAM 82 in accordance with the information relating to the image data to be transmitted (step 258).

The composite image data thus generated is displayed on the display device 84 through the DA converter 83, so that the composite image can be checked by an operator of the main image server 30. The composite image data is fed to the printer control circuit 89, and is fed to the high-quality printer 90A, where a high-quality composite image is printed (step 259). A thumbnail image of the composite image is produced (step 160). The printing accept number which has been issued is managed in the main image server 30 (step 161). A printing accept notification which includes the thumbnail image data and the printing accept number data is transmitted from the main image server 30 to the client computer 40 (step 162). The client computer 40 receives the thumbnail image data and the printing accept number data (step 152). Later, the user presents an operator of the main image server 30 with the printing accept number, and gets a print specified by the printing accept number. The composite image thus printed is delivered to the user of the client computer 40 by the operator of the main image server 30.

(11) Store Printing

The composite image can be printed by the high-quality printer 90A in the main image server 30 as described above, and can be also printed in the store image server 31 disposed in the laboratory. If it is convenient for the user of the client computer 40 to go to the laboratory where the store image server 31 is disposed, store printing, described below, will be performed.

Figure 39:
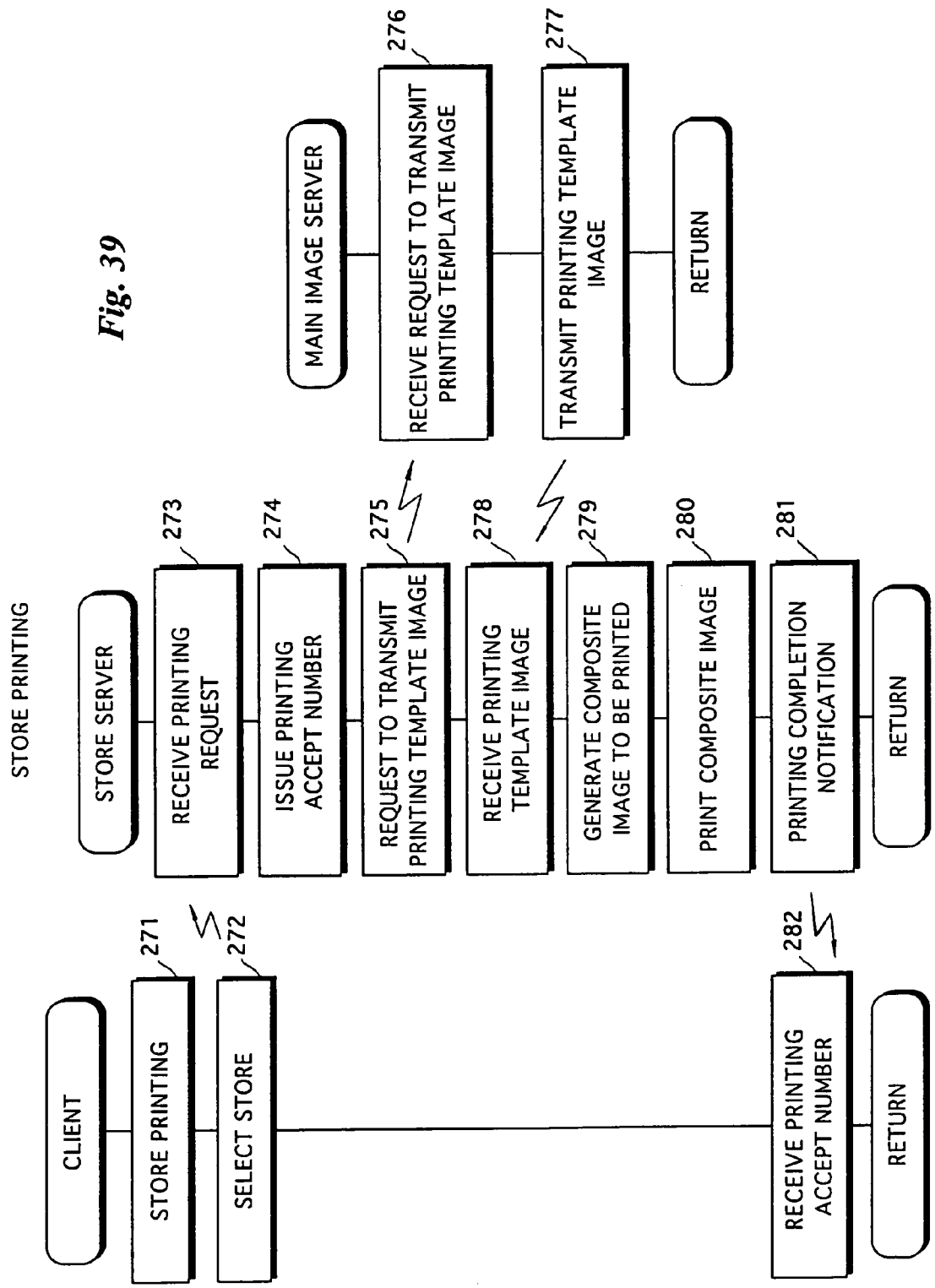
FIG. 39 shows flowcharts of the procedure for store printing processing.

FIG. 39 is a flow chart showing the procedure for store printing (the processing in the step 143 shown in FIG. 20).

When the store printing is designated by the user of the client computer 40 (step 271), the laboratory where the store image server 31 for the store printing is disposed is selected (step 273). When the laboratory is selected by the user of the client computer 40, the store image server 31 disposed in the selected laboratory and the client computer 40 are connected to each other.

When the client computer 40 and the store image server 31 are connected to each other, image data representing a user image constituting a composite image is transmitted from the client computer 40 to the store image server 31.

When, in the store image server 31 disposed in the laboratory, image data representing the user image transmitted from the client computer 40 is received, a printing accept number is issued upon recognizing that it is a request to print the composite image (step 274). When the printing accept number is issued, the file name representing template image data used for printing the composite image is read out of the LIF. The store image server 31 and the main image server 30 are connected to each other, so that data representing the obtained file name is transmitted from the store image server 31 to the main image server 30, as a request to transmit printing template image data (step 275).

In the main image server 30, when data representing the file name of the printing template image data transmitted from the store image server 31 is received (step 276), the hard disk in the main image server 30 is searched on the basis of the received data representing the file name, so that the printing template image data for printing the composite image and printing mask image data are read out of the hard disk. The printing template image data and the printing mask image data which have been read out are transmitted from the main image server 30 to the store image server 31 (step 277).

In the store image server 31, when the printing template image data and the printing mask image data which have been transmitted from the main image server 30 are received (step 278), image synthesis is made in accordance with information relating to image data to be transmitted using the user image data which has been transmitted from the client computer 40, and the printing template image data and the printing mask image data which have been received (step 279). The image synthesis processing is the same as the processing in the main image server 30 as described above and hence, the overlapped description is omitted.

When image data representing the composite image is generated, the generated composite image data is fed to a high-quality printer in the store image server 31, where the composite image is printed (step 280). When the composite image is printed, notification that printing of the composite image is terminated is transmitted together with a printing accept number from the store image server 31 to the client computer 40 (step 281).

In the client computer 40, data representing the printing accept number which has been transmitted from the store image server 31 is received (step 282). The user of the client computer 40 goes to the laboratory where the store image server 31 is disposed, and tells the printing accept number represented by the received data to a clerk in the laboratory. Consequently, the clerk in the laboratory hands to the user of the client computer 40 a print on which the composite image specified by the printing accept number is printed.

(12) Image Resynthesis Processing

After the image synthesis processing is performed as described above, resynthesis processing may, in some case, be performed again using the user image used for generating the composite image in the image synthesis processing. Such image resynthesis processing will be described.

Figure 40:
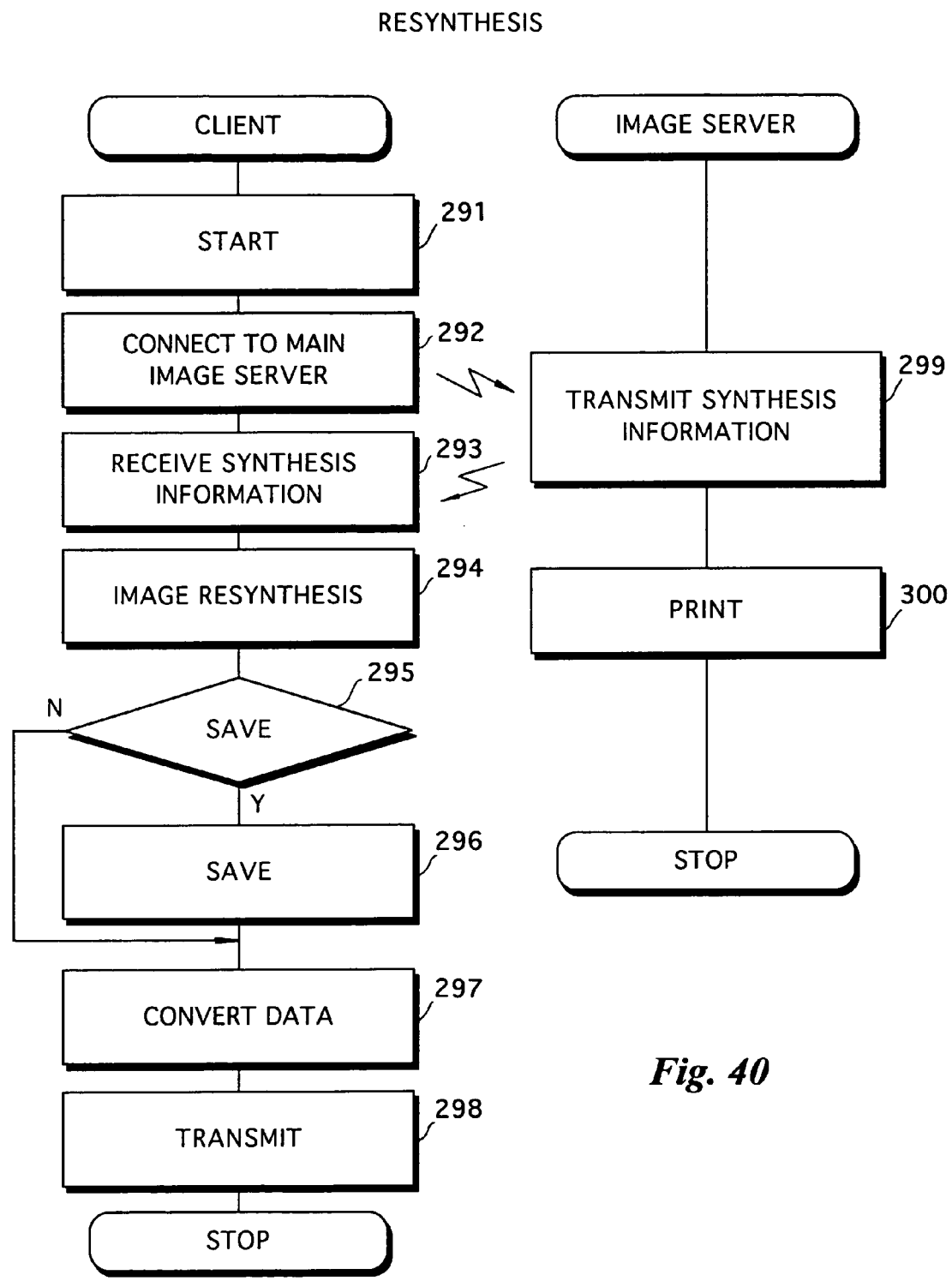
FIG. 40 shows flowcharts of the outline of the procedure for resynthesis processing.

FIG. 40 is a flow chart showing the procedure for the image resynthesis processing.

When the image resynthesis processing is performed, the client computer 40 is first started (step 291). When the client computer 40 and the main image server 30 are connected to each other (step 292), resynthesis instruction data indicating that resynthesis processing should be performed (and including data specifying information relating to the image data to be transmitted) is transmitted from the client computer 40 to the main image server 30.

When the resynthesis instruction data is received in the main image server 30, information relating to image data to be transmitted which is specified by the resynthesis instruction data is retrieved from the hard disk, and is transmitted as synthesis information to the client computer 40 (step 299).

When the information relating to image data to be transmitted (the synthesis information) transmitted from the image server 30 is received in the client computer 40 (step 293), user image data, editing template image data and editing mask image data which are specified by the information are retrieved in the client computer 40, in which these data was stored when the synthesis processing was previously performed. In the client computer 40, when the user image data is retrieved, the resynthesis processing is performed using the retrieved user image data (step 294). The resynthesis processing will be described in detail later.

Composite image data obtained by the resynthesis processing is saved in the client computer 40, as required (steps 295 and 296).

When the image resynthesis processing is performed, conversion processing (e.g., processing of reducing the quantity of the image data by lowering the resolution) of the user image data to be transmitted to the main image server 30 is performed, so that the quantity of the user image data is reduced (step 297). The resynthesis processing is the same as the above-mentioned synthesis processing in that the user image data whose quantity is reduced and the LIF representing the synthesis information are transmitted from the client computer 40 to the main image server 30, and the composite image is printed in the main image server 30 (steps 297, 298, and 300).

Description is now made of the specific resynthesis processing.

Figure 41:
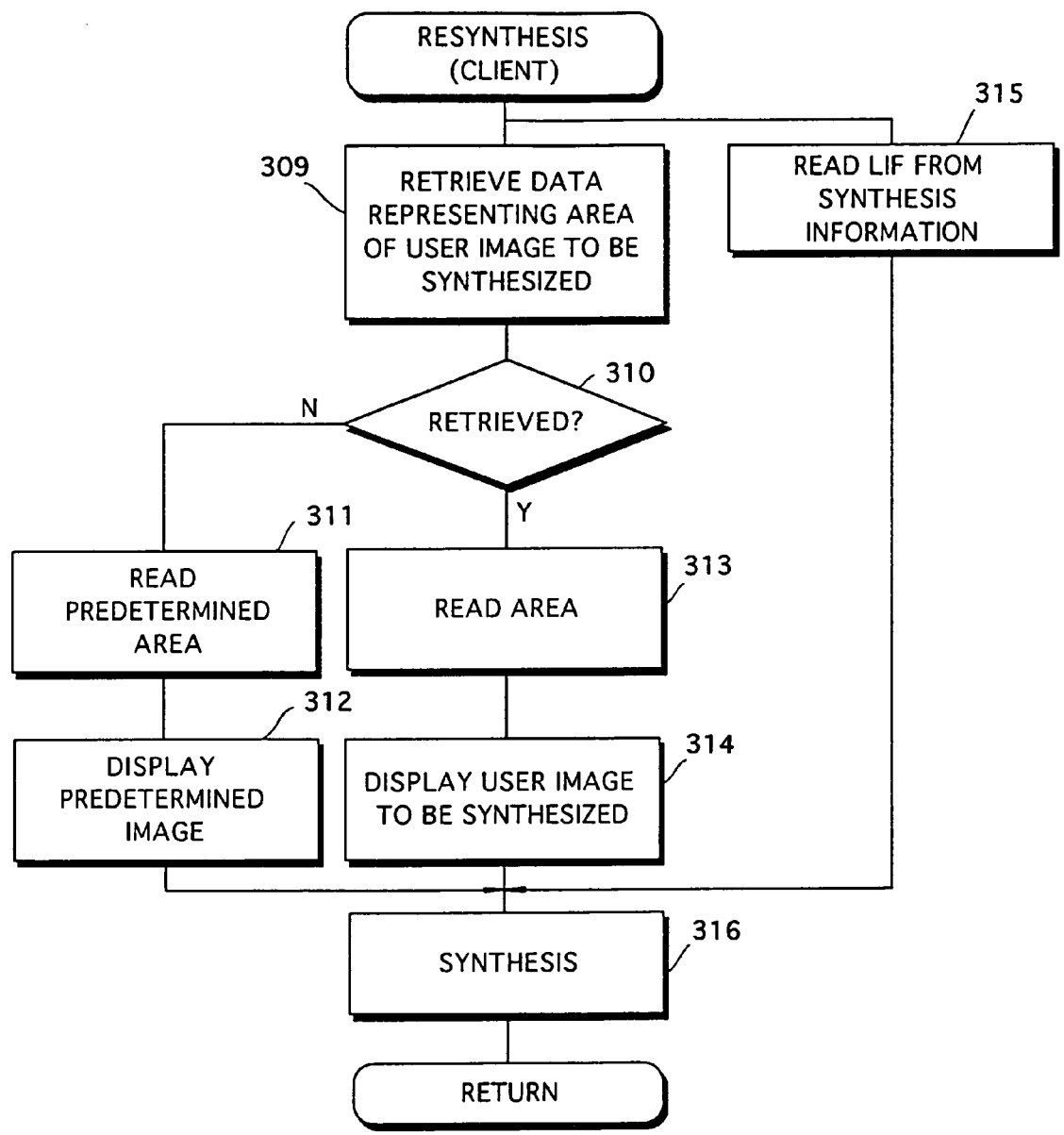
FIG. 41 is a flowchart showing the procedure for specific resynthesis processing.

FIG. 41 is a flow chart showing the procedure for the specific resynthesis processing (the step 294 shown in FIG. 40).

When the synthesis information transmitted from the main image server 30 is received, the LIF is read out of the synthesis information (step 315). The editing template image data and the editing mask image data which were used in the previous synthesis processing are stored in the hard disk. The client computer 40 retrieves the editing template image data and the editing mask image data which are stored in the hard disk on the basis of the LIF.

On the other hand, data representing an area of the user image to be synthesized which was used once in the synthesis processing is retrieved from the hard disk in the client computer 40 (step 309). When the data representing the area of the user image to be synthesized is found (YES in step 310), the data is read out (step 313) and the user image to be synthesized is displayed on the display device 84 (step 314). Then the image synthesis processing is performed (step 316). If the data representing the area of the user image to be synthesized is not retrieved, a predetermined image (for example, the overall user image) is displayed on the display device (step 311, 312), and the image synthesis processing is performed using the displayed image (step 316).

Since the image resynthesis processing is performed utilizing the synthesis information which was used once for the image synthesis, the resynthesis can be rapidly made.

(D) Fourth Embodiment (1) Configuration of Image Editing System

Figure 42:
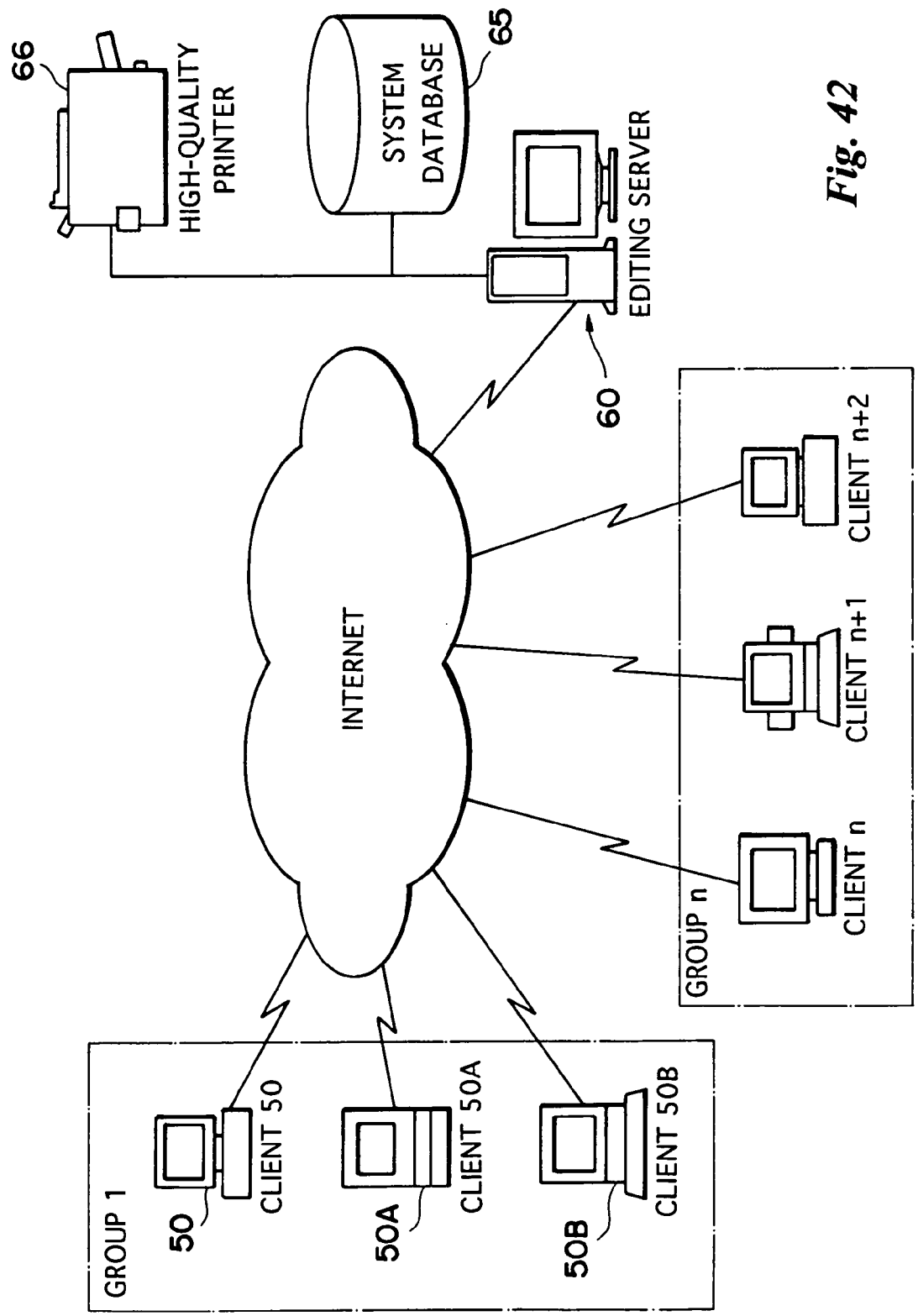
FIG. 42 shows the fourth embodiment of the present invention and illustrates the configuration of an image editing system.

FIG. 42 illustrates a fourth embodiment of the present invention, which shows the overall configuration of an image editing system.

The image editing system is constructed by connecting an editing server (an image server) 60 and client computers via a network. A lot of client computers are connected to the internet. A plurality of client computers constitute a group. In FIG. 42, client computers 50, 50A, and 50B constitute a group 1, and client computers n, n+1 and n+2 constitute a group n.

A particular image is shared among the client computers in the group thus constituted. Image editing processing is performed using the shared image. For example, a certain client computer first edits the image, and the other client computer belonging the same group reedits the edited image, so that a final edited image is generated. Users of the plurality of client computers generate one edited image in cooperation.

A system database 65 and a high-quality printer 66 are connected to the editing server 60.

The electrical configuration of the client computer is the same as that shown in FIG. 16, and the electrical configuration of the editing server 60 is the same as that shown in FIG. 17.

The user uses the client computer 50, to edit a desired image. The image editing processing will be described in detail later.

Figure 43:
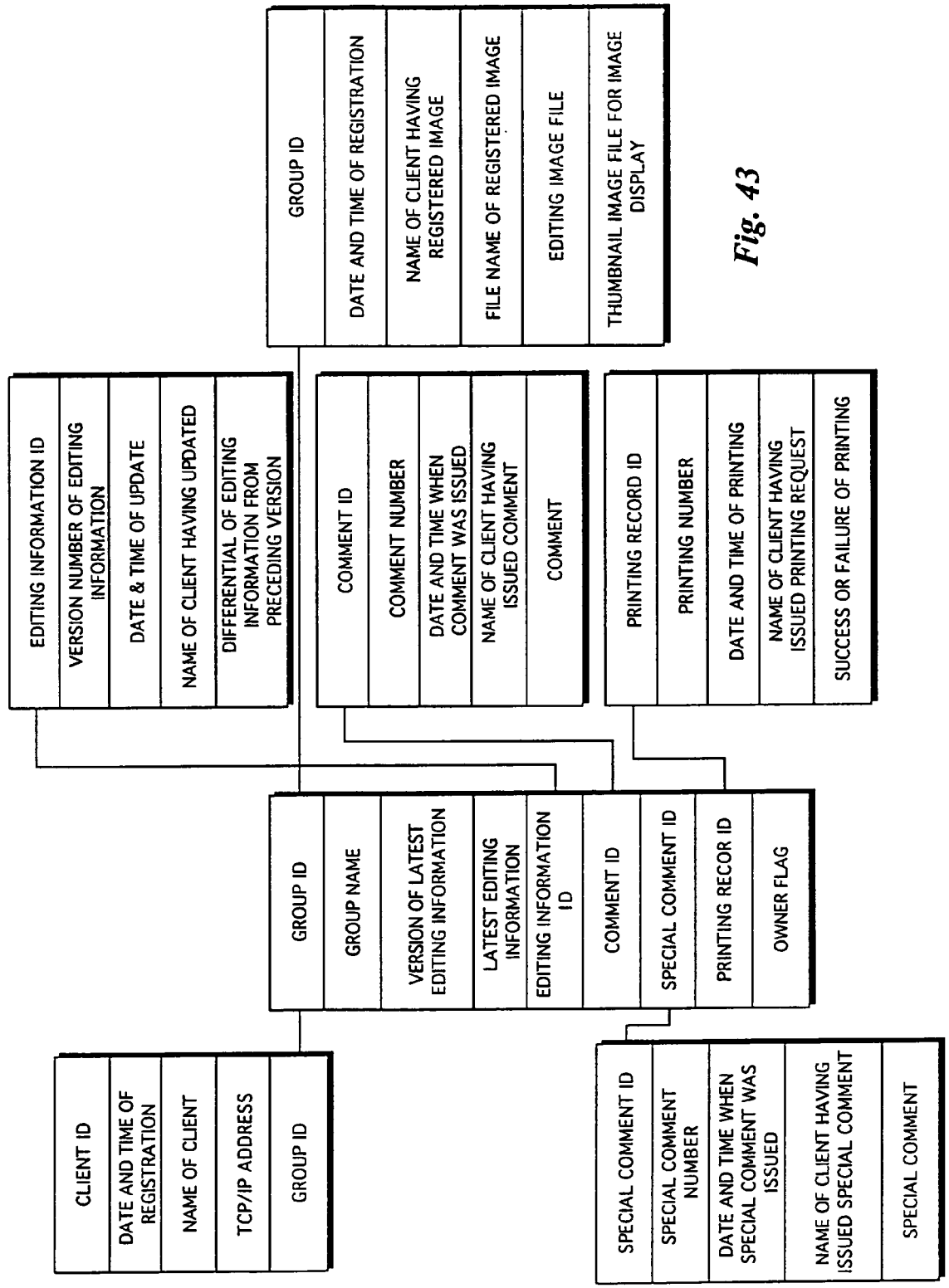
FIG. 43 illustrates an example of the data structure of a file stored in a system database.

FIG. 43 illustrates a data structure relating to one group of client computers stored in the system database 65. The data structures as shown in FIG. 43, whose number corresponds to the number of groups each constituted by the client computers which can be connected to the editing server 60, are stored.

A group ID and a group name are assigned to each of the groups (the group ID and the group name may be identical with each other or different from each other, provided that they have a one-to-one correspondence). A version of the latest editing information, the latest editing information, an editing information ID, a comment ID, a special comment ID, a printing record ID and a owner flag are related to the group ID and the group name.

The editing information is information for generating an edited image, which includes, for example, information specifying an image constituting the edited image and information indicating the position where the image constituting the edited image is arranged. The editing information is updated when the editing of the image is repeated in each of the groups. A version representing the editing information finally updated is the version of the latest editing information.

Stored in an editing information ID area are the version number of editing information, the date and time when the editing information was updated, the name of a client computer which updated the editing information, and the differential of editing between the editing information before the updating and the current editing information.

In the process of editing an image in a group, a comment is transmitted and received between client computers in such a case where the editing of the image is started. Information relating to the comment is stored in a comment ID area. The number of the comment, the date and time when the comment was issued, the name of a client computer which issued the comment, and the contents of the comment are stored in the comment ID area.

When an image is edited, a comment concerning an image constituting the edited image can be overwritten on the edited image. This comment is referred to as a special comment. Information relating to the special comment is stored in a special comment ID area. The special comment number, the date and time when the special comment was issued, the name of a client computer which issued the special comment, and the contents of the special comment are stored in the special comment ID area.

In the editing server 60, the edited image can be printed using the high-quality printer 66. Information relating to the printing is stored in a printing recording ID area. The printing number, the date and time when the printing was done, the name of a client computer which requested to do the printing, and the success or failure of the printing are stored in a printing recording ID area.

Furthermore, in a group ID area, the date and time when the group was registered, the name of a client computer which registered an image in the editing server 60, the file name of the registered image, the editing image file and the thumbnail image file for image display are stored. In the image editing system, when the image is edited, an editing image having a lower resolution than that of the image registered in the editing server 60 is used. A thumbnail image of the image which is registered in the editing server 60 is displayed on a display device of the client computer, as described later. Data representing the editing image and data representing the thumbnail image for image display are stored in an editing image file and a thumbnail image file for image display, respectively.

Furthermore, an ID (IDs) of a client computer(s) included in a group, the date and time when the client computer was registered in the group, the name(s) of the client computer(s), and a TCP/IP address(es) for specifying the client computer(s) are stored in a group ID area.

The name of a client computer which acquires an owner flag in a group is also stored. A client computer which intends to perform image registration, image editing or image printing acquires an owner flag. One client computer in each group can acquire the owner flag.

FIGS. 44 to 48 illustrate the details of an editing information file storing the editing information.

Figure 44:
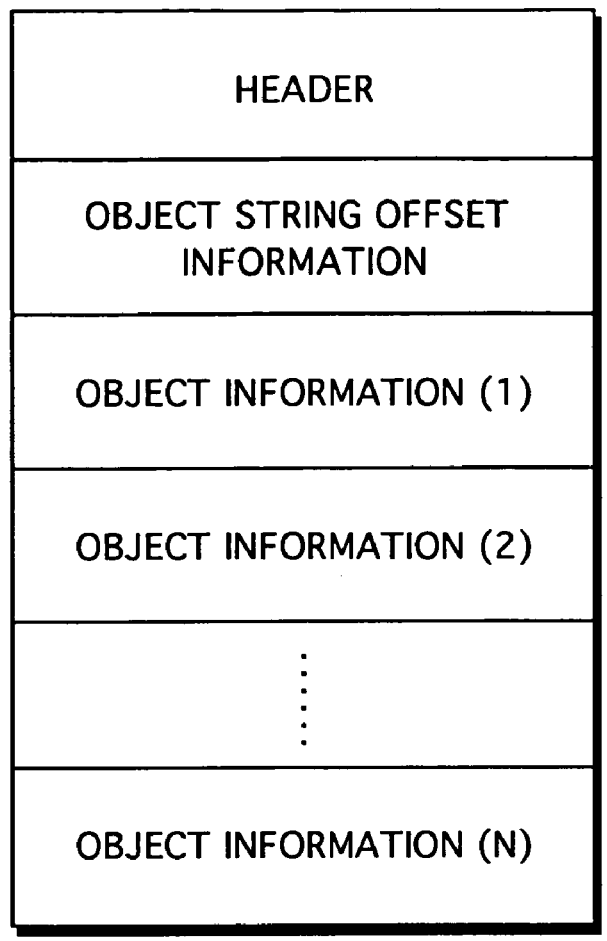

As shown in FIG. 44, the editing information file includes a header, object string offset information, and object information.

Figure 45:
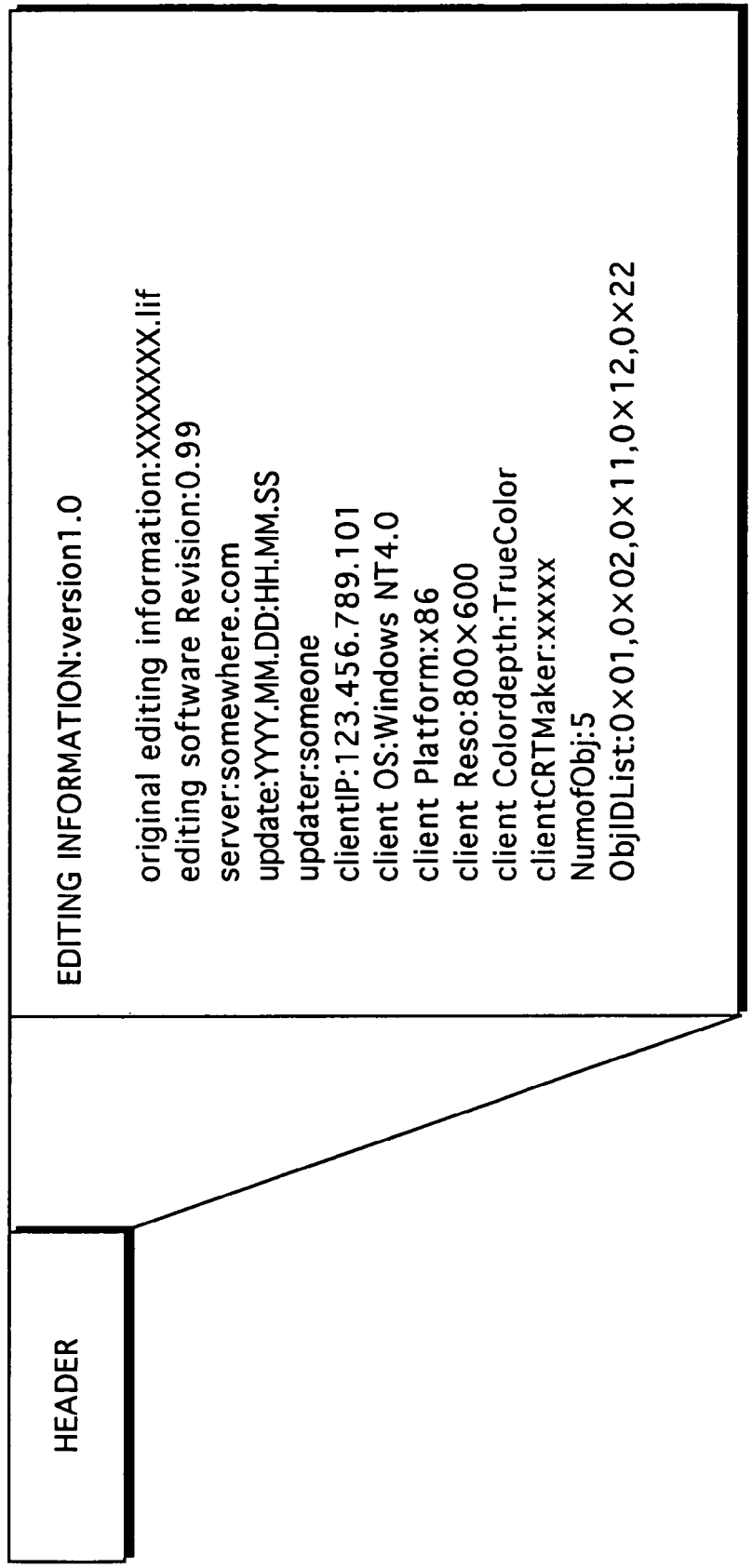

The header describes management information. As shown in FIG. 45, the header includes version (a version of editing information), original editing information (editing information ID), editing software Revision (a version of software in the image editing system), server (an address of the editing server 60), update (date and time when the editing information was updated), updater (a name of a client computer which updated the editing information), client IP (an IP address of a client computer which updated the editing information), client OS (an operating system of a client computer which updated the editing information), client Platform (a name of a CPU of a client computer which updated the editing information), client Reso (a size of the display device 84 of a client computer which updated the editing information), client Color depth (a number of colors capable of being displayed in a client computer which updated the editing information), client CRT Maker (a maker name of a display device of a client computer which updated the editing information), Num of Obj (a number of images constituting the edited image), and Obj ID List (IDs of images constituting the edited image).

Figure 46:
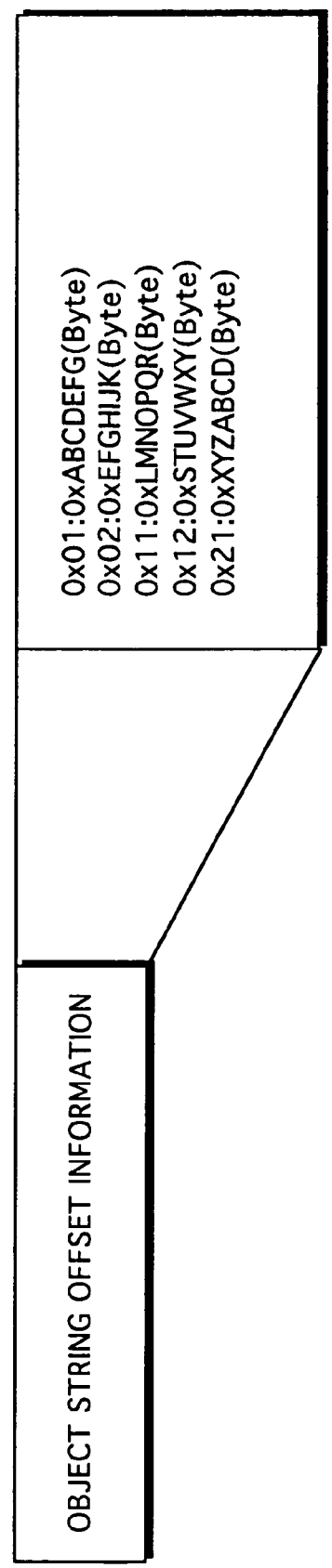

As shown in FIG. 46, the object string offset information includes passes to the object information.

Figure 48:
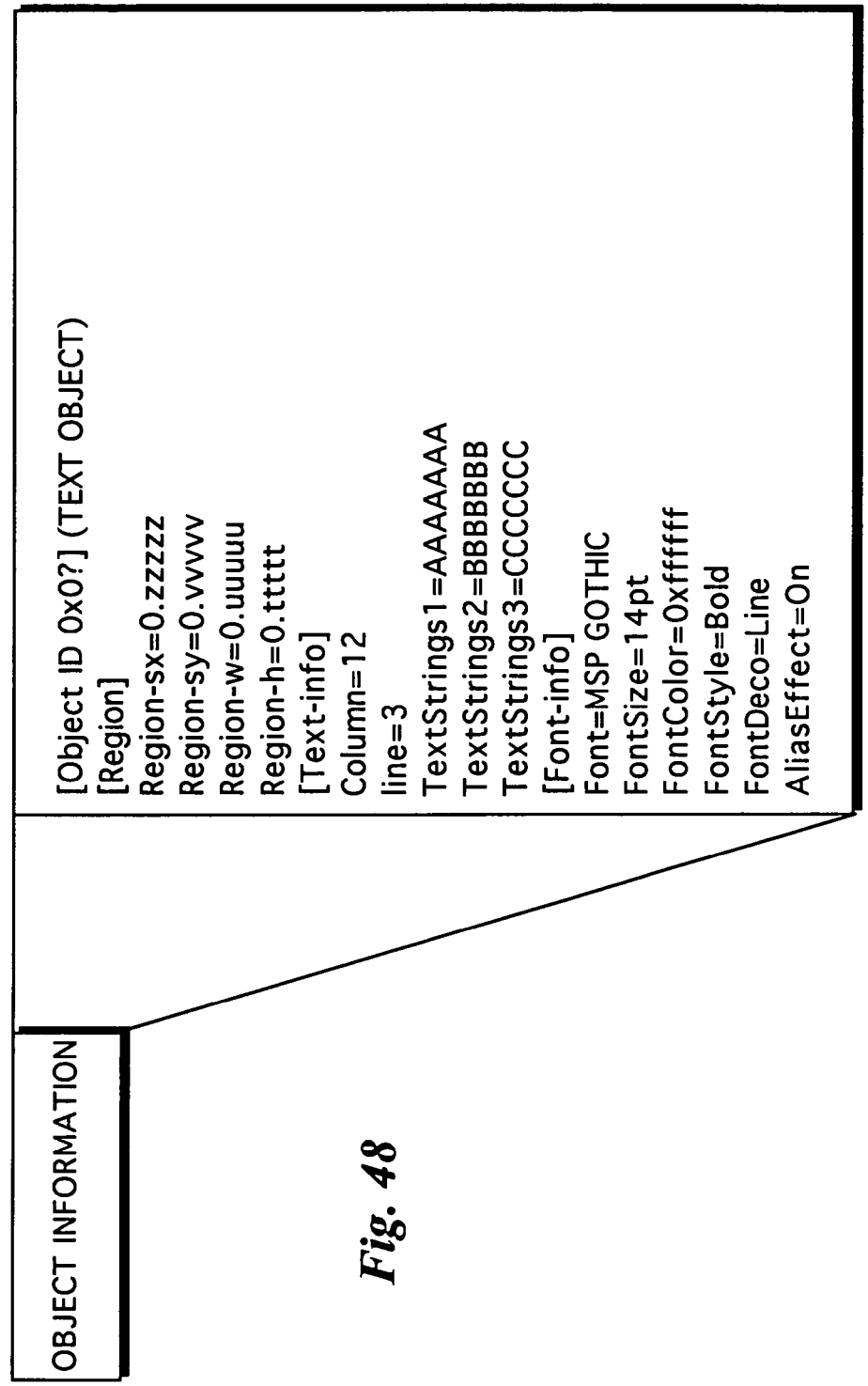

Examples of the object information include object information representing an image constituting the edited image as shown in FIG. 47, and object information representing a text included in the editing information as shown in FIG. 48. The edited image is generated on the basis of the object information.

FIG. 47 shows an example of the object information of the image which constitutes the edited image.

The object information of the image includes [Region], [Image-info], [Mask-info] and [Color-Collection].

Included in [Region] are Region-sx (x-coordinate of a left-upper corner of an image), Region-sy (y-coordinate of a left-upper corner of an image), Region-w (width of an image) and Region-h (height of an image).

Included in [Image-info] are Format (an image format), Image-for-thumbnail (an address of a thumbnail image for image display), Image-for-edit (an address of an editing image) and Image-for source (an address of a registered image).

Included in [Mask-info] are Format (an image format of a mask image), Mask-for-thumbnail (an address of a mask image of a thumbnail image for image display), Mask-for-edit (an address of a mask image of editing image) and Mask-for-source (an address of a mask image of a registered image).

Included in [Color-Collection] are Gamma R (a gamma correction value for red), Gamma G (a gamma correction value for green), Gamma B (a gamma correction value for blue), Brightness R (a chromaticity point for red), Brightness G (a chromaticity point for blue).

FIG. 48 shows an example of the object information of the text which constitutes the edited image.

The object information of the text includes [Region], [Text-info]and [Font-info].

Included in [Text-info]are Column (a number of columns), line (a number of lines), Text Strings 1 (contents of the text of the first line), Text Strings 2 (contents of the text of the second line) and Text Strings 3 (contents of the text of the third line).

Included in [Font-info] are Font (a font of the text), Font size (a size of a font of the text), Font Color (a color of the text), Font Style (a shape of a font), Font Dco (a decoration of a font) and Alias Effect (smoothing an edge).

(2) GUI (Graphical User Interface) in Image Editing Processing

Figure 49:
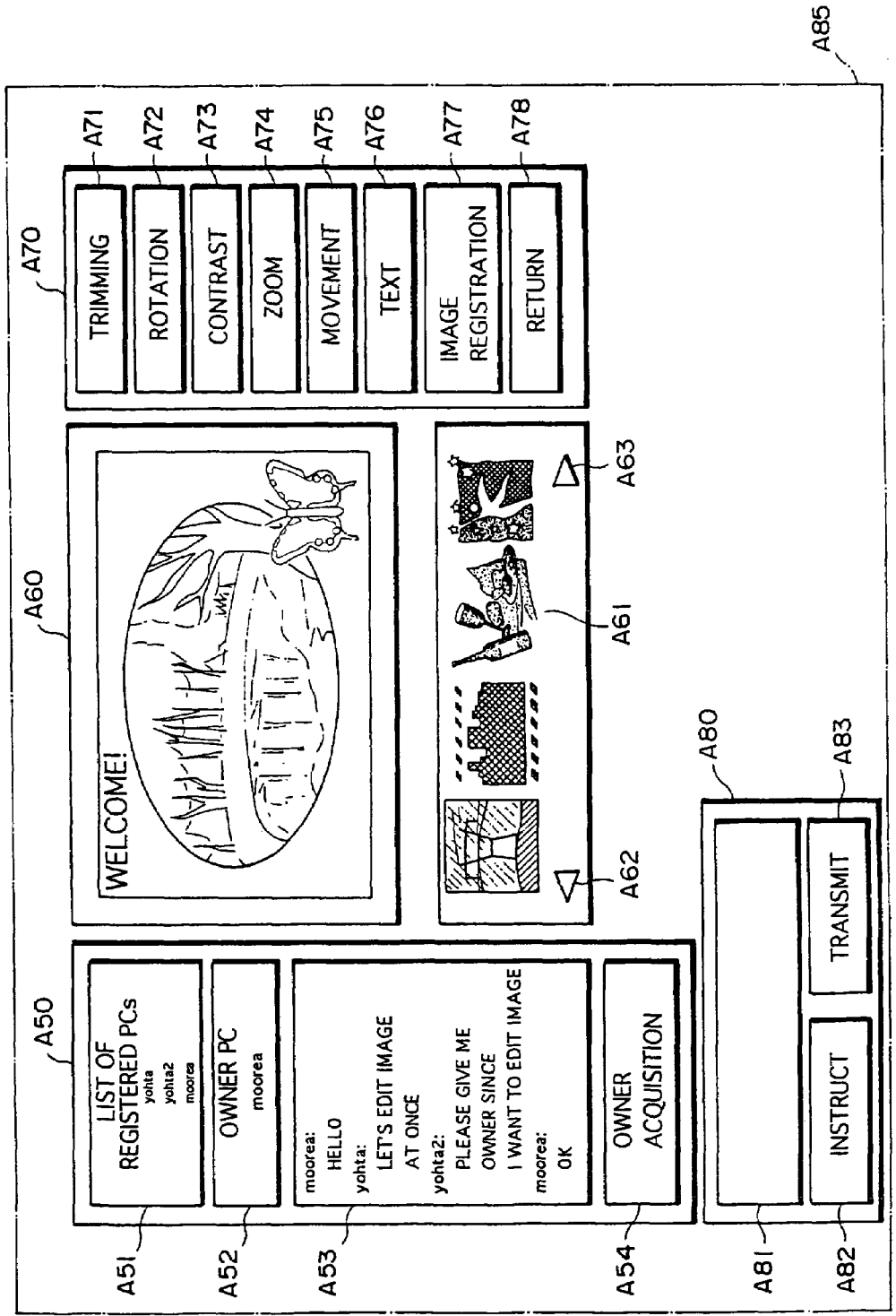
FIG. 49 illustrates a GUI for edited image entry which is displayed on a display screen of a client computer.

FIG. 49 illustrates a display screen A85 of the display device 14 in the client computers.

An edited image display area A60 where an edited image is displayed is included in the display screen A85. A registered image display area A61 is disposed below the edited image display area A60. The registered image display area A61 is an area where images registered in the group to which the client computer belongs are displayed. Arrows A62 and A63 are also displayed in the area A61, and the arrows A62 and A63 are clicked by the mouse 78, so that the area A61 is scrolled from right to left or vice versa and other registered images appear.

A connection information display area A50 is displayed adjoining the edited image display area A60 on the left side. Included in the connection information display area A50 are an area 51 where a list of client computers which are registered in the same group is displayed, an area A52 where the name of the client computer which acquires an owner flag is displayed, an area A53 where comments transmitted from the other client computers are displayed (the client names such as "moorea", "yohta" are also displayed), and an owner flag acquisition area A54 clicked when the client computer acquires the owner flag.

An editing tool display area A70 is displayed adjoining the edited image display area A60 on the right side. The editing tool display area A70 is displayed on the display screen of the display device in only the client computer which acquires the owner flag (Data representing the editing tool display area is transmitted to only the client computer acquiring the owner flag from the editing server 60). The editing tool display area A70 is used for entering commands relating to image editing and image registration. Since the editing tool display area A70 is displayed on the display screen of the display device in the client computer which acquires the owner flag, it is possible to prevent such an erroneous operation that entry of the command for image registration processing is performed by the client computer which has not acquired the owner flag.

The edited image display area A70 includes an area A71 clicked when the image is trimmed, an area A72 clicked when the image is rotated, an area A73 clicked when the contrast of the image varies, an area A74 clicked when the image is enlarged or reduced, an area A76 clicked when the image is moved, an area A76 clicked when a text is entered, an area A77 clicked when the image is registered in the editing server 60, and an area A78 clicked when an owner flag is canceled.

Furthermore, a comment entry area A80 is displayed below the connection information display area A50. The comment display area A80 includes an area A81 where an entered comment is displayed, an area A82 clicked when the comment is transmitted as a special comment to the other client computer, and an area A83 clicked when the comment is transmitted to the editing server 60.

(3) Image Editing Processing

Figure 50:
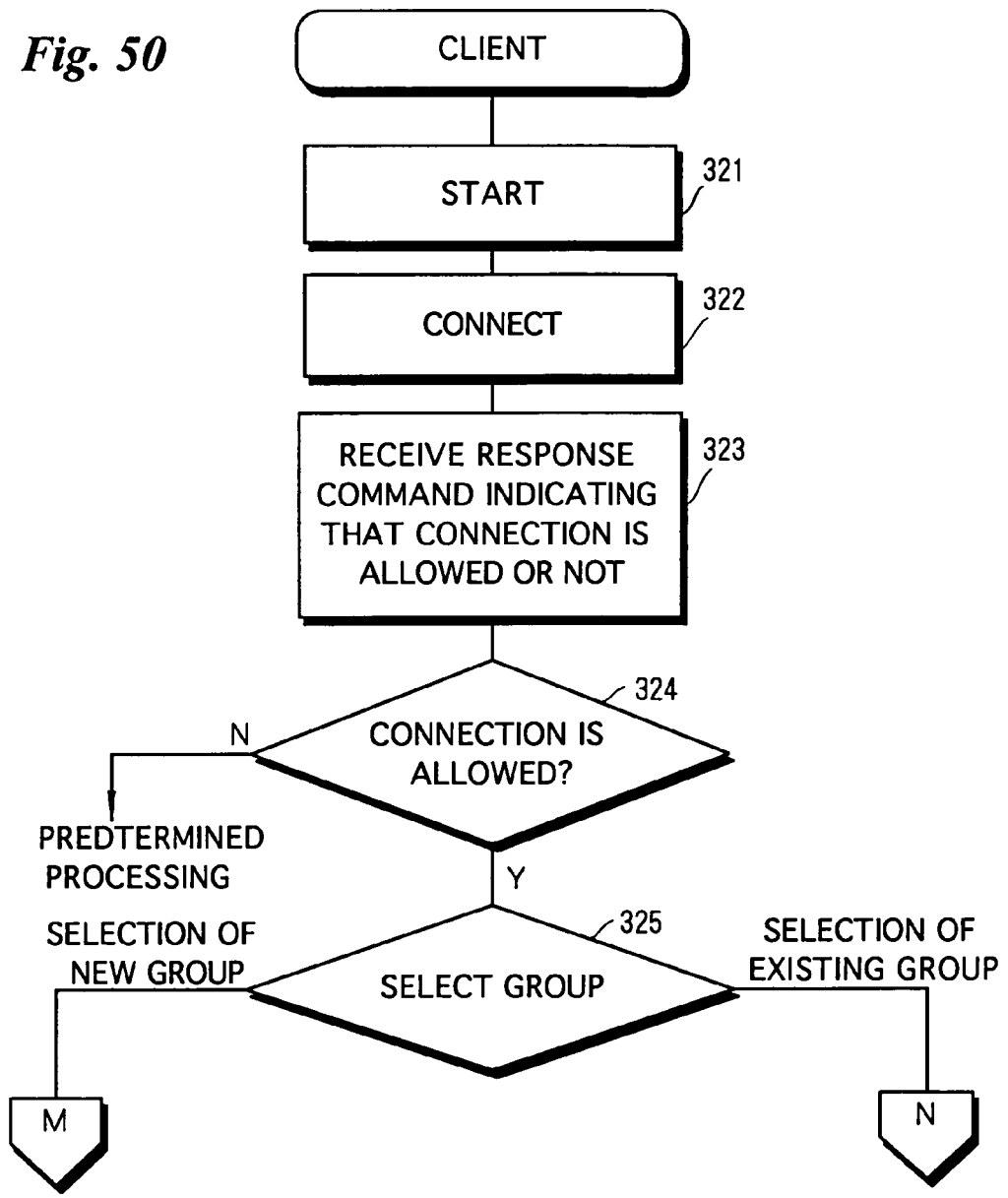
FIGS. 50 to 52 are flowcharts showing the procedure for image editing processing in a client computer.
Figure 51:
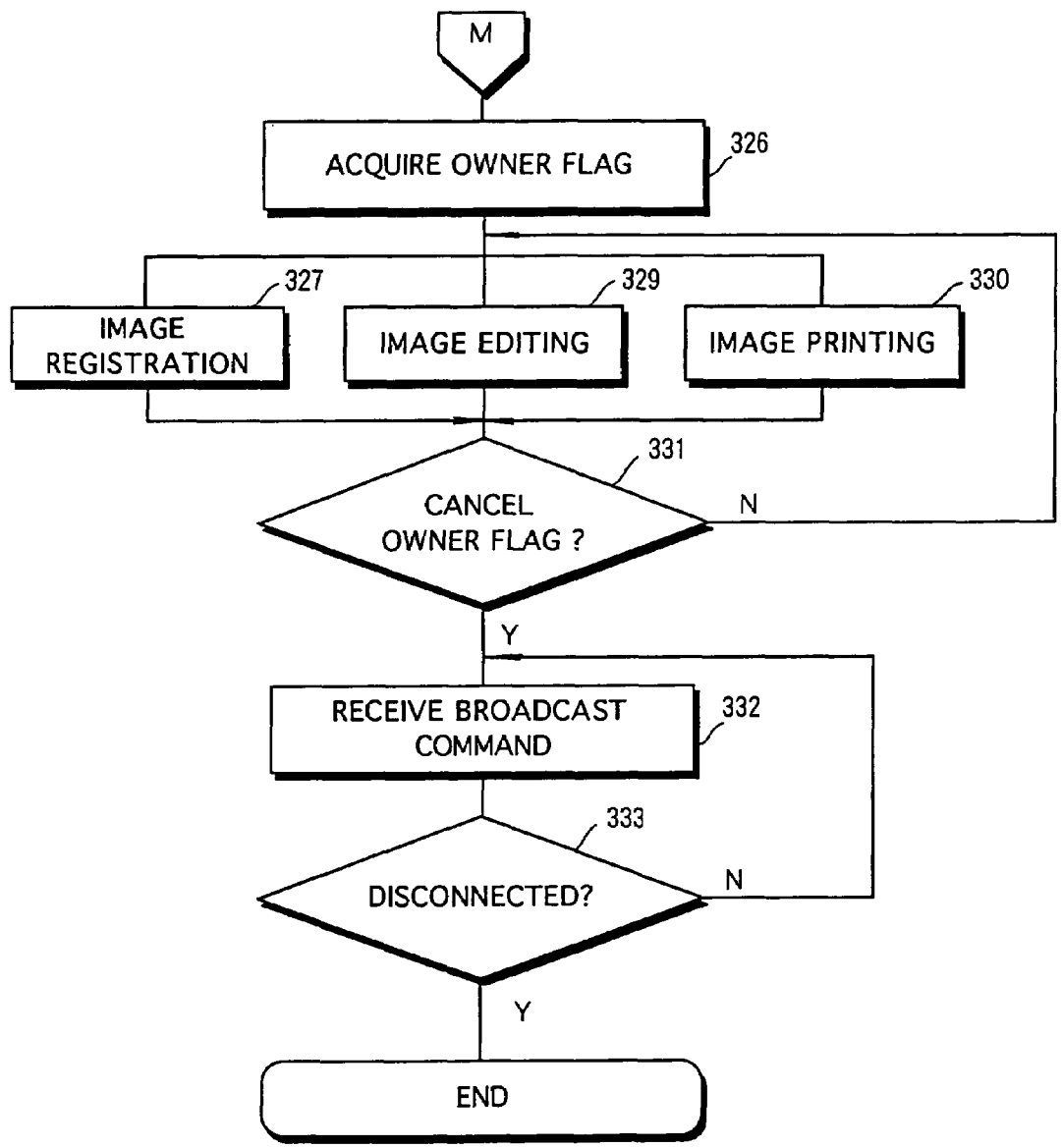
Figure 52:
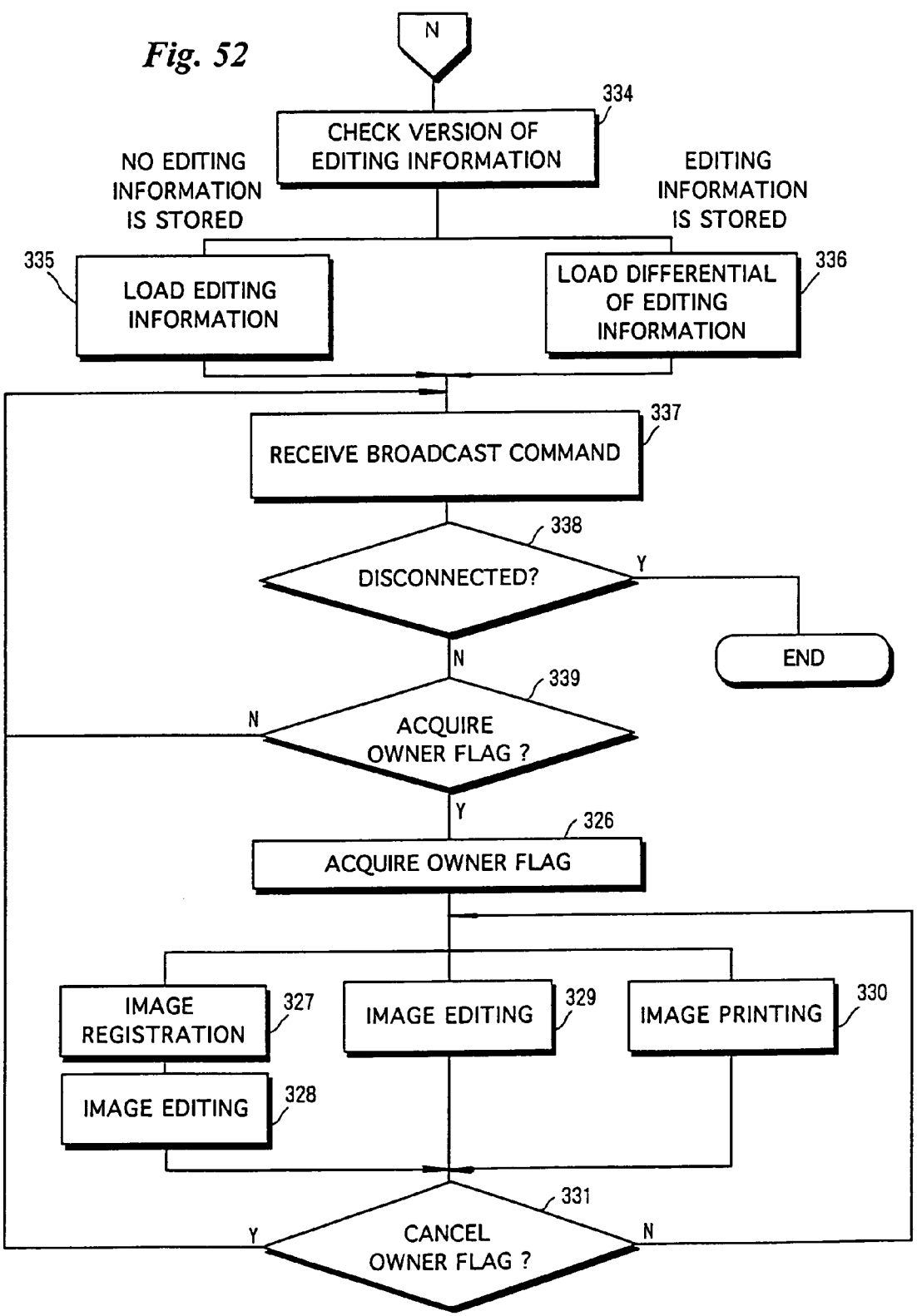
Figure 53:
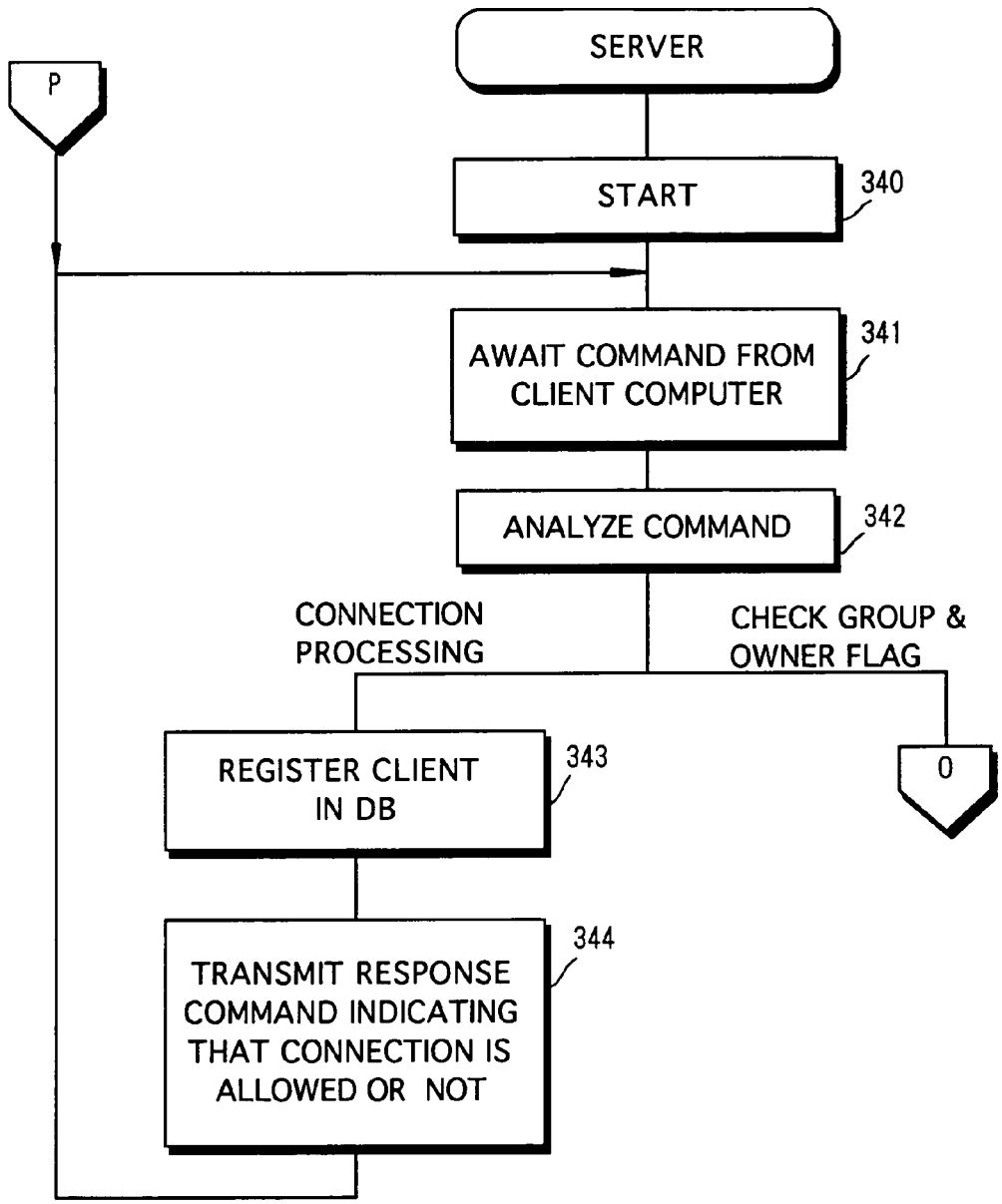
FIGS. 53 to 54 are flowcharts showing the procedure for image editing processing in an editing server.
Figure 54:
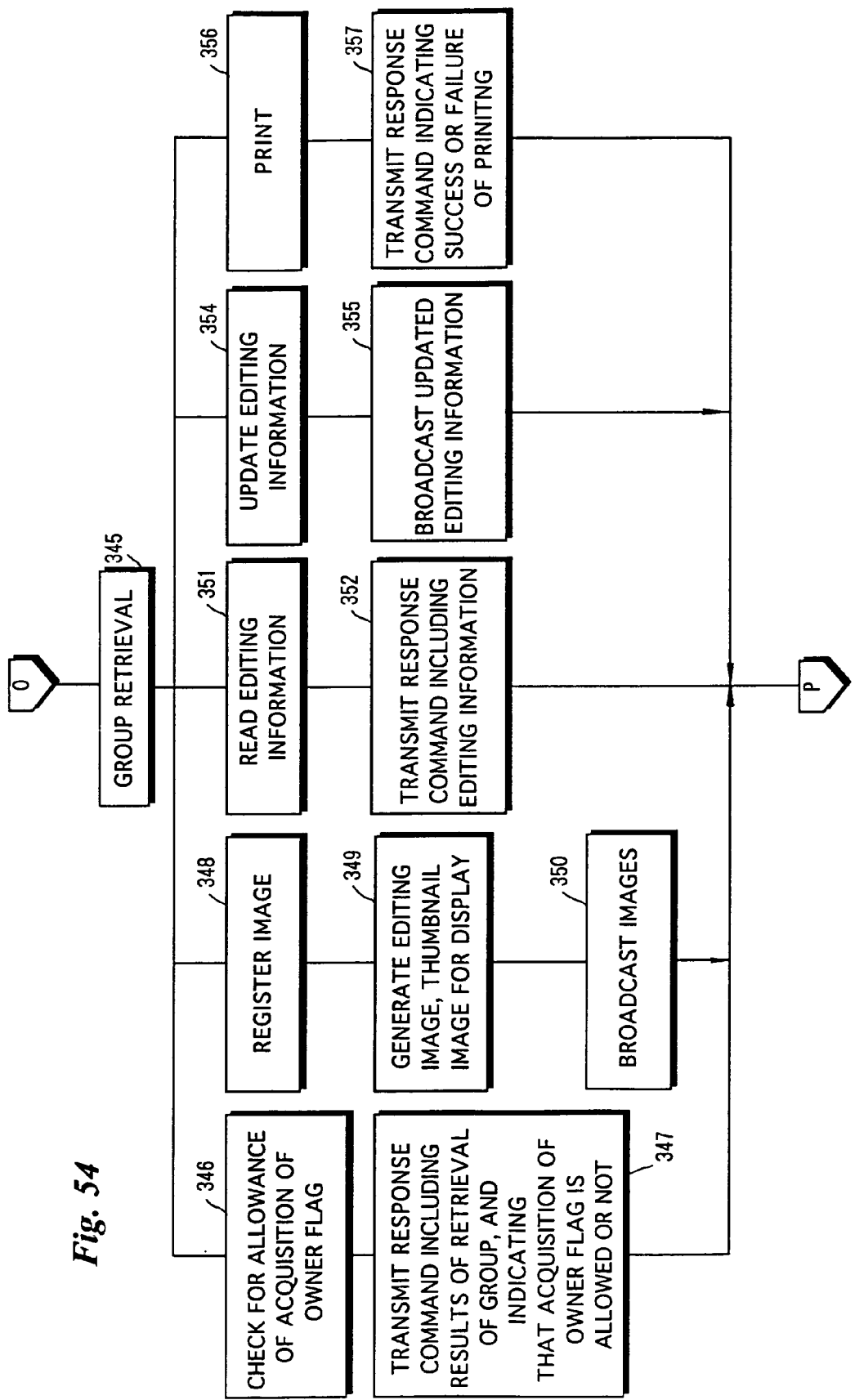

FIGS. 50 to 52 are flow charts showing the procedure for processing performed by a client computer in the image editing system. FIGS. 53 to 54 are flow charts showing the procedure for processing performed by the editing server 60 in the image editing system.

When the editing server 60 is started (step 340), a command from the client computer is awaited (step 341).

When the client computer is started (step 321), a connection command from the client computer is transmitted to the editing server 60 (step 322).

The command transmitted from the client computer is analyzed to see which of a connection command, an owner flag acquisition command, an image registration processing command, an image editing processing command, an image printing processing command and an editing information load command has been received (step 342). If it is the connection command, a client ID, the date and time for registration, the name of the client computer and a TCP/IP address which are included in the received command are stored in the system database 65 (step 343). When a group to which the client computer belongs is selected as described later, the client ID, the date and time for registration, the name of the client computer and the TCP/IP address are related to the selected group. Data indicating that connection is allowed or not is transmitted to the client computer which has transmitted the command (step 344, where transmission to a particular client computer is referred to as a response command).

When the client computer which has transmitted the connection command receives the data indicating that connection is allowed from the editing server 60 (steps 323 and 324), the group to which the client computer belongs is selected.

Prior to selecting the group, a window for group selection (not shown) is displayed on the display screen of the display device 84 of the client computer. An existing group or a new group is selected using the window for group selection. The new group is selected when a new group is created.

If the new group is selected, owner flag acquisition processing is performed by the client computer which has selected the new group (step 326). The details of the owner flag acquisition processing will be described later.

In order to acquire an owner flag, an owner flag acquisition command is transmitted from the client computer to the editing server 60. The owner flag acquisition command is analyzed in the editing server 60, to check whether or not the other client computer has already acquired an owner flag in the group to which the client computer which has transmitted the owner flag acquisition command belongs (steps 345 and 346). The results of the check indicating that the acquisition of the owner flag is allowed or not are transmitted to the client computer (step 347).

In a case where the new group is selected, client computers other than the client computer which has selected the new group do not belong to the group. Therefore, the client computer which has selected the new group can always acquire the owner flag.

When the owner flag is acquired, the user of the client computer then specifies which of image registration, image editing and image printing should be performed.

When the image registration is performed, the image registration area A77 included in the editing tool display area A70 is clicked (step 327), resulting in transition to image registration processing. The details of the image registration processing will be described later.

An image registration processing command is transmitted from the client computer to the editing server 60. Image data representing an image or images to be registered in the system database 65 in the editing server 60 is transmitted from the client computer to the editing server 60. The Image registration processing command is analyzed in the editing server 60 (step 342), so that the image data is registered in the system database 65 as image data of the group to which the client computer which has transmitted the image registration processing command belongs (steps 345, 348).

The image data transmitted from the client computer is high-quality image data for printing. In the editing server 60, image data representing an editing image and image data representing a thumbnail image for display are generated from the high-quality image data (step 349). The image data representing the editing image and the image data representing the thumbnail image for display which have been generated are also stored in the system database 65, as described above.

The image data representing the editing image and the image data representing the thumbnail image for display which have been generated are transmitted to all client computers belonging to the group to which the client computer which has transmitted the image registration processing command belongs and are connected to (or registered in) the editing server 60 (step 350) (referred to as "broadcasting"). Consequently, the thumbnail image for display and the editing image corresponding to the image which has been newly registered in the editing server 60 are respectively displayed in the registered image display area A61 and the edited image display area A60 on the display screen of the display device of the client computer.

Unless the user of the client computer cancels the owner flag (NO at step 331), any one of the image registration processing, the image editing processing and the image printing processing is possible (steps 327, 329, and 330).

When the image editing processing has been performed in the client computer, an image editing processing command, which includes new editing information having been created by the image editing processing, is transmitted from the client computer to the editing server 60.

The image editing processing command is analyzed in the editing server 60 (step 342), the group to which the client computer which transmits the image editing processing command belongs is retrieved (step 345), and the editing information which is stored in the system database 65 in correlation with the found group is updated or changed in accordance with the new editing information which has been transmitted together with the image editing processing command (step 354). The updated editing information is transmitted (broadcasted) from the editing server 60 to all client computers in the group to which the client computer which has transmitted the image editing processing command belongs and are connected to (or registered in) the editing server 60 (step 355). Consequently, a new edited image is displayed in the edited image display area A60 on the display screen of the display device 84 in the client computer connected to the editing server 60.

When the image printing processing is performed, an image printing processing command is transmitted from the client computer to the editing server 60.

The image printing processing command is analyzed in the editing server 60 (step 342), the group to which the client computer which transmits the image printing processing command belongs is retrieved (step 345), and the image editing processing is performed on the basis of the editing information which is stored in the system database 65 in correlation with the found group. Image data representing an edited image is fed to the high-quality printer 66, where a high-quality edited image is printed (step 356). A response command indicating the success or failure of the printing is transmitted to the client computer which transmits the image printing processing command (step 357). The edited image which has been printed is delivered to a user of the client computer. It goes without saying that in the system database 65, data relating to printing is recorded.

When the client computer, which has acquired the owner flag cancels, the owner flag (YES at step 331), the client computer awaits the receiving of a broadcast command transmitted from the editing server 60 (a command transmitted from the editing server 60 to all the client computers in the group which are connected to the editing server 60 is referred to as a broadcast command) (step 332). The client computer is disconnected, so that the processing performed by the client computer is terminated (step 333).

Processing in a case where a client computer selects the existing group will be described.

When the existing group is selected (step 325), it is confirmed whether or not editing information (which is stored in a hard disk) is stored in the client computer (step 334).

When the editing information is not stored, a command for loading the editing information is transmitted from the client computer to the editing server 60.

In the editing server 60, the command transmitted from the client computer is analyzed, and the command is judged to be the editing information load command, so that the editing information relating to a corresponding group is read from the system database 36 (steps 345, 351). The read editing information is transmitted from the editing server 60 to the client computer (steps 352, 335).

When the editing information is stored in the client computer, data representing the version of the editing information is transmitted from the client computer to the editing server 60.

In the editing server 60, the version of the editing information stored in the client computer is checked on the basis of the data transmitted from the client computer. If it is recognized that the latest version of the editing information stored in the editing server 60 and the version of the editing information stored in the client computer are the same by the check, the editing information stored in the client computer is the latest editing information, so that an edited image displayed in the edited image display area A60 is generated using the editing information. If the version of the editing information stored in the client computer is older than the latest version of the editing information stored in the editing server 60, the differential of the editing information between the new version and the old version is transmitted from the editing server 60 to the client computer (steps 336, 352). The latest editing information is created with use of the differential of the editing information in the client computer.

When the editing information is stored in the client computer, the client computer enters a broadcast command receiving state. When the client computer is not disconnected (step 338), resulting in transition to owner flag acquisition processing (step 339), processing after the transition is the same as that in the case where the new group is selected.

(4) Each Specific Processing (i) Owner Flag Acquisition Processing

Figure 55:
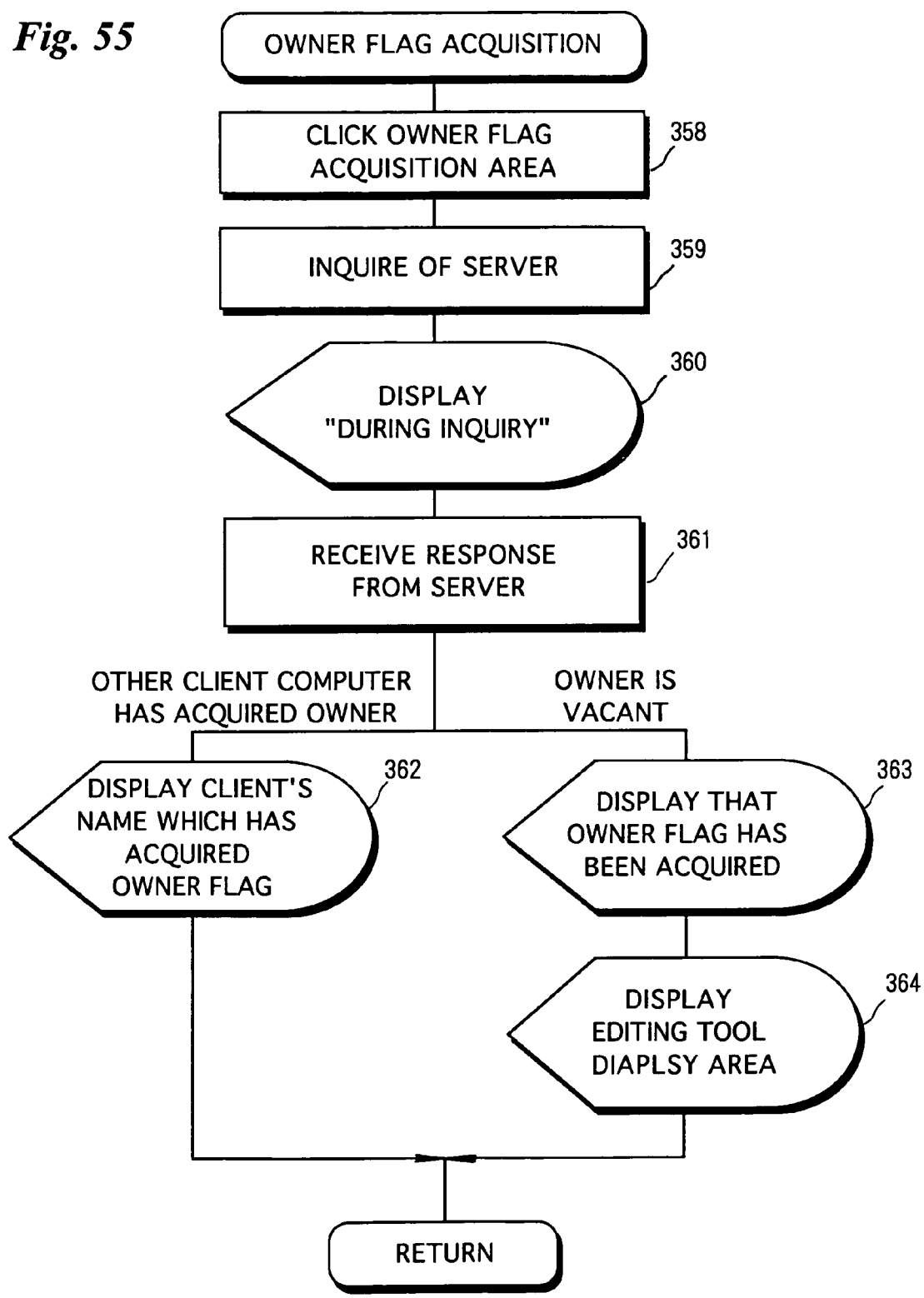
FIG. 55 is a flowchart illustrating owner flag acquisition processing in a client computer.

FIG. 55 is a flow chart showing the procedure for owner flag acquisition processing.

When a client computer is connected to the editing server 60 as described above, a GUI for image editing is displayed, as shown in FIG. 49, on the display screen of the display device 84 in the client computer. The owner flag acquisition area A54 in the connection display area A50 of the GUI is clicked, resulting in transition to owner flag acquisition processing (step 358).

When the owner flag acquisition area A54 is clicked, the client computer inquires of the editing server 60 whether or not owner flag acquisition is possible in a group to which the client computer belongs (step 359).

When the client computer inquires of the editing server 60 whether or not owner flag acquisition is possible, an owner flag stored in the system database 65 is referred to, as described above, to check whether or not an owner flag in the group to which the client computer which has made the inquiry belongs is vacant in the editing server 60. During the check, "during inquiry" is displayed on the display screen of the display device 84 in the client computer (step 360).

When the other client computer has an acquired owner flag, the name of the client computer which has acquired the owner flag is displayed in the owner flag display area A52 in the connection display area A50 (steps 361 and 362). In this case the client computer which inquires acquisition of the owner flag cannot acquire the owner flag.

When the other client computer has not acquired an owner flag, a message indicating that owner flag has been acquired in the owner flag acquisition area A54 in the connection display area A50 (step 363). The name of the client computer which has acquired the owner flag is written in the system database 65 by the editing server 60. As the client computer acquires the owner flag, the editing tool display area A70 is displayed on the display screen (step 364). The user of the client computer which has acquired the owner flag enters a command for image editing utilizing the editing tool display area A70 displayed on the display screen.

(ii) Image Registration Processing

Figure 56:
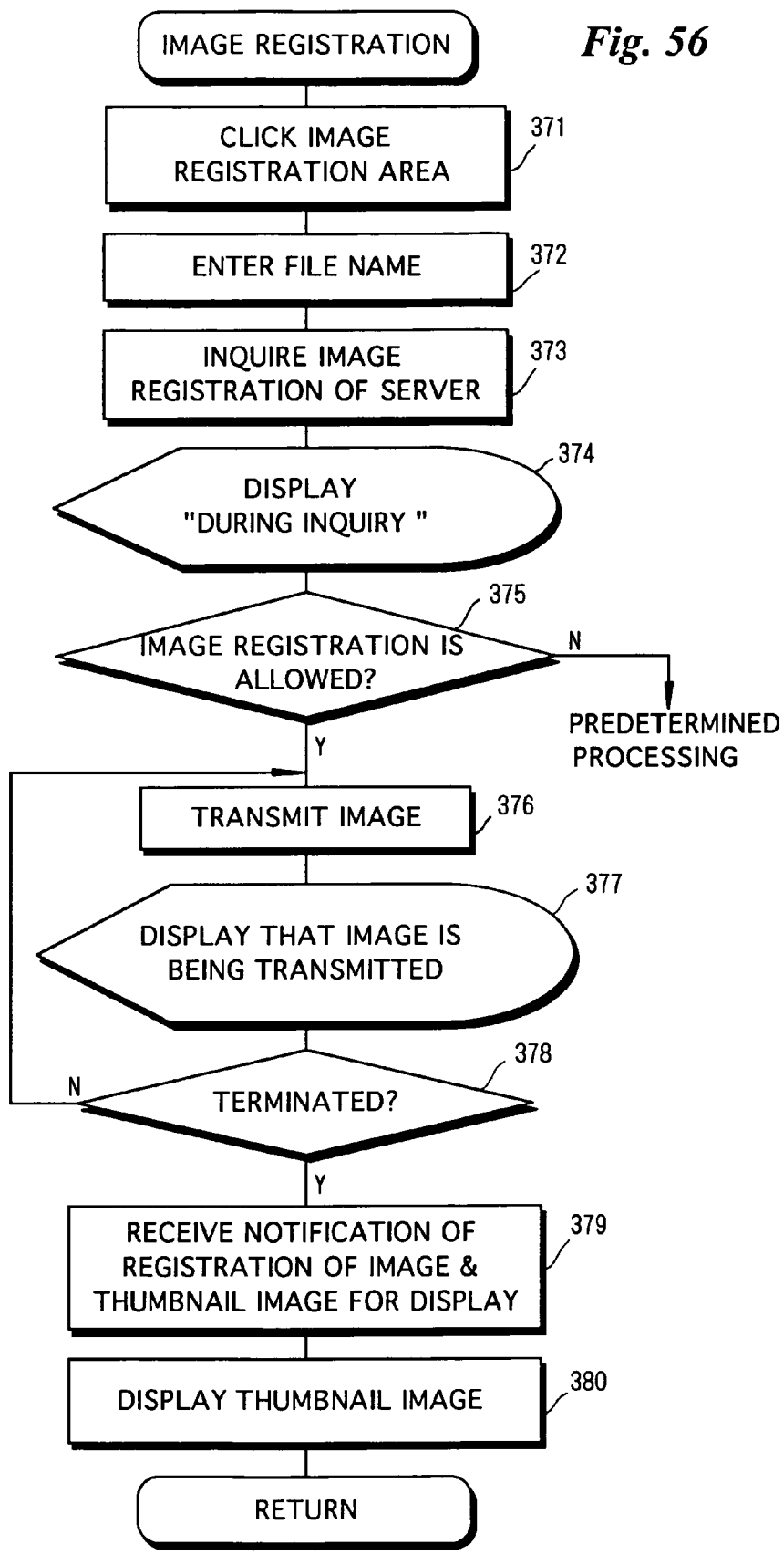
FIG. 56 is a flowchart illustrating image registration processing in a client computer.

FIG. 56 is a flow chart showing processing for registering an image in the editing server 60 from a client computer.

As described in the foregoing, the editing tool display area A70 is displayed on the display screen of the client computer which has acquired an owner flag. The image registration area A77 in the editing tool display area A70 is clicked using the mouse 78, resulting in transition to image registration processing (step 371).

The image registration area A77 is clicked, so that a window (not shown) for entering the file name of an image is displayed on the display screen of the display device 84. The file name of an image to be registered in the editing server 60 is entered into the window (step 372). When the file name is entered, the client computer inquires of the editing server 60 whether or not image registration is possible (step 373). It is judged whether or not image registration is possible in the editing server 60 in response to the inquiry. While the client computer is inquiring of the editing server 60 whether or not image registration is possible, "during inquiry" is displayed on the display screen of the client computer (step 374).

When data indicating that image registration is allowed is transmitted from the editing server 60 to the client computer (YES at step 375), image data representing an image having the entered file name is transmitted from the client computer to the editing server 60 (step 376). While the image data is being transmitted, a message indicating that the image data is being transmitted is displayed on the display screen (step 377).

When the transmission of the image data from the client computer to the editing server 60 is terminated (step 378), registration processing of the image is performed in the editing server 60, as described above, and generation processing of a thumbnail image for display and an editing image is performed. Image data representing the generated thumbnail image for display and notification that the image is registered are transmitted from the editing server 60 to the client computer, and are received by the client computer (step 379). The thumbnail image of the image newly registered in the editing server 60 is newly displayed in the registered image display area A61 on the display screen of the client computer (step 380).

(iii) Image Editing Processing

Figure 57:
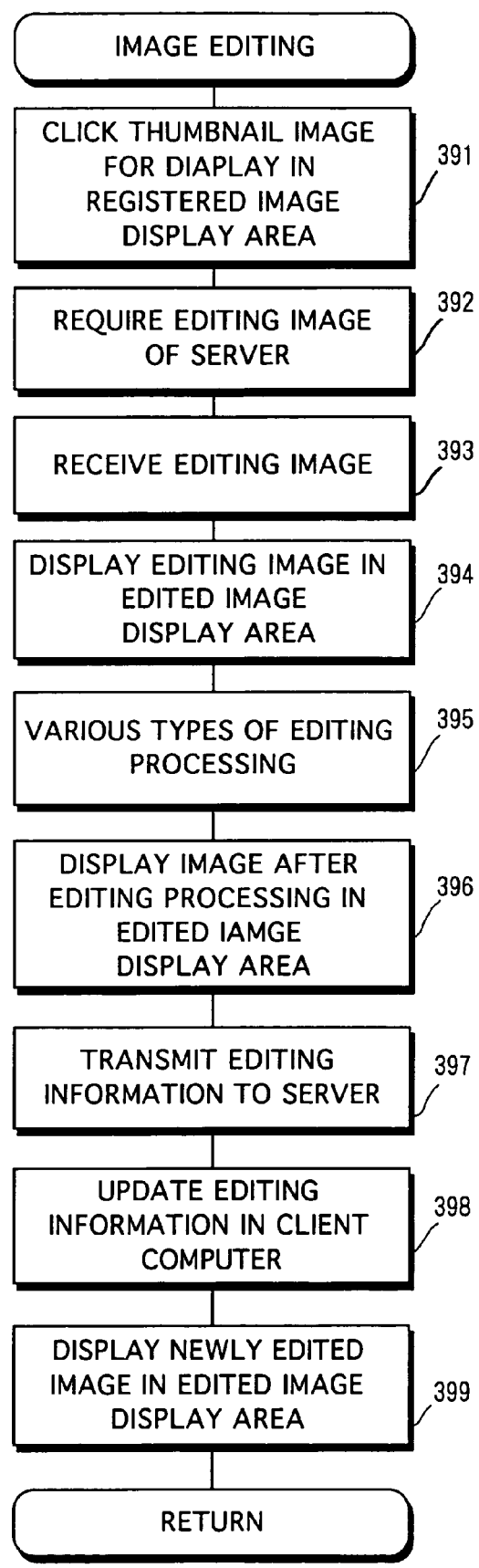
FIG. 57 is a flowchart illustrating image editing processing in a client computer.
Figure 62:
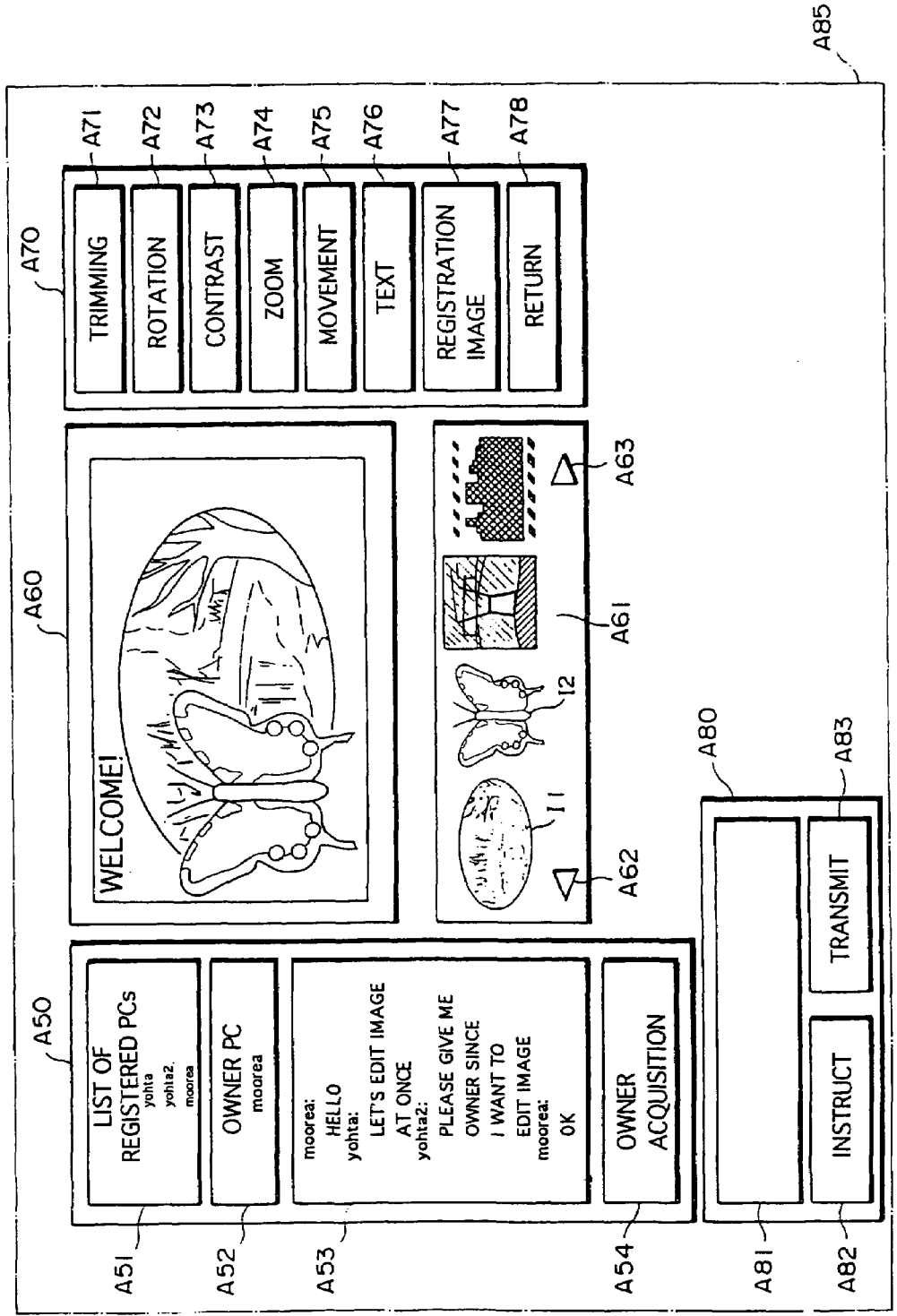
FIGS. 62 to 64 illustrate examples of a display screen of a client computer.
Figure 63:
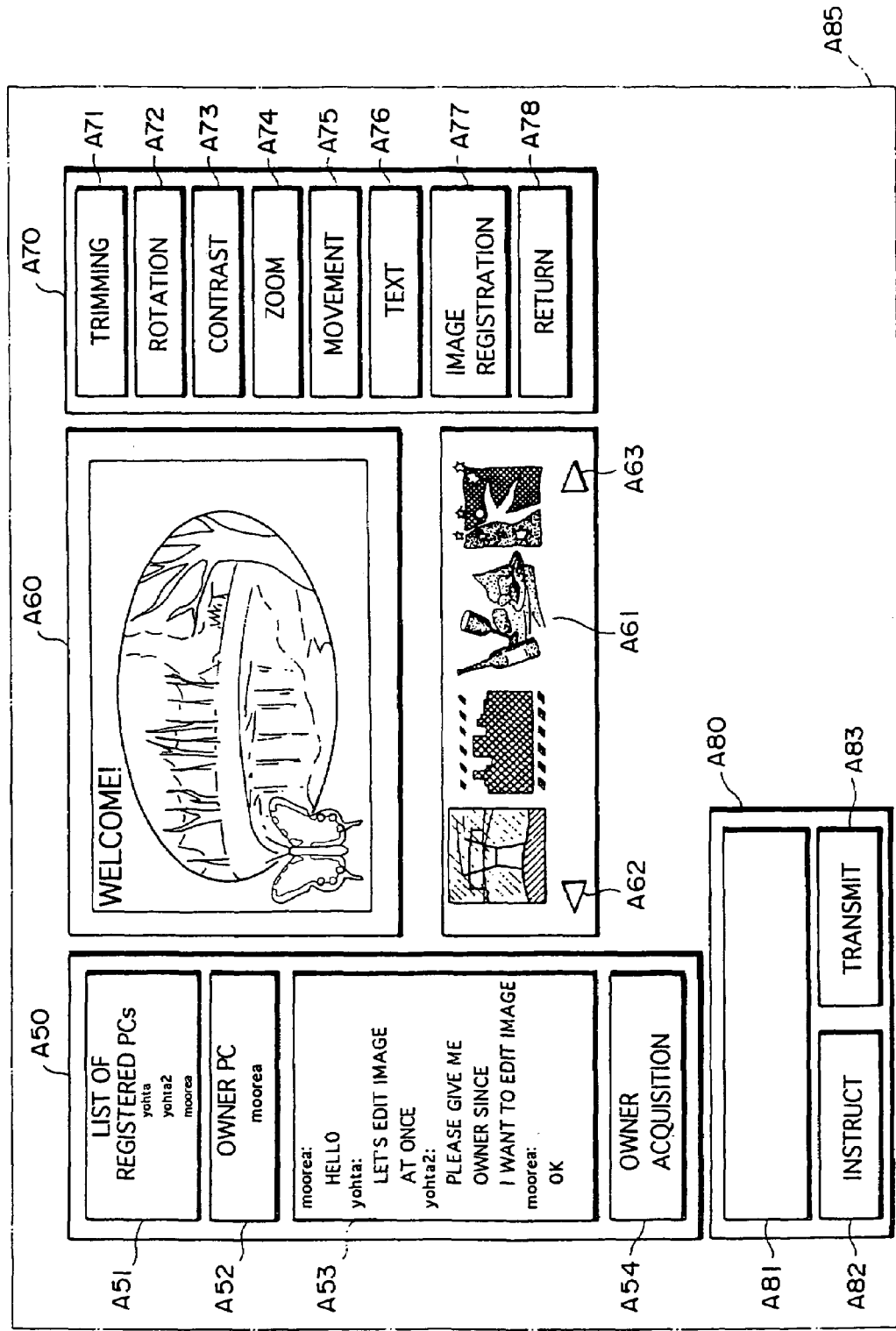
Figure 64:
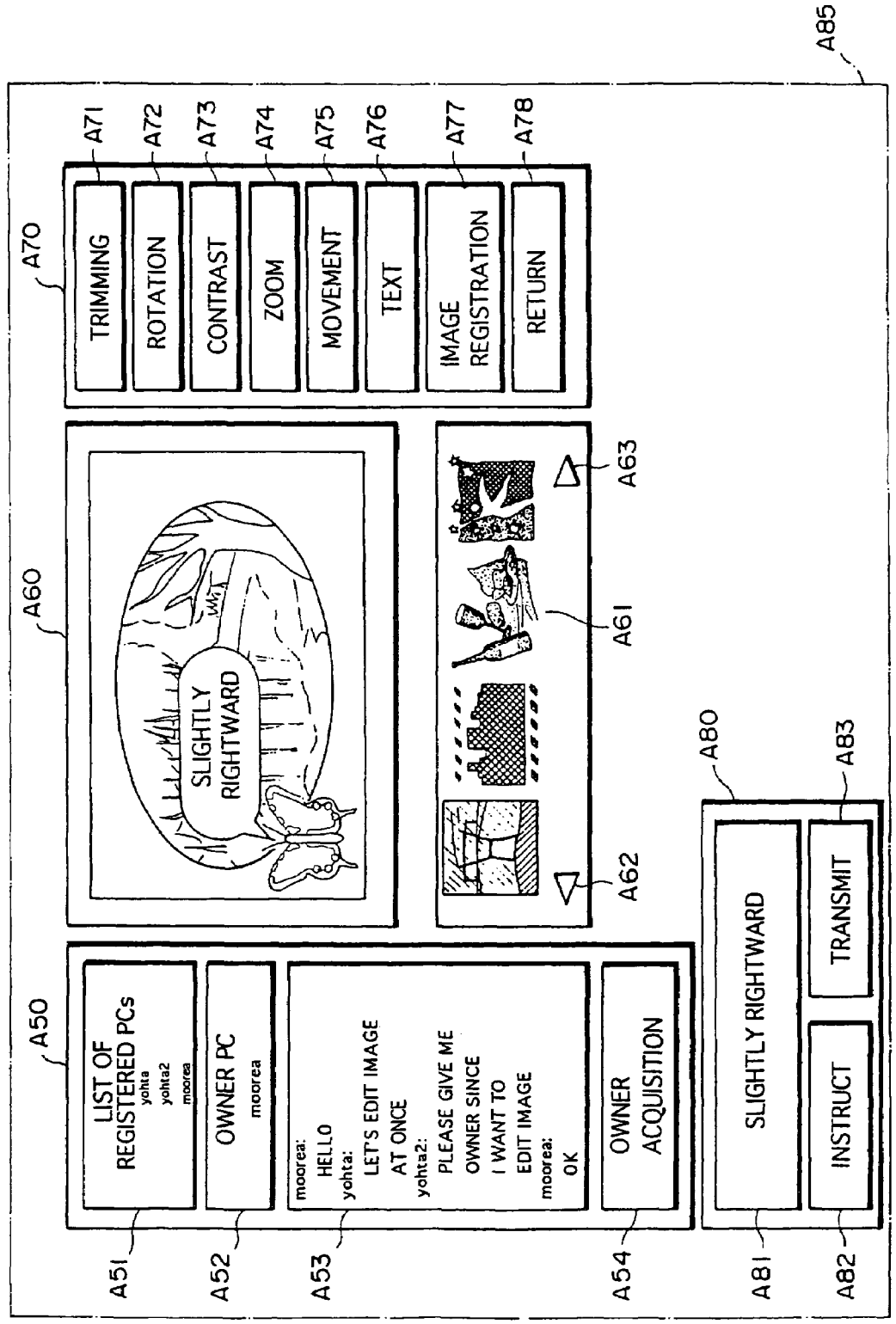

FIG. 57 is a flow chart showing the procedure for image editing processing. FIGS. 62 to 64 illustrate the display screen of the display device 84 in the client computer.

The image editing processing is performed utilizing the editing tool display area A70 displayed on the display screen of the client computer which has acquired an owner flag.

When an image displayed in the registered image display area A61 is added to an edited (or editing) image displayed in the edited image display area A60, a thumbnail image displayed in the registered image display area A61 is pointed and clicked (step 391). In order to transmit an editing image corresponding to the clicked thumbnail image from the editing server 60 to the client computer, data representing a file name of the thumbnail image is transmitted from the client computer to the editing server 60 (step 392).

In the editing server 60, a file name of an editing image data is retrieved on the basis of the file name of the thumbnail image to find the editing image data in the system database 65. Editing image data representing the editing image corresponding to the clicked thumbnail image is transmitted from the editing server 60, and is received in the client computer (step 393). The editing image is displayed in the edited image display area A60 using the received editing image data (step 394). When the editing image is displayed in the edited image display area A60, the editing image is subjected to various types of editing processing (step 395). The various types of editing processing will be described later. When the various types of editing processing are terminated, an image after the editing processing is displayed in the edited image display area A60 (step 396).

When the editing of the image is terminated in the client computer, editing information (the image editing processing command) is transmitted from the client computer to the editing server 60 (step 397).

When the editing server 60 receives the editing information, editing information stored in the system database 65 is updated by the received editing information. As the editing information is updated, the updated editing information is compared with the preceding editing information to find the differential therebetween. Data representing the differential of the editing information stored in the editing information ID area is also updated.

When the differential of the editing information is updated in the editing server 60, the updated differential of the editing information is transmitted from the editing server 60 to the other client computers, so that the editing information in the other client computers is updated (step 398). The new edited image edited using the updated editing information appears in the edited image display area A60 on the display screen of the client computers (step 399).

Referring to FIG. 62, when thumbnail images 11 and 12 out of thumbnail images for display which are displayed in the registered image display area A61 are pointed and clicked, data representing the file names of the thumbnail images are transmitted from the client computer to the editing server 60. When the data representing the file names of the thumbnail images are received in the editing server 60, editing image data representing editing images corresponding to the designated thumbnail images are transmitted to all the client computers in the group from the editing server 60. Consequently, the editing images corresponding to the thumbnail images 11 and 12 are displayed in the edited image display area A60 on the display screen of the client computers.

Description is now made of various types of editing processing performed in the edited image display area A60.

FIGS. 58a to 58f respectively illustrate windows utilized in the various types of editing processing. The window appears on the display screen of the client computer.

Figure 58A:
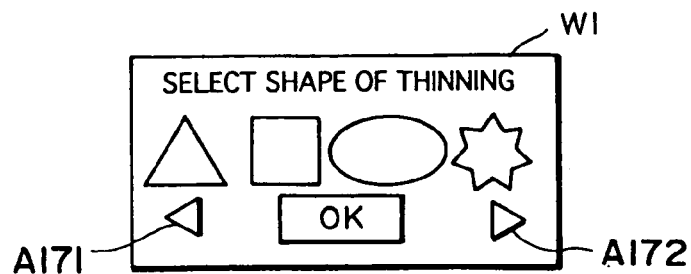
FIGS. 58a to 58f illustrate windows displayed on a display screen of a client computer.

FIG. 58a shows a window W1 for setting the shape of trimming. In order to set the shape of trimming of an editing image, the trimming area A71 in the editing tool display area A70 is clicked. The window W1 illustrated in FIG. 58a is displayed on the screen of the display device 84 in response to the click input. Various shapes of trimming are displayed in the window W1. The displayed shape of trimming is selected by being pointed and clicked. Arrows A171 and A172 are also included in the window W1. The contents of the window W1 is scrolled and the other types of shapes of trimming appear by clicking the arrows A171 or A172. An area of OK is clicked, so that the shape of trimming is determined.

Figure 58B:
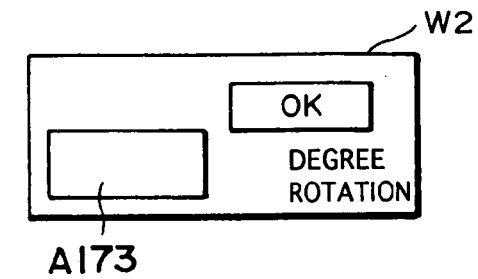

FIG. 58b illustrates a window W2 for setting the rotation of an image. In order to set the rotation of the image, the rotation area A72 in the editing tool display area A70 is clicked. The window W2 indicated by shown in FIG. 58b is displayed on the screen of the display device in response to the click input. The window W2 includes a rotation angle display area A173 for displaying the entered rotation angle, so that the rotation angle which is entered through the keyboard 77 is displayed in the area A173. When the rotation angle is fixed and an area of OK is clicked, the rotation angle is determined.

Figure 58C:
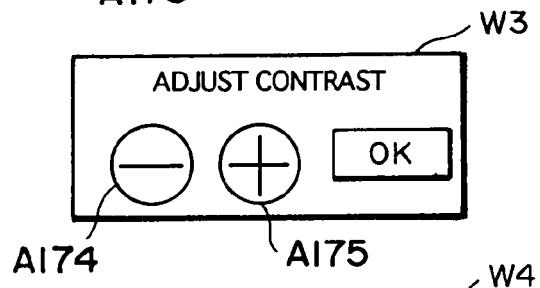

FIG. 58c illustrates a window W3 for contrast adjustment. In order to make the contrast adjustment, the contrast area A73 in the editing tool display area A70 is clicked. The window W3 shown in FIG. 58c is displayed on the screen of the display device in response to the click input. The window W3 includes an area A174 clicked when the contrast is weakened, and an area A175 clicked when the contrast is strengthen. The areas are clicked, so that the contrast of an edited or editing image displayed in the edited image display area A60 varies. When the contrast is decided, an area of OK is clicked, so that the contrast of the edited or editing image is determined.

Figure 58D:
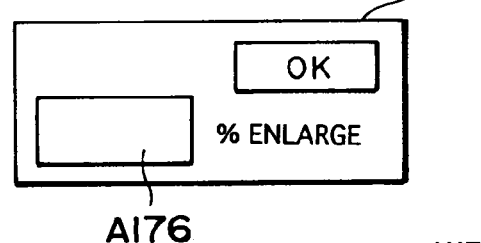

FIG. 58d illustrates window W4 for zoom adjustment. In order to make the zoom adjustment, the zoom area A74 in the editing tool display area A70 is clicked. The window W4 shown in FIG. 58d is displayed on the screen of the display device in response to the click input. A word "enlargement" is displayed in the window W4. When the word "enlargement" is clicked, it is switched to a word "reduction". The word "enlargement" or "reduction" is clicked, so that the enlargement or reduction of the edited image can be designated.

When the enlargement ratio or the reduction ratio is entered through the keyboard 77, it is displayed in an area A176. When the enlargement ratio or the reduction ratio which has been entered is fixed, an area of OK is clicked, so that the enlargement ratio or the reduction ratio is determined.

Figure 58E:
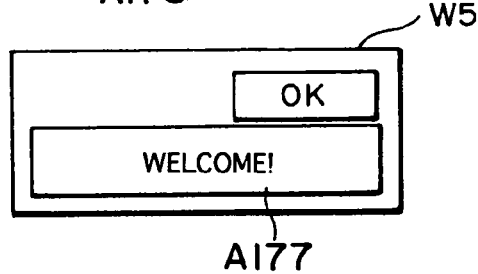

FIG. 58e illustrates a window W5 for adding a text (a set of characters, a character string, a character, or a word) on an edited or editing image. In order to add the text on the edited or editing image, the text area A76 in the editing tool display area A70 is clicked. The window W5 shown in FIG. 58e is displayed on the screen of the display device in response to the click input. The window W5 includes an area A177 where the text to be added on the edited or editing image is displayed. The text to be added on the edited or editing image is entered through the keyboard 77, and the entered text is displayed in the area A177. When the text displayed in the area A177 is fixed and an area of OK is clicked, the text to be added (overwritten) on the edited image is determined. In FIG. 62, a word "Welcome !" is entered, and is overwritten on the edited image utilizing the window W5.

Figure 58F:
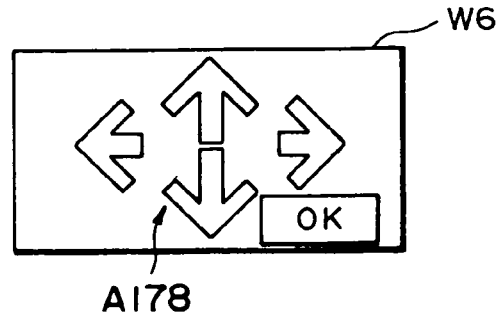

FIG. 58f illustrates a window W6 for moving the position of an image constituting an edited image or an added (overwritten) text. In order to move the position, the movement area A75 in the editing tool display area A70 is clicked. The window W6 shown in FIG. 58f is displayed on the screen of the display device in response to the click input. The window W6 includes an arrows A178 for moving the position upward, downward, rightward or leftward. The image or text to be moved is designated on the edited image display area A60 by being pointed and clicked, and is moved to a desired position by clicking one of the arrows A178 in the window W6. When a position which is a destination of the movement is fixed, and an area of OK is clicked, the position which is a destination of the movement is determined.

(iv) Owner Flag Cancel Processing

Figure 59:
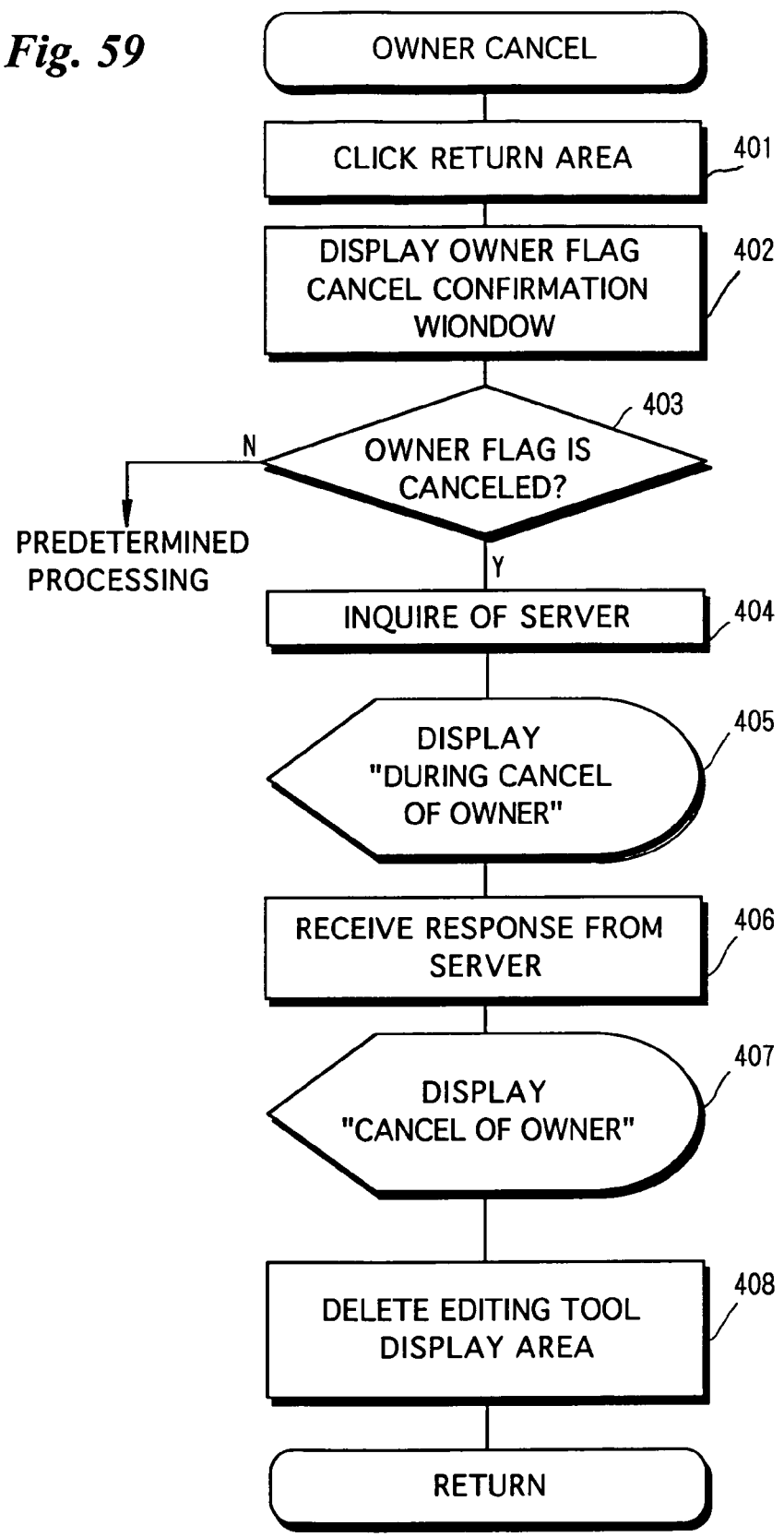
FIG. 59 is a flowchart showing owner flag cancel processing in a client computer.

FIG. 59 is a flow chart showing the procedure for processing of a client computer which has acquired an owner flag canceling the owner flag.

When the client computer has acquired the owner flag, the editing tool display area A70 is displayed on the display screen A85. The "return" area A78 in the editing tool display area A70 is clicked, resulting in transition to the owner flag cancel processing (step 401). When the "return" area A78 is clicked, an owner flag cancel confirmation window (not shown) is displayed on the display screen A85 (step 402).

In the owner flag cancel confirmation window, it is confirmed whether or not an owner flag is canceled (YES at step 403). The client computer inquires of the editing server 60 that an owner flag is canceled (step 404).

When the client computer inquires of the editing server 60 that an owner flag is canceled, it is confirmed in the editing server 60 whether or not the client computer which has made the inquiry has acquired an owner flag while referring to the system database 65. While the client computer is inquiring of the editing server 60, "during cancel of owner flag" is displayed on the display screen of the client computer (step 405).

If it is confirmed that the client computer which has inquired has acquired the owner flag, the name of the client computer having acquired the owner flag is erased from the system database 65. The owner flag cancel processing is terminated. When data indicating that owner flag cancel processing has terminated is transmitted from the editing server 60 to the client computer, and is received by the client computer (step 406), "cancel of owner flag" is displayed on the display screen of the client computer (step 407). The client computer cancels the owner flag, so that the editing tool display area A70 displayed on the display screen A85 disappears.

(v) Comment Transmission/Receiving Processing

Figure 60:
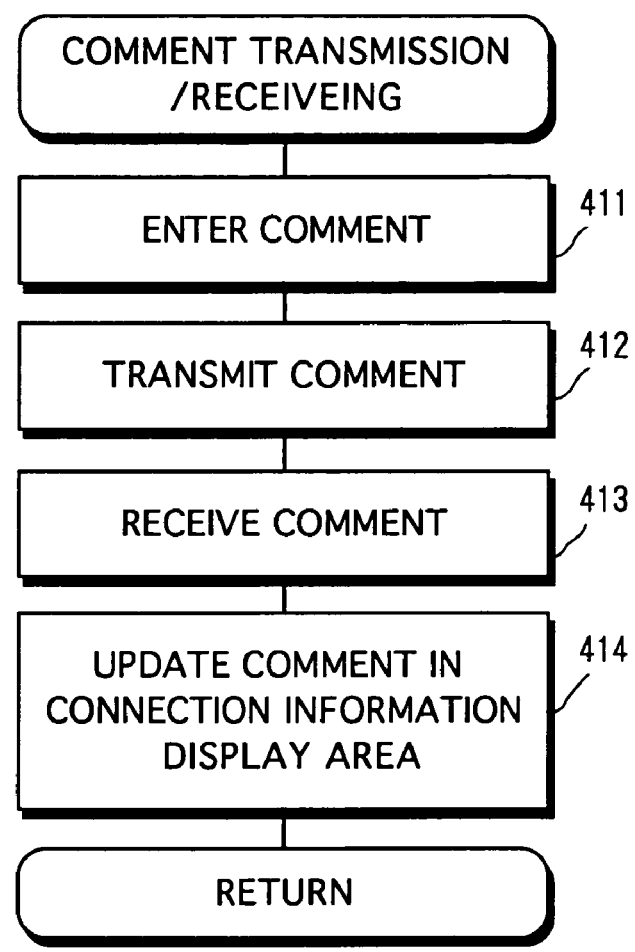
FIG. 60 is a flowchart showing comment transmission/receiving processing in a client computer.

FIG. 60 is a flow chart showing the procedure for comment transmission/receiving processing.

The comment display area A81 in the comment entry area A80 is clicked, so that a comment can be entered into the area A81.

The comment is entered from the keyboard 77 of the client computer (step 411). When the comment is entered, a "transmission" area is clicked, so that text data representing the entered comment is transmitted from the client computer to the editing server 60 (step 412).

The text data representing the comment which has been transmitted from the client computer is received in the editing server 60. The text data, together with the comment number, the date and time when the comment was issued, and the name of the client computer which issued the comment, described above, is stored in the system database 65. When the comment and the like are stored in the editing server 60, the comment is transmitted to all the other client computers in a group to which the client computer which issued the comment belongs and are connected to the editing server 60 (step 413).

In the client computer which has received the comment, the comment display area A53 in the connection information display area A50 of the display screen A85 is updated (step 414).

(vi) Special Comment Transmission/Receiving

Figure 61:
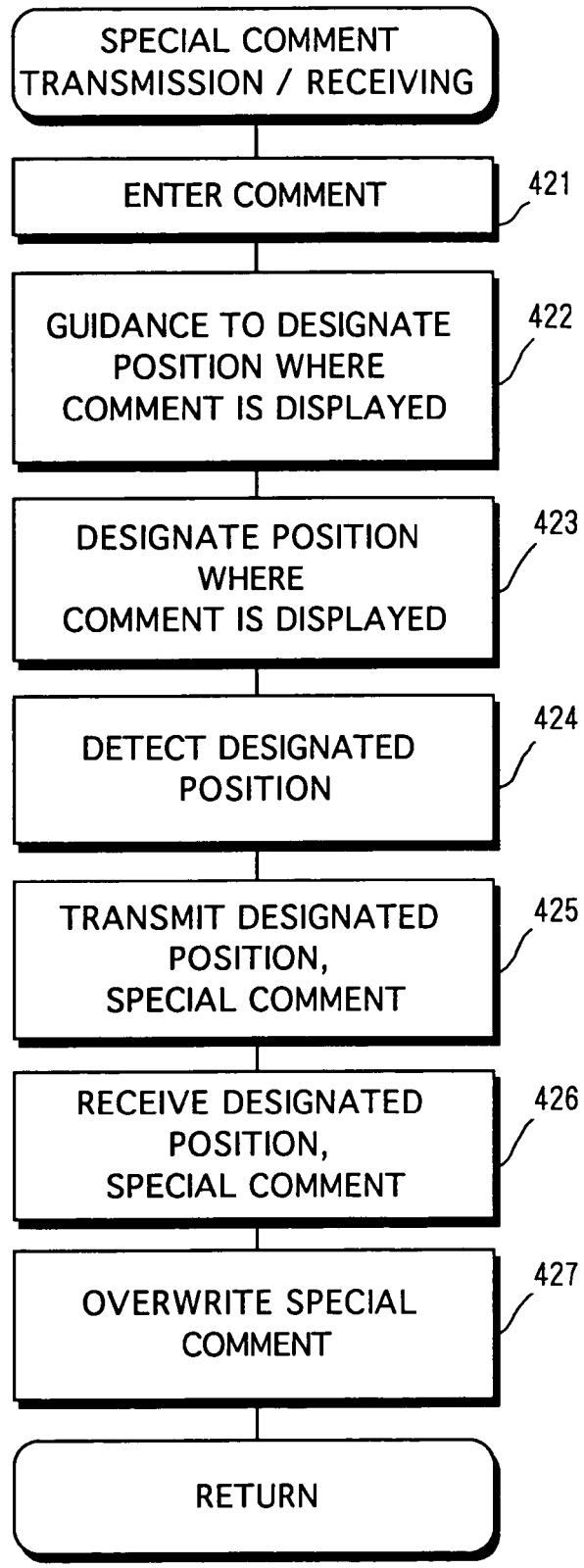
FIG. 61 is a flowchart showing special comment transmission/receiving processing in a client computer.

FIG. 61 is a flow chart showing the procedure for special comment transmission/receiving processing.

A special comment is entered using the keyboard 77 of the client computer (step 421). The contents of the entered special comment are displayed in the area A81.

The special comment is displayed on an edited image. Accordingly, the position where the comment is displayed is forced to be designated on the display screen (step 422). The position where the comment is displayed on the edited image is designated by the mouse 78 (step 423). When the position is designated, the designated position is detected (step 424).

The "instruction" area A82 in the comment entry area A80 is clicked, so that data representing the designated position and the entered special comment, together with the special comment number, the date and time when the special comment was issued and the name of the client computer which issued the special comment, are transmitted from the client computer to the editing server 60 (step 425).

When the data representing the designated position and the entered special comment are received in the editing server 60, a file relating to a special comment stored in the system database 65 is updated (step 426). When the data relating to the special comment stored in the system database 65 is updated by the editing server 60, data relating to the updated special comment is transmitted to all the other client computers in a group to which the client computer which issued the special comment belongs and are connected to the editing server 60. When the client computer receives the data relating to the special comment, the special comment is displayed in the position designated on the edited image displayed in the edited image display area A60 (step 427).

(5) Reediting of Edited Image

As described in the foregoing, an edited image is generated, as shown in FIG. 62, by one client computer which has acquired an owner flag.

When reediting processing of the edited image generated by the one client computer is performed by other client computer, the other client computer which performs the reediting processing acquires an owner flag.

When an image 12 in the edited image, for example, is reduced by the other client computer which has acquired the owner flag, the image 12 in the edited image is pointed and clicked, and a zoom area A74 is clicked, as described above, and the reduction ratio of the image is set. Consequently, the image 12 is reduced, as shown in FIG. 63, depending on the reduction ratio.

When the edited image thus reedited is further reedited, the owner flag is acquired by a client computer which reedits the edited image. A special comment is entered such that the position of the image 12 is shifted slightly rightward, for example, by the client computer which has acquired the owner flag. The special comment is displayed on the edited image, as shown in FIG. 64, by entering the special comment. Any one of the client computers acquires an owner flag by seeing the special comment, so that the editing processing is performed such that an edited image based on the special comment is generated.

As described in the foregoing, a final edited image is generated, as shown in FIG. 49. One edited image is generated by a plurality of client computers.

(E) Fifth Embodiment

In the above-mentioned fourth embodiment, only one of client computers in a group acquires an owner flag, and the one client computer which has acquired the owner flag is allowed to edit an image. When the one client computer in the group acquires the owner flag, the other client computers in the group are not allowed to edit an image.

In the fifth embodiment, there are a case where the whole of an edited image is edited and a case where images (referred to as object images) constituting the edited image are subjected to object image editing (addition, alteration (including change in the position where the object image is arranged, or enlargement or reduction of the object image), deletion, etc.).

When the whole of the edited image is edited, only one of client computers in a group acquires an owner flag (which is referred to as an edited image owner flag), and the one client computer which has acquired the edited image owner flag is allowed to edit the whole of the edited image. When the one client computer in the group acquires the edited image owner flag, the other client computers in the group are not allowed to edit the whole of the edited image.

When the object images are edited, an object image owner flag relating to the object image to be edited out of the object images constituting the edited image is acquired. One of the client computers which has acquired the object image owner flag is allowed to edit the corresponding object image. The other client computers which have not acquired the object image owner flag are not allowed to edit the object image for the object image owner flag which has been acquired by the one client computer. The other client computers are allowed to edit the object image other than the object image for the object image owner flag which has been acquired by the one client computer. However, the other client computers are not allowed to edit the object image when an object image owner flag corresponding to the object image or the edited image owner flag is acquired by the client computer other than the other client computers.

Figure 65:
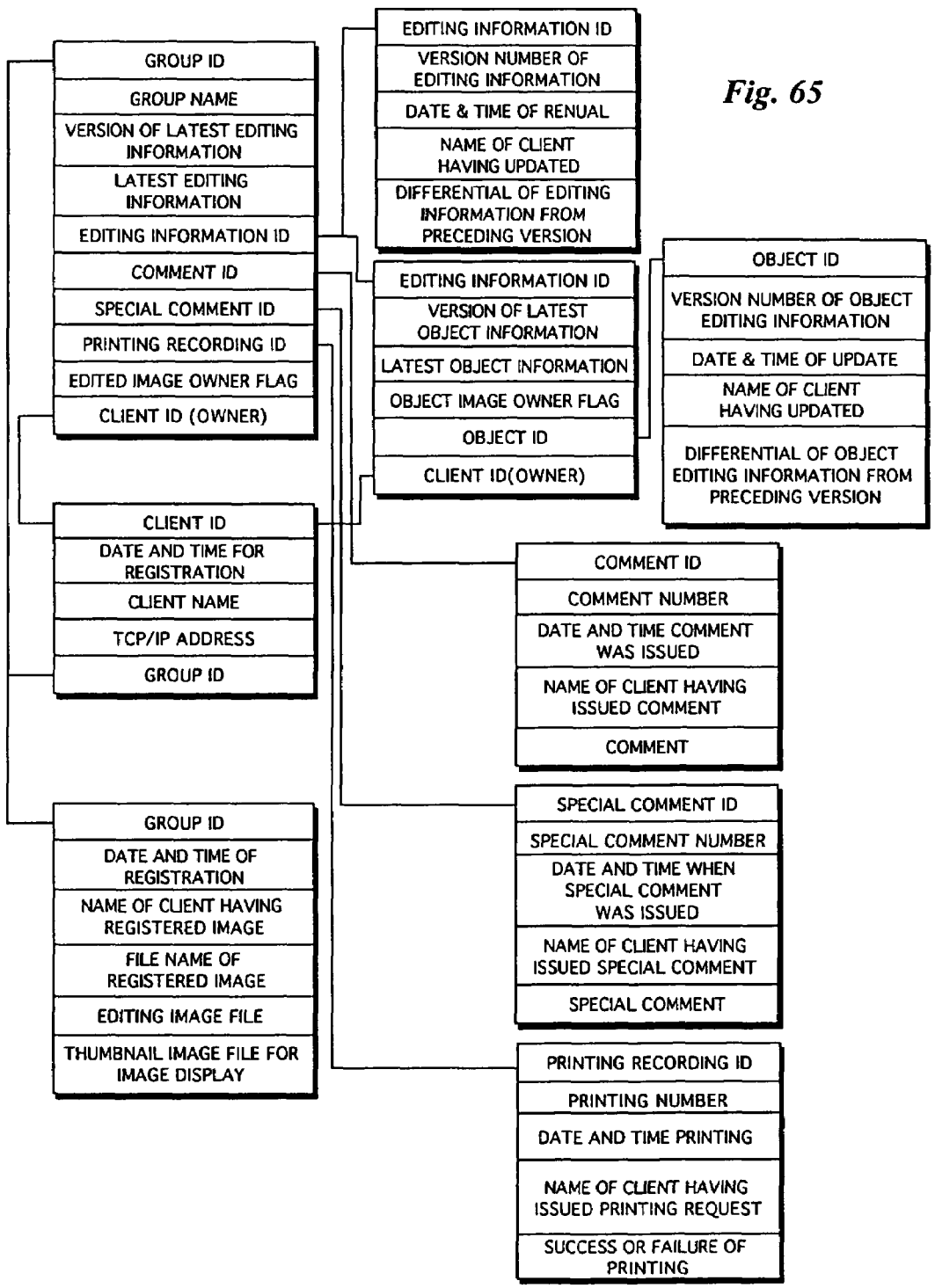
FIGS. 65 to 71 illustrate the fifth embodiment of the present invention.

FIG. 65 illustrates a data structure relating to one group stored in a system database 65. FIG. 65 corresponds to FIG. 43. In FIG. 65, a part, which differs from that shown in FIG. 43, of the data structure is indicated by hatching.

In FIG. 65, an owner flag managed by a group ID in FIG. 43 is managed upon being named an "edited image owner flag". The edited image owner flag is defined in correspondence with an edited image.

A version of the latest object information, the latest object information, an object image owner flag, an object ID (which identifies an object image) and a client ID are newly managed by an editing information ID. The information newly managed by the editing information ID correspond to each of object images constituting the edited image.

The version number of object editing information, the date and time when the version of the object editing information was updated, the name of a client computer which updated the version, and a differential of object editing information from the preceding version are managed.

Figure 66:
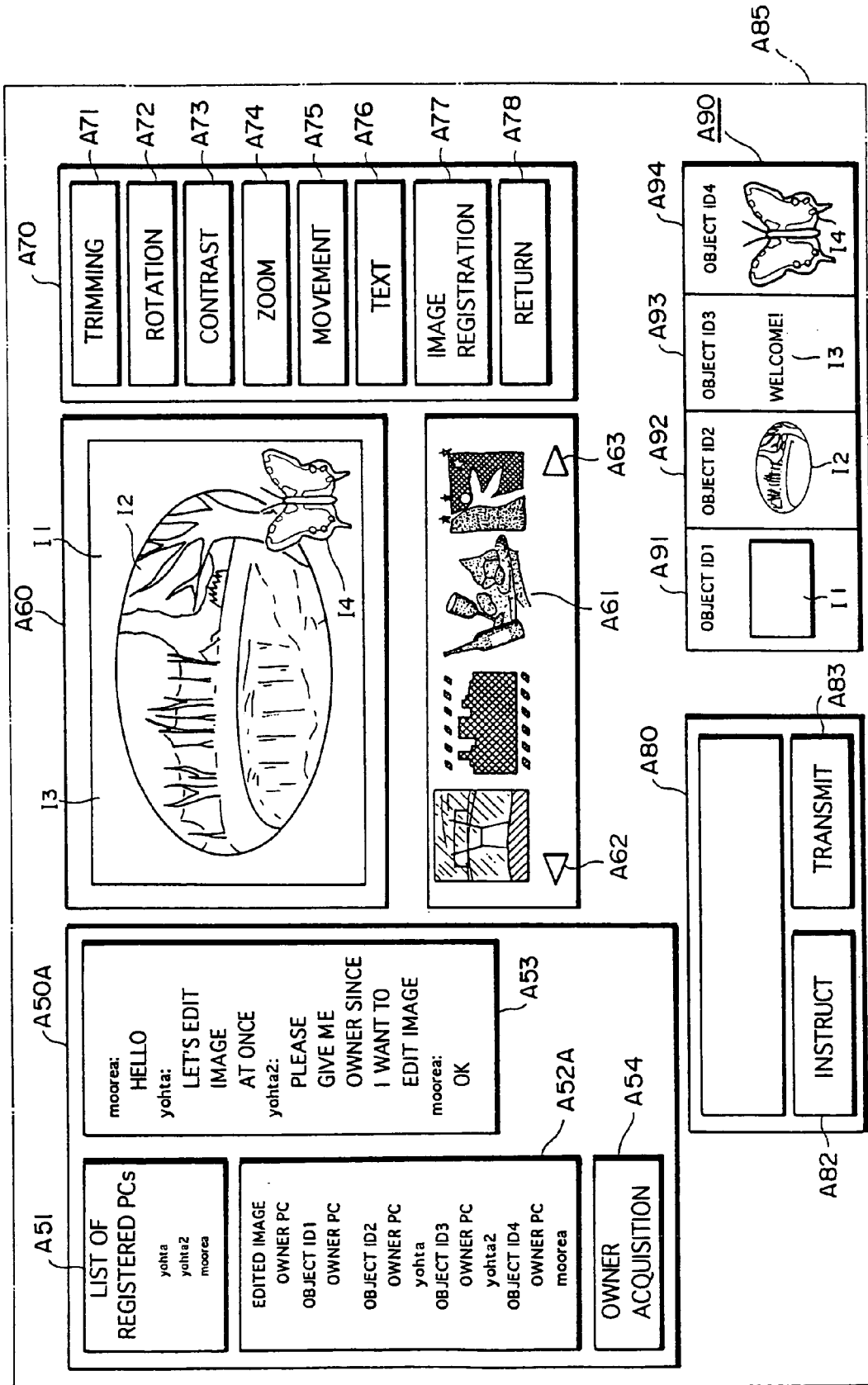

FIG. 66 illustrates one example of a display screen of a display device in a client computer. The areas having the same functions as the functions of the areas shown in FIG. 49 are assigned the same reference numerals and hence, the description thereof is not repeated.

A connection information display area A50A is displayed on the left side of the screen. The connection information display area A50A includes an area A52A where the names of client computers which acquire owner flags are displayed. In the fifth embodiment, an owner flag can be acquired for each of object images constituting an edited image. Therefore, the names of client computers which acquire object image owner flags are displayed in addition to the name of a client computer which acquires an edited image owner flag. In FIG. 66, the name of a client computer which acquires an owner flag corresponding to a first object image (an object ID1), the name of a client computer which acquires an owner flag corresponding to a second object image (an object ID2), the name of a client computer which acquires an owner flag corresponding to a third object image (an object ID3 which is a text), and the name of a client computer which acquires an owner flag corresponding to a fourth object image (an object ID4), as well as the name of a client computer which acquires an edited image owner flag, are displayed in the area A52A.

When the edited image is constituted by five or more object images or three or less object images, the names of client computers having owner flags, whose number corresponds to the number of the object images (if any), are displayed in the area A52A.

An object image display area A90 is displayed on the lower right of the screen. The object image display area A90 is an area where object images constituting an edited image which is displayed in an edited image display area A60 are displayed. In an example shown in FIG. 66, the edited image displayed in the edited image display area A60 is constituted by a first object image I1, a second object image 12, a third object image 13 and a fourth object image 14. The first object image I1, the second object image 12, the third object image 13, and the fourth object image 14 are respectively displayed in a first area A91, a second area A92, a third area A93, and a fourth area A94.

Figure 67:
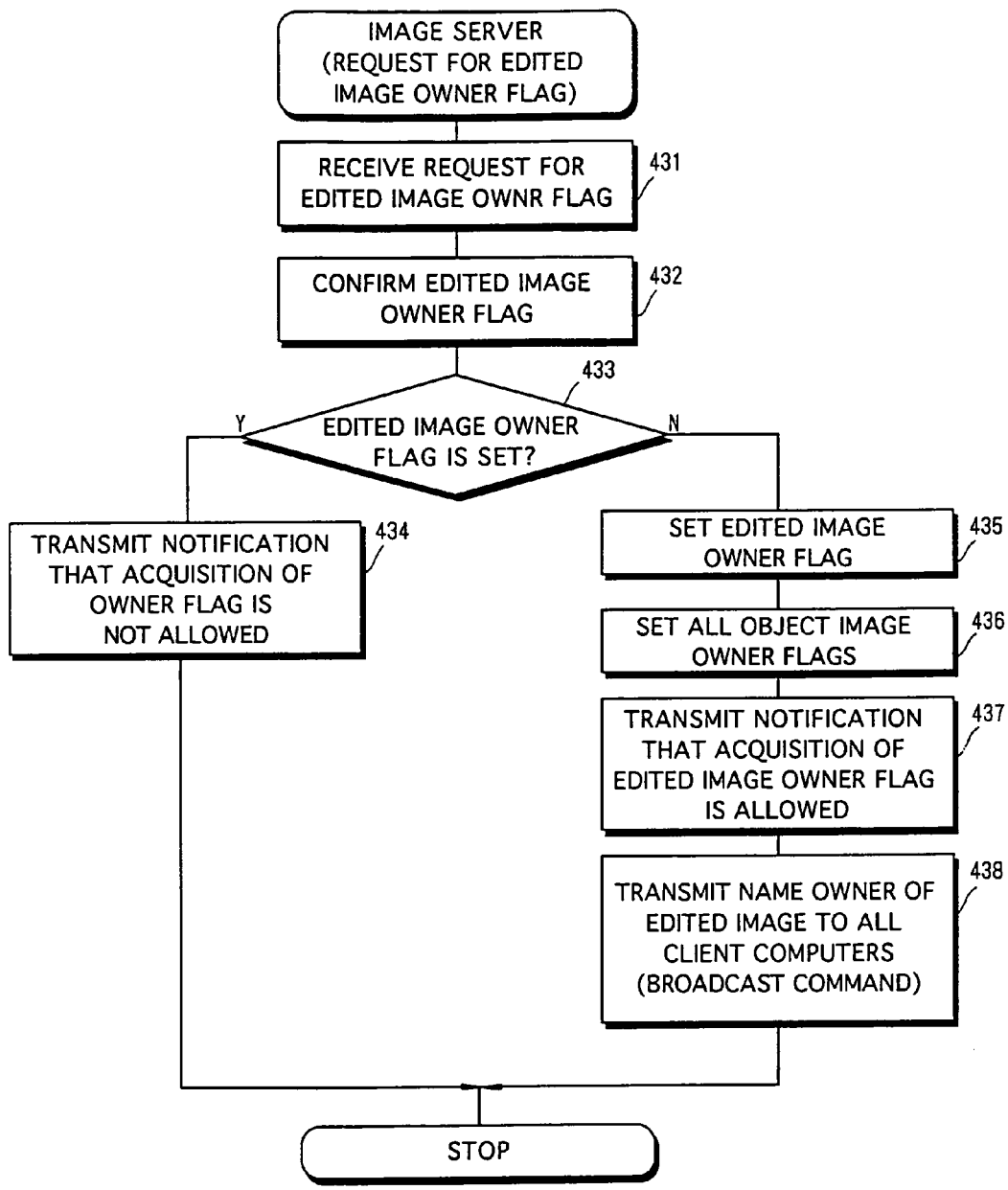

FIG. 67 is a flow chart showing the procedure for =processing performed by an image server 60 in a case where a request for an edited image owner flag is issued from a client computer.

When a user of the client computer issues the request for the edited image owner flag, the edited image display area A60 (see FIG. 66) displayed on the display screen of the display device 84 in the client computer is clicked by a mouse 78, so that the edited image display area A60 is brought into a selected state. Thereafter, an owner flag acquisition area A54 is clicked, so that data representing a request for an owner flag of an edited image which is displayed in the edited image display area A60 in the selected state is transmitted from the client computer to the image server 60.

When the data representing the request for an edited image owner flag is received in the image server 60 (step 431), the system database 65 is referred to, so that the state of an edited image owner flag in a group to which a client computer which has issued the request belongs is confirmed (step 432).

The fact that the edited image owner flag is set (YES at step 433) means that the other client computer has acquired the edited image owner flag, and the whole of the edited image is edited. Notification that acquisition of the edited image owner flag is not allowed is transmitted to the client computer which has requested the edited image owner flag (step 434). The client computer which has requested the edited image owner flag can neither acquire the edited image owner flag nor edit the whole of the image.

When the edited image owner flag is reset (NO at step 433), an edited image owner flag in the system database 65 is set (step 435). The edited image owner flag is an owner flag which allows the whole of the edited image to be edited. When the edited image owner flag has been acquired, therefore, a user of a client computer other than the client computer which has acquired the edited image owner flag is not allowed to edit the object image. When the edited image owner flag is set, therefore, object image owner flags for all the object images constituting the edited image are also set (step 436).

Notification that acquisition of an edited image owner flag is allowed is transmitted from the image server 60 to the client computer which has requested the edited image owner flag (step 437). Further, the name of the client computer which has acquired the edited image owner flag is transmitted using a broadcast command to client computers in the group to which the client computer which has acquired the edited image owner flag belongs (step 438). Consequently, the name of the client computer which has acquired the edited image owner flag is displayed in the area A52A displayed on the display screen of the display device 84 in each of the client computers.

A user of the client computer which has acquired the edited image owner flag edits the whole of the edited image in the same manner as that in the above-mentioned fourth embodiment.

Figure 68:
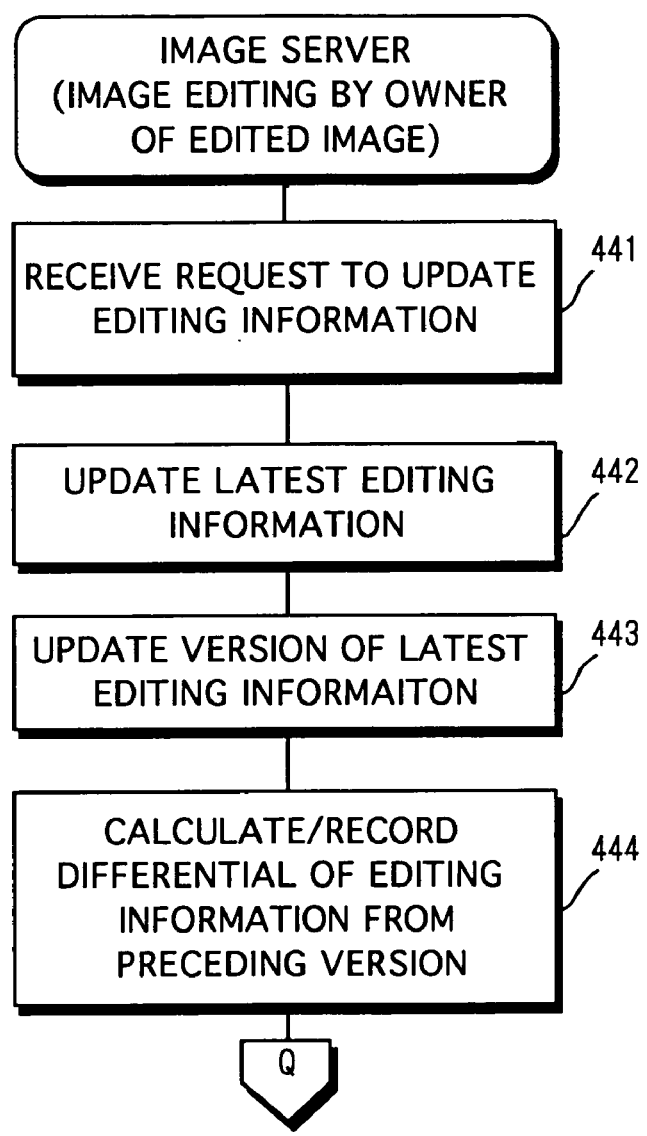
Figure 69:
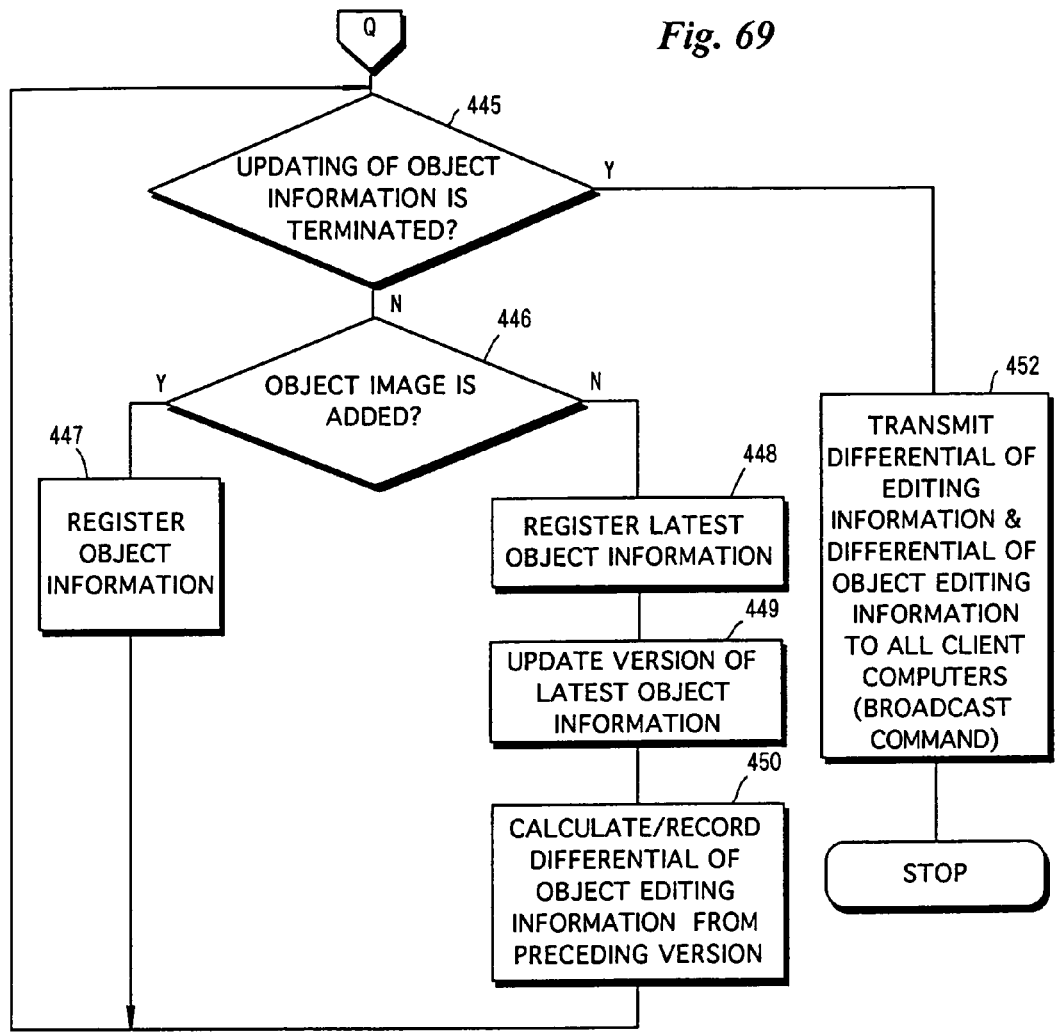

FIGS. 68 and 69 are flow charts showing the procedure for processing performed by the image server 60 in response to that the whole of an edited image is edited in a client computer which has acquired an edited image owner flag.

When the whole of the edited image is edited in the client computer, a request to update editing information is transmitted from the client computer to the image server 60 in order that the editing information saved in the editing server 60 reflects an edited image.

The request to update editing information is received by the image server 60 (step 441). Thereafter, the editing information is updated such that it represents an image after the editing (step 442). Data representing the editing information created when the image is edited, together with the request to update editing information, is transmitted from the client computer to the image server 60, so that the editing information is updated on the basis of the data representing the editing information.

When the editing information is updated, the latest version of the latest editing information which is managed by a group ID is also updated (step 443). Further, a differential of editing information from the preceding version is produced, and is managed by an editing information ID as new differential of editing information (step 444).

Object information is then updated (or registered).

It is judged whether an object image is added (step 446). If an object image is added, object information relating to the added object image is recorded on the system database 65 (step 447).

If an object image is not added (NO at step 446), the position of the object image is changed, or the object image is enlarged or reduced. The object information and the version of the latest object information are respectively updated in accordance with the change, the enlargement or the reduction (steps 448 and 449). Further, a differential of the object editing information from the preceding version is calculated, and is recorded in recording area of a differential of the object editing information (step 450).

When the object information is updated with respect to all the edited object images (NO at step 445), the differential of the editing information generated at the step 444 and the differential of the object editing information are broadcast-transmitted from the image server 60 to client computers in a group to which the client computer which has edited the whole of the edited image belongs (step 452). Consequently, the image after the editing is displayed in the edited image display area A60 on the display screen of the display device 84 in the client computer.

It goes without saying that when the object image is deleted, information relating to the deleted object image is deleted from the editing information at step 442.

Figure 70:
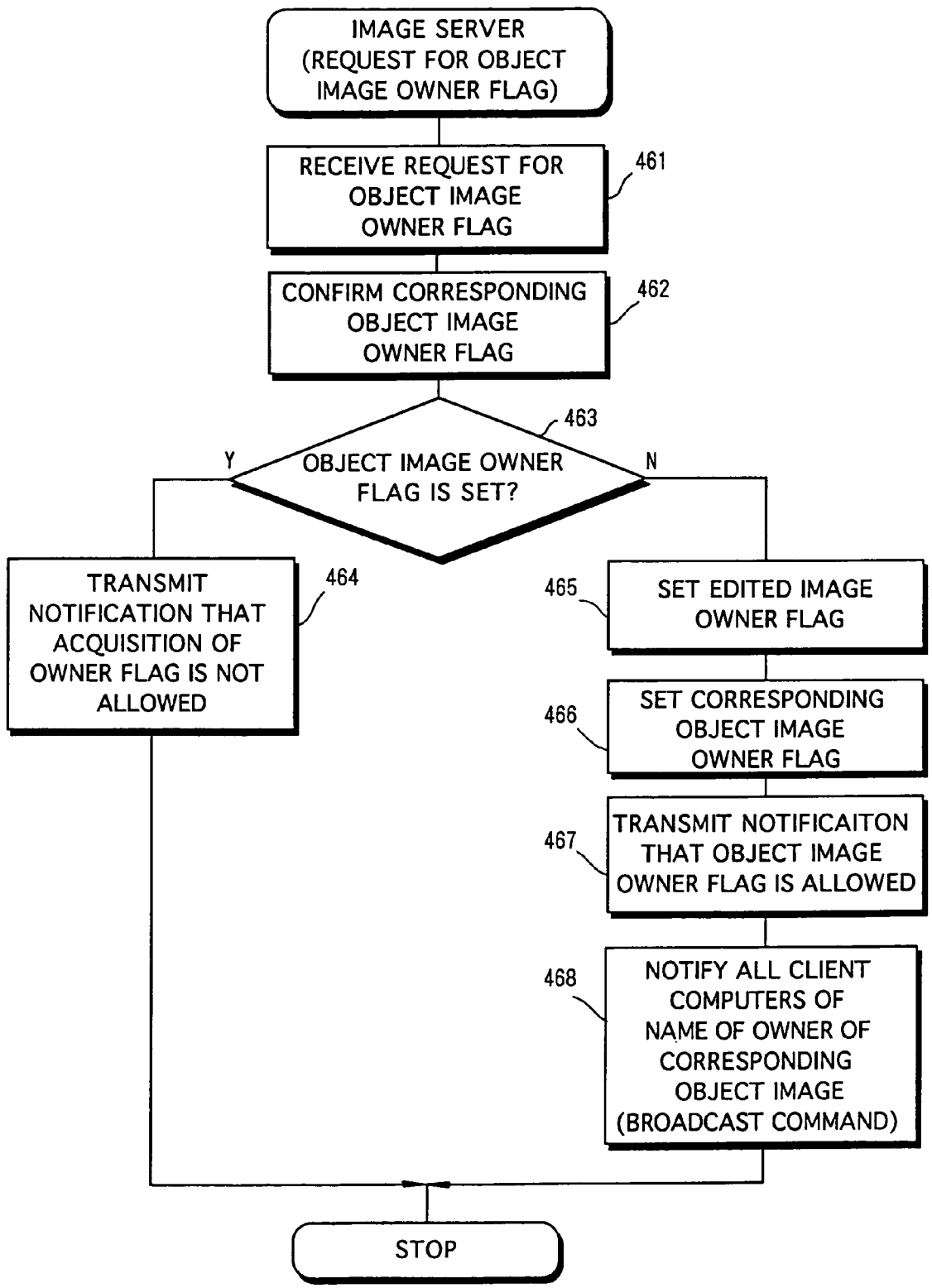

FIG. 70 is a flow chart showing the procedure for processing performed by the image server 60 in a case where a request for an object image owner flag is issued from a client computer.

An object image to be edited in the object image display area A90 displayed on the display screen of the display device 84 in the client computer is pointed and clicked by the mouse 78 (selection of an object image to be edited is selected). When the owner flag acquisition area A54 is clicked, data representing a request for an object image owner flag concerning to the selected object image is transmitted from the client computer to the image server 60.

When the data representing the request for the object image owner flag is received in the image server 60 (step 461), it is checked whether the object image owner flag which has been requested is set or not (step 462).

When the object image owner flag which has been requested is set (YES at step 463), it is considered that the corresponding object image is edited by a client computer other than the client computer which has requested the object image owner flag. Therefore, notification that acquisition of an object image owner flag is not allowed is transmitted from the image server 60 to the client computer (step 464). The client computer which has requested the object image owner flag cannot acquire the object image owner flag.

When the object image owner flag which has been requested is reset (NO at step 463), an edited image owner flag is set (step 465) such that the whole of an edited image cannot be edited because an object image will be edited. Further, the object image owner flag which has been requested is set (step 466).

Notification that acquisition of an object image owner flag is allowed is transmitted to the client computer which has issued the request (step 467). Client computers in a group to which the client computer which has issued the request belongs are notified of a name of an owner of the corresponding object image (step 468). Consequently, the name of the client computer which is the owner of the object image is displayed in the area A52A on the display screen of the display device 84 of the client computer.

In the client computer which has acquired the object image owner flag, the corresponding object image is edited. When the object image has been edited, data representing a request to update object information is transmitted from the client computer to the editing server 60. Also in this case, it goes without saying that data representing the editing information of object image is transmitted from the client computer to the editing server 60.

Figure 71:
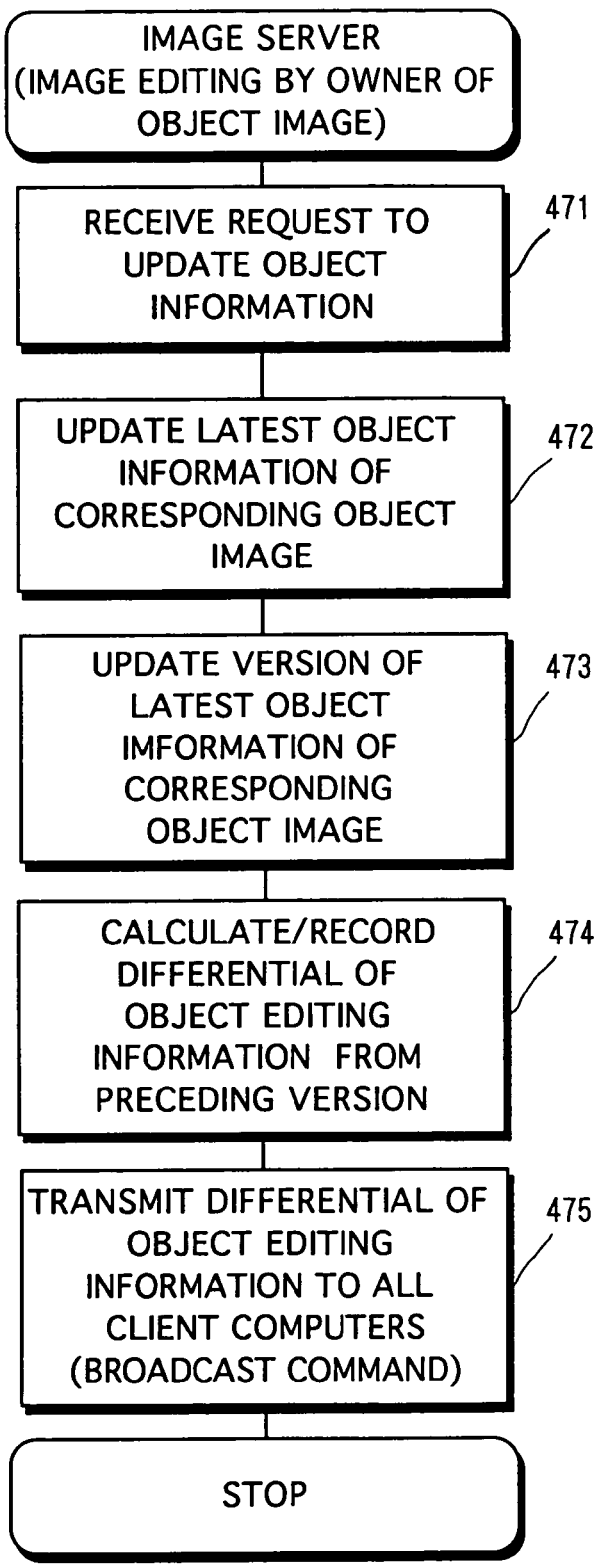

FIG. 71 is a flow chart showing the procedure for processing performed by the image server 60 in a case where an object image is edited in a client computer.

A request to update object information which has been transmitted from the client computer is received in the editing server 60 (step 471). When the request to update object information is received, object information relating the edited object image is updated on the basis of the received request to update object information (steps 472 and 473).

A differential of the object editing information from the preceding version is then calculated, and is recorded on a recording area of differential of the object editing information which is managed by an object ID (step 474). Data representing the calculated differential of the object editing information is broadcast-transmitted to client computers in a group to which the client computer which has edited the object image belongs (step 475). Consequently, the edited object image is displayed in the edited image on the display screen of the display device 84 in the client computer.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A client computer having a display device used in an image communication system in which an image server storing film image data representing an image and the client computer are capable of communicating with each other, comprising:
   a first transmission device transmitting, to said image server, a command to transmit a thumbnail film image data generated from the film image data stored in said image server, the thumbnail image data having been subjected to display direction conversion processing;
   a second transmission device transmitting, to said image server, display information relating to said display device, said first and second transmission devices transmitting the respective command and display information to reduce the amount of film image data that said image server is required to process; and
   a receiving device receiving the film image data reduced on the basis of the display information in said image server.

2. A client computer used in an image communication system in which an image server having an image output device for outputting a film image and the client computer are capable of communicating with each other, comprising:
   an image data quantity reduction device for reducing the data quantity of film image data to be transmitted to said image server, so that the data quantity of the film image data to be transmitted is equal to or less than the data quantity of the film image data representing the film image to be outputted from said image output device; and
   an image data transmission device for transmitting the reduced film image data to said image server,
   wherein said image data quantity reduction device further includes:
   print image area designation means for designating an image area to be printed of an image represented by film image data of one frame; and
   partial image data extraction means for extracting partial image area data representing the designated image area from said film image data of one frame.

3. The client computer according to claim 2, wherein said image data quantity reduction device includes at least one of resolution conversion means for converting the image data to be transmitted into image data having a resolution which is less than or equal to the resolution of the image output from said output device, so as to reduce the quantity of the image data, and thinning means for thinning the image data such that the size thereof is equal to the size of the output image.

4. The client computer according to claim 2, wherein said image data quantity reduction device further includes:
   compression rate determination means for determining the compression rate of the image data to be transmitted to said image server on the basis of the speed of transmission of the image data between the image server and said client computer, and
   image data compression means for compressing the image data at the determined compression rate.

5. A client computer used in an image communication system in which an image server and the client computer are capable of communicating with each other, comprising:
   a compression rate setting device for setting the compression rate of film image data;
   a calculation device for calculating information relating to time required for transmission in a case where the film image data compressed at the set compression rate is transmitted to said image server; and
   a display device for displaying the information relating to the calculated time for transmission.

6. The client computer according to claim 5, further comprising a display control device for exhibiting control so that an image represented by the image data compressed at the set compression rate is displayed on said display device.

7. An image communication system in which an image server and a client computer are capable of communicating with each other, wherein film image data and information relating to the film image data are transmitted from said client computer to said image server,
   wherein said image server further includes:
   an image output device for outputting a film image after subjecting the film image to display direction conversion processing, on the basis of the information relating to the film image data transmitted from said client computer; and
   an image information transmission device for transmitting, to said client computer, the information relating to the film image data transmitted from said client computer,
   wherein said client computer further includes a retrieval means for retrieving image data specified by the information relating to the film image data transmitted from said image server, and
   wherein said image output device and said image information transmission device in said image server, and said retrieval means in said client computer are each separate and distinct components within the image communication system.

8. A method of transmitting film image data from a client computer to an image server, the client computer and the image server being used in an image communication system in which the image server, having an image output device for outputting an image and said client computer are capable of communicating with each other, comprising:
   reducing the data quantity of film image data to be transmitted to said image server so that the data quantity of the image data to be transmitted is equal to or less than the data quantity of the image data representing the image to be output; and
   transmitting the reduced film image data to said image server wherein the step of reducing further includes:
designating an image area to be printed of an image represented by image data of one frame; and
extracting partial image area data representing the designated image area from said film image data of one frame.

9. A method of displaying information in a client computer which is used in an image communication system in which an image server and the client computer are capable of communicating with each other, comprising:
setting the compression rate of film image data;
calculating information relating to time required for transmission in a case where the film image data compressed at the compression rate is transmitted to said image server; and
displaying the calculated information related to the transmission time.

10. A computer-readable recording medium storing a program for transmitting film image data from a client computer which is used in an image communication system in which an image server having an image output device for outputting an image and the client computer are capable of communicating with each other, the program controlling the computer so as to:
reduce the data quantity of film image to be transmitted to said image server such that the data quantity of the film image data to be transmitted is equal to or less than the data quantity of the film image data representing the image to be outputted from said image output device; and
transmit the reduced film image data to said image server
wherein said program further controls film image data reduction processing in the computer so as to designate an image area to be printed of an image represented by film image data of one frame, and extracts partial image area data representing the designated area from said film image data of one frame.

11. A computer-readable recording medium storing a program for displaying information in a client computer which is used in an image communication system in which an image server and the client computer are capable of communicating with each other, the program controlling the computer so as to:
set the compression rate of film image data;
calculate information relating to time required for transmission in a case where the film image data compressed at the set compression rate is transmitted to said image server; and
display the calculated information related to the transmission time.

12. An image editing system in which an image server and a plurality of client computers are capable of communicating with one another, an image represented by film image data is edited in one of said client computers, and editing information relating to the edited film image is transmitted from said one client computer to said image server,
wherein execution data indicating that an image is edited for the first time or re-edited after said initial editing is transmitted from said one or another client computer to said image server prior to initial editing or subsequent re-editing the film image,
wherein said image server further includes:
a judgment device for judging whether or not the initial editing or re-editing after said initial editing is allowed on the basis of said transmitted execution, and
an allowance data transmission device for transmitting, when said judgement device judges that the initial editing or re-editing after said initial editing of the image is allowed, allowance data to said one or another client computer which has been allowed to edit or re-edit the film image, and
wherein said one or another client computer further includes a control device for performing the initial editing or re-editing after said initial editing in response to the receiving of allowance data.

13. The image editing system according to claim 12, wherein said re-editing information transmission device transmits information relating to a portion re-edited by said image re-editing device.

14. The image editing system according to claim 12,
wherein said plurality of client computers are classified into a plurality of groups, each group including one or more of said client computers, and
wherein said image server further includes a transmission device for transmitting said re-editing information transmitted from said re-editing information transmission device to said client computer, in the group to which the one or another client computer which has transmitted the re-editing information belongs.

15. The image editing system according to claim 14, wherein said one or another client computer further includes:
a comment entry device for entering a comment concerning said editing or re-editing information which has been transmitted from said image server, and
a comment transmission device for transmitting the entered comment to said image server.

16. The image editing system according to claim 12,
wherein said edited image is constituted by a plurality of object images, and object image editing request data which indicates that said object images are subjected to object image editing which is at least one of addition, alteration, and deletion, said edited image being transmitted from the one or another client computer to said image server,
wherein said image server further includes:
an object image editing judgment device for judging whether or not said object image editing is allowed on the basis of said transmitted object image editing request data, and
an object image editing allowance data transmission device for transmitting, when said object image editing judgment device judges that said object image editing is allowed, object image editing allowance data for allowing said object image editing to the one or another client computer which has been allowed to edit the object image, and
wherein said one or another client computer further includes an object image editing device for performing said object image editing in response to the receiving of said object image editing allowance data.

17. The image editing system according to claim 12,
wherein said image server further includes an editing information transmission device for transmitting editing information relating to the edited image which has been transmitted from said one client computer to another client computer; and
wherein said one or another client computer further includes:
an image re-editing device for re-editing the edited image transmitted from said image server; and a re-editing information transmission device for transmitting re-editing information relating to the re-edited image to said image server.

18. A client computer constituting a system in which an image server and a plurality of client computers are capable of communicating with one another, comprising:
- an image editing device for performing initial editing of a film image and subsequent re-editing of the initially edited film image;
- a receiving device for receiving data representing allowance of the initial editing or subsequent re-editing of the film image, which is transmitted from the client computer; and
- a controller for controlling the image editing device so as to execute initial editing of the film image, or subsequent re-editing of the edited image in response to reception of the allowance data by the receiving device.

19. An image editing system in which an image server and a plurality of client computers are capable of communicating with one another, an image represented by image film data is edited in one of the client computers, and editing information relating to the edited image is transmitted from the one client computer to said image server,
- wherein execution data indicating that a film image is initially edited or re-edited after said initial editing is transmitted from said one or from another of said plurality of client computers to said image server prior to editing or re-editing the film image,
- wherein said image server judges whether or not the initial editing or subsequent re-editing of the film image is allowed on the basis of said transmitted execution data, and transmits, when said judgment device judges that the initial editing or subsequent re-editing of the film image is allowed, allowance data to said one or another client computer which has been allowed to edit or re-edit the film image, and
- wherein said one or another client computer performs the initial editing or subsequent re-editing in response to receiving allowance data.

20. The image editing system according to claim 19, wherein information relating to a re-edited portion is transmitted from said one or another client computer to said image server.

21. The image editing system according to claim 19,
- wherein said plurality of client computers are classified into a plurality of groups, each group including one or more of said client computers, and
- wherein said re-editing information is transmitted to that client computer in the group to which said re-editing information belongs.

22. The image editing system according to claim 21, wherein a comment concerning said editing or re-editing information is transmitted to said image server.

23. The image editing system according to claim 19,
- wherein said edited image is constituted by a plurality of object images, and object image editing request data which indicates that said object images are subjected to object image editing which is at least one of addition, alteration, and deletion, said edited image being transmitted from the one or another client computer to said image server, wherein said image server further includes:
- an object image editing judgment device for judging whether or not said object image editing is allowed on the basis of said transmitted object image editing request data, and
- an object image editing allowance data transmission device for transmitting, when it is judged that said object image editing is allowed, object image editing allowance data for allowing said object image editing to the one or another client computer which has been allowed to edit the object image, and
- wherein said one or another client computer further includes an object image editing device for performing said object image editing in response to the receiving of said object image editing allowance data.

* * * * *